United States Patent
Verkhusha et al.

(10) Patent No.: US 12,543,956 B2
(45) Date of Patent: Feb. 10, 2026

(54) REVERSIBLY SWITCHABLE PHOTOACOUSTIC IMAGING SYSTEMS AND METHODS

(71) Applicants: Albert Einstein College of Medicine, Bronx, NY (US); Washington University, St. Louis, MO (US)

(72) Inventors: Vladislav V. Verkhusha, Bronx, NY (US); Andrii A. Kaberniuk, Bronx, NY (US); Lihong Wang, St. Louis, MO (US); Junjie Yao, St. Louis, MO (US); Lei Li, St. Louis, MO (US)

(73) Assignees: Albert Einstein College of Medicine, Bronx, NY (US); Washington University, St. Louis, MO (US)

( * ) Notice: Subject to any disclaimer, the term of this patent is extended or adjusted under 35 U.S.C. 154(b) by 806 days.

(21) Appl. No.: 17/523,581

(22) Filed: Nov. 10, 2021

(65) Prior Publication Data

US 2022/0175253 A1 Jun. 9, 2022

Related U.S. Application Data

(63) Continuation of application No. 15/261,116, filed on Sep. 9, 2016, now abandoned.
(Continued)

(51) Int. Cl.
*A61B 5/00* (2006.01)
*A61B 5/20* (2006.01)

(52) U.S. Cl.
CPC .......... *A61B 5/0095* (2013.01); *A61B 5/0037* (2013.01); *A61B 5/201* (2013.01); *A61B 5/7239* (2013.01); *A61B 2576/02* (2013.01)

(58) Field of Classification Search
CPC ... A61B 5/7239; A61B 5/7242; A61B 5/7246; A61B 5/723; A61B 5/7232;
(Continued)

(56) References Cited

U.S. PATENT DOCUMENTS 6,567,678 B1 5/2003 Oosta et al.
9,482,612 B2 11/2016 Heidmann
(Continued)

FOREIGN PATENT DOCUMENTS

WO WO-2014063005 A1 * 4/2014 ........... A61B 5/0035

OTHER PUBLICATIONS

Hu et. al, Neurovascular photoacoustic tomography, Front. Neuroenergetics, Jun. 17, 2010 vol. 2—2010 (Year: 2010).*
(Continued)

*Primary Examiner* — Keith M Raymond
*Assistant Examiner* — Amy Shafqat
(74) *Attorney, Agent, or Firm* — Alexander Akhiezer; Erik Heustis; Foley Hoag LLP

(57) ABSTRACT

Reversibly switchable photoacoustic tomography (RS-PAT), a photoacoustic technique with enhanced sensitivity and resolution, is disclosed. RS-PAT utilizes a subtractive process for the formation of a photoacoustic image of a region containing a plurality of switchable photoacoustic probes. In various aspects, the photoacoustic detection in RS-PAT imaging occurs minimally twice: a first image obtained when the photoacoustic probe is in active (absorbing or ON) state and a second image obtained when the photoacoustic probe is in an inactive (less-absorbing or OFF) state. Subtraction of the second image from the first image is used to obtain the RS-PAT image.

6 Claims, 51 Drawing Sheets

Related U.S. Application Data

(60) Provisional application No. 62/215,988, filed on Sep. 9, 2015.

(58) Field of Classification Search
CPC ... A61B 5/7285; A61B 5/7292; A61B 5/0037; A61B 5/003; A61B 5/0068; A61B 5/0066; A61B 5/0071; A61B 5/0095; A61B 5/0097; A61B 5/0073; A61B 5/0059

See application file for complete search history.

(56) References Cited

U.S. PATENT DOCUMENTS

| | | | |
|---|---|---|---|
| 10,188,330 B1 * | 1/2019 | Kadlec | A61B 5/1495 |
| 10,408,890 B2 | 9/2019 | Bruce et al. | |
| 2008/0310470 A1 | 12/2008 | Ooi et al. | |
| 2009/0156932 A1 | 6/2009 | Zharov | |
| 2013/0123590 A1 * | 5/2013 | Naganuma | A61B 5/6826 |
| | | | 600/316 |
| 2013/0256564 A1 | 10/2013 | Hell et al. | |
| 2013/0331681 A1 | 12/2013 | Tokita et al. | |
| 2014/0307249 A1 | 10/2014 | Peremans et al. | |
| 2015/0043599 A1 | 2/2015 | Yanagida et al. | |
| 2015/0235661 A1 | 8/2015 | Heidmann | |
| 2015/0307565 A1 | 10/2015 | Burgie et al. | |
| 2016/0187259 A1 | 6/2016 | Vicidomini et al. | |
| 2016/0242737 A1 | 8/2016 | Zhou et al. | |
| 2016/0305883 A1 | 10/2016 | Betzig et al. | |
| 2016/0356716 A1 * | 12/2016 | Jullien | G01N 33/5306 |
| 2017/0038300 A1 | 2/2017 | Dake et al. | |
| 2017/0211977 A1 | 7/2017 | Jeys et al. | |
| 2018/0078143 A1 | 3/2018 | Pramanik et al. | |

OTHER PUBLICATIONS

Tekavec et al., "Fluorescence-detected two-dimensional electronic coherence spectroscopy by acousto-optic phase modulation," The Journal of Chemical Physics, 127 (21): 214307 (2007).

* cited by examiner 200 nm

5 μm

REVERSIBLY SWITCHABLE PHOTOACOUSTIC IMAGING SYSTEMS AND METHODS

CROSS-REFERENCE TO RELATED APPLICATIONS

This application is a continuation of U.S. patent application Ser. No. 15/261,116, filed on Sep. 9, 2016, which claims the benefit under 35 USC § 119 of U.S. Provisional Application No. 62/215,988, filed on Sep. 9, 2015, each of which is hereby incorporated by reference in its entirety.

STATEMENT REGARDING FEDERALLY SPONSORED RESEARCH & DEVELOPMENT

This invention was made with government support under grants NS090579, NS057105, CA164468, GM108579 and GM073913 awarded by the National Institutes of Health. The government has certain rights to this invention.

BACKGROUND

Using reporter genes that can be selectively expressed in targeted biological processes, optical imaging has provided valuable information for biomedical studies at different length scales. However, strong light scattering in tissue leads to a substantial tradeoff between the spatial resolution and penetration depth, even in advanced optical imaging techniques. Photoacoustic (PA) tomography (PAT), on the other hand, breaks the depth and resolution limitations of pure optical imaging by acoustically detecting optical absorption contrast. In PAT, light-induced ultrasound waves are detected outside tissue to form an image that maps the original optical energy deposition inside the tissue. The weak ultrasonic scattering in soft tissue provides highly scalable spatial resolution and penetration.

PAT is inherently well-suited for molecular imaging, due to the compatibility of PAT with a variety of genetically encoded probes, including fluorescent proteins (FPs), such as derivatives and homologues of the green fluorescent protein (GFP), as well as non-fluorescent pigments. However, existing GFP-like FPs lack strong optical absorption at wavelengths beyond 610 nm and are prone to photobleaching and therefore are less well-suited for deep-tissue PAT. Elevated intracellular production of eumelanin, a non-fluorescent pigment, has been used as a probe for PAT imaging in a previous study, but the heavy pigmentation resulting from the elevated eumelanin production may have inhibited cell proliferation, and the presence of endogenous melanin may have degraded the imaging specificity when genetically encoded eumelanin was co-expressed in certain tissues, such as the skin, eye, and brain. In other previous studies, lacZ has been used as a reporter gene for PAT, but lacZ depends on the metabolism of exogenously injected X-gal substrate to function as a PAT probe, requiring a *priori* knowledge of the target location. It is of further note that PAT imaging of the above probes suffers from strong background signals generated by various endogenous biomolecules, especially hemoglobin. These abundant endogenous biomolecules generally exhibit wideband absorption spectra that overlap with those of the probes. Accurate spectral unmixing of these biomolecules is hampered by highly wavelength-dependent light attenuation in tissue at depths beyond the optical diffusion limit.

BRIEF DESCRIPTION

In one aspect, a method of obtaining an RS-PA image of a region of interest that includes a plurality of reversibly-switchable probes configured in a first state is disclosed. The method includes: obtaining a plurality of first PA signals from the region of interest using a first laser pulse wavelength; switching the plurality of reversibly-switchable probes from the first state to a second state; obtaining a plurality of second PA signals from the region of interest using the first laser pulse wavelength; reconstructing a first PA image of the region of interest from the plurality of first PA signals; reconstructing a second PA image of the region of interest from the plurality of second PA signals; and subtracting the second PA image from the first PA image pixelwise to obtain the RS-PA image of the region of interest.

In another aspect, a reversibly-switchable probe for use in RS-PA imaging is disclosed. The reversibly-switchable probe includes a bacterial phytochrome. The bacterial phytochrome includes a photosensory core module, an output effector domain, and a chromophore. The chromophore includes biliverdin Ixα. The reversibly-switchable probe is either endogenously produced by at least one cell to be imaged or is exogenously introduced into at least a portion of a field of view to be imaged using the RS-PA imaging.

In an additional aspect, a system for obtaining an image of a region of interest using RS-PA imaging is disclosed. The system includes: a first laser source to produce at least one first laser pulse at a first pulse wavelength suitable for PA imaging; a second laser source to produce at least one second laser pulse at a second wavelength suitable for switching a plurality of reversibly-switchable probes from a second state to a first state; a controller to control the relative timing of the at least one first laser pulse and the at least one second laser pulse according to a predetermined sequence; and an optical combining module to direct the at least one first laser pulse and the at least one second laser pulse into a corresponding optics module of a PA imaging device. The corresponding optics module directs the at least one first laser pulse and the at least one second laser pulse into the region of interest.

In yet another additional aspect, a system for obtaining an image of a region of interest using RS-PAM imaging is disclosed. The system includes: a first laser source operatively coupled to an optical combining module; a second laser source operatively coupled to the optical combining module; a controller operatively coupled to the first and second laser sources; an optical combining module operatively coupled to the first and second laser sources to direct the at least one first laser pulse and the at least one second laser pulse into an optics module; the optics module operatively coupled to the optical combining module; and at least one ultrasound transducer to receive PA signals produced by the region of interest in response to illumination by the at least one first laser pulse. The first laser source produces at least one first laser pulse at a first pulse wavelength suitable for PA imaging. The second laser source produces at least one second laser pulse at a second wavelength suitable for switching a plurality of reversibly-switchable probes from a second state to a first state. The controller controls the relative timing of the at least one first laser pulse and the at least one second laser pulse according to a predetermined sequence. The optics module splits the at least one first laser pulse and the at least one second laser pulse into a first portion and a second portion, and further directs the first portion into the region of interest along a first path and directs the second portion into the region of interest along a second path.

BRIEF DESCRIPTION OF THE DRAWINGS

The embodiments described herein may be better understood by referring to the following description in conjunction with the accompanying drawings.

DETAILED DESCRIPTION

Figure 1:
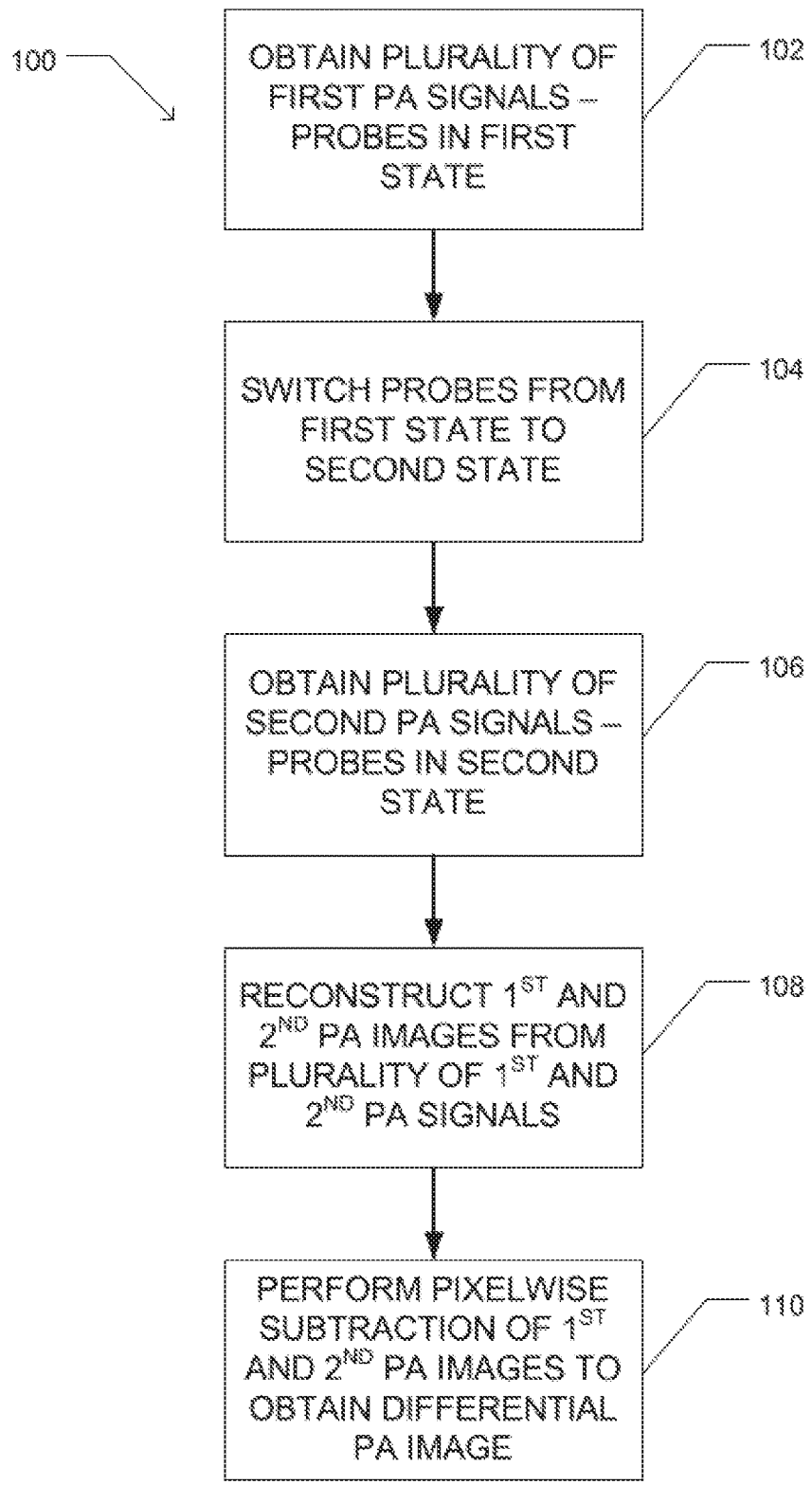
FIG. 1 shows a flow chart illustrating a method of reversibly-switchable photoacoustic imaging of a region of interest according to one aspect of the present disclosure.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not delimit the scope of the disclosure.

Reversibly-switchable photoacoustic imaging combines deep-tissue PA imaging with a plurality of reversibly-switchable photoacoustic probes situated within a region of interest to obtain significantly higher image resolution and sensitivity for regions of interest situated deeper within a tissue relative to previous photoacoustic imaging systems and methods. In various aspects, the reversibly-switchable photoacoustic probes are chemical structures that may assume one of two conformations corresponding to: i) a first state characterized by a relatively high absorbance of laser pulses at a selected pulse wavelength; and ii) a second state characterized by a significantly reduced absorbance of laser pulses at the same selected pulse wavelength. The reversibly-switchable photoacoustic probes may be repeatedly switched from the first state to the second state and vice-versa as needed during imaging.

In one aspect, reversibly-switchable photoacoustic imaging includes obtaining a plurality of first photoacoustic (PA) signals from a region of interest containing a plurality of reversibly-switchable photoacoustic probes configured in the first state, and then obtaining a plurality of second PA signals from the same region of interest except that the reversibly-switchable photoacoustic probes are now configured in the second state. In this aspect, each corresponding PA signal from the plurality of first photoacoustic (PA) signals and the plurality of second PA signals, which were obtained using the same pulse wavelength, are subtracted to obtain a plurality of differential PA signals, which are used to reconstruct a PA image.

Without being limited to any particular theory, only the first and second PA signals produced by the reversibly-switchable photoacoustic probes within the region of interest are expected to differ significantly by virtue of the significant difference in absorbance between the first and second states of these probes. Other structures within the region of interest, such as hemoglobin, are assumed to produce essentially identical first and second PA signals because the absorbances of these other structures remain the same, and essentially identical laser pulses are used to obtain the first and second PA signals. As a result, the image obtained by reconstructing the plurality of differential PA signals is essentially a spatial distribution of the plurality of reversibly-switchable photoacoustic probes.

In various aspects, the reversibly-switchable photoacoustic probes may include any compound capable of reversibly changing between a first state characterized by a relatively high absorbance of a laser pulse at a selected wavelength (ON state) and a second state characterized by a significantly lower absorbance of a laser pulse at the same selected wavelength (OFF state), as compared to the first state. In one aspect, the reversibly-switchable photoacoustic probes may include isolated compounds that are exogenously introduced to a region of interest. In another aspect, the reversibly-switchable photoacoustic probes may include endogenous compounds produced by one or more cells transformed with a nucleic acid molecule encoding a protein configured to function as a reversibly-switchable photoacoustic probe including, but not limited to a photochromic non-fluorescent NIR-absorbing bacterial phytochrome, BphP1, as described herein below.

The methods of reversibly-switchable photoacoustic imaging may be applied to any existing method of photoacoustic imaging including, but not limited to: photoacoustic tomography, photoacoustic microscopy, and any other existing photoacoustic imaging method. In various aspects, an existing photoacoustic imaging device may be upgraded to a reversibly-switchable photoacoustic imaging device by the inclusion of various components configured to effectuate the switching of the plurality of reversibly-switchable photoacoustic probes according to a predetermined schedule as described in detail herein below. In one aspect, the lateral resolution, axial resolution, and detection sensitivity of structures within images obtained using reversibly-switchable photoacoustic microscopy are substantially enhanced relative to conventional photoacoustic microscopic images due to the differential response of the reversibly-switchable photoacoustic probes to local variation in light intensity within each laser pulse, as described in detail herein below. In various aspects, reversibly-switchable photoacoustic microscopic devices described herein below are capable of achieving a spatial resolution of ~100 μm and a PA detection sensitivity of tens of live mammalian cells at depth of about one centimeter.

I. Method of Reversibly-Switchable Photoacoustic Imaging

In various aspects, a method of obtaining an image of a region of interest using reversibly-switchable photoacoustic (RS-PA) imaging includes obtaining and analyzing a plurality of PA signals obtained from a region of interest containing a plurality of reversibly-switchable photoacoustic (RS-PA) probes configured in either a first (absorptive) state or a second (less-absorptive) state. The plurality of RS-PA probes may include any one or more of the RS-PA probes described herein below. In addition, the plurality of RS-PA probes may be introduced using any one or more of the methods described herein below including, but not limited to: a) exogenous administration of a RS-PA probe compound such as a dye by any known method such as injection; b) transformation of a selected cell with a nucleic acid molecule encoding the expression of a reversibly-switchable photoacoustic probe compound followed by introduction of the transformed cell into the region of interest; c) in vivo transformation of a cell within the region of interest with a nucleic acid molecule encoding the expression of a reversibly-switchable photoacoustic probe compound; and d) any combination thereof.

FIG. 1 is a flow-chart summarizing a method 100 of obtaining an image of a region of interest using RS-PA imaging in one aspect. Referring to FIG. 1, the method 100 includes obtaining a plurality of PA signals from a region of interest using a first laser pulse wavelength at step 102. At step 102, the region of interest contains a plurality of RS-PA probes configured in a first state. In one aspect, the first state of the RS-PA probe corresponds to a relatively high absorbance of a laser pulse at the first laser pulse wavelength compared to the second state. In another aspect, the first state of the RS-PA probes corresponds to a relatively low absorbance of a laser pulse at the first laser pulse wavelength compared to the second state. In various aspects, the difference in absorption of the laser pulse by the RS-PA probes configured in the first and second states influence the contrast and consequent spatial resolution and detection sensitivity of the RS-PA image obtained using the method.

In various other aspects, the plurality of first PA signals obtained at step 102 include PA signals from throughout the region of interest and may be reconstructed into a PA image using conventional PA image reconstruction methods. However, because all positions within the region of interest are capable of generating background PA signals whether the position includes at least one RS-PA probe or not, the contrast of the plurality of RS-PA probes within the region of interest is diminished due to the presence of these background PA signals.

Referring again to FIG. 1, the method 100 further includes switching the plurality of RS-PA probes from the first state to the second state at step 104. The means by which the plurality of RS-PA probes are switched from the first state to the second state may include any known means of altering a conformation of a molecule of a light-absorbing compound without limitation. The particular means used at step 104 are selected based on the characteristics of the particular RS-PA probes situated within the region of interest, as described in detail herein below. By way of non-limiting example, the plurality of RS-PA probes may be switched from the first state to the second state by illuminating the plurality of RS-PA probes with at least one laser pulse at a selected wavelength.

In one aspect, described herein below, the laser pulse wavelength used to switch the plurality of RS-PA from the first state to the second state at step 104 may be the same laser pulse wavelength used to obtain the plurality of first PA signals at step 102. In this one aspect, the first PA signals may be obtained at step 102 and the plurality of probes may be switched at step 104 using the same laser pulse in a single step. In another aspect, the laser pulse wavelength used to switch the plurality of RS-PA probes from the first state to the second state may be a different laser pulse wavelength that the laser pulse wavelength used to obtain the plurality of first PA signals.

Referring again to FIG. 1, the method may further include obtaining a plurality of second PA signals at step 106. The plurality of second PA signals typically include all of the PA signals elicited by structures within the region of interest in response to illumination by the laser pulse at the same first wavelength used to obtain the plurality of first PA signals at step 102. Without being limited to any particular theory, the use of the same pulse wavelength to obtain both the plurality of first PA signals at step 102 and the plurality of second PA signals at step 106 ameliorates many issues associated with previous methods of multi-wavelength or spectral PA imaging, which involved processing PA signals obtained using two or more pulse wavelengths. Without being limited to any particular theory, these previous methods typically require a *priori* knowledge of the in vivo absorption spectra within the region of interest, which are notoriously difficult to obtain due to the strongly wavelength-dependent attenuation of light and local variations in the distribution of different cell and tissue types within the region of interest. Because each corresponding first and second PA signal are obtained under essentially identical conditions except for the state of the RS-PA probes, background signals from surrounding compounds, such as hemoglobin, may be removed without sacrificing either the spatial resolution or sensitivity of the resulting PA image. Further, differential processing is much more computationally efficient and less sensitive to noise than the spectral unmixing algorithms used by existing methods, which typically need a complex light diffusion model and iterative reconstruction.

Referring again to FIG. 1, the plurality of first PA signals obtained at step 102 may be reconstructed to obtain a first PA image at step 108. In addition, the plurality of second PA signals obtained at step 106 may also be reconstructed to obtain a second PA image at step 108. In one aspect, the raw PA signals data from each transducer element may be Wiener deconvolved to account for the ultrasonic transducer's impulse response and then subsequently reconstructed within each imaging plane using a universal back-projection algorithm. In another aspect, a half-time image reconstruction algorithm may be applied in combination with the universal back-projection reconstruction to mitigate any artifacts induced by acoustic heterogeneities in the animal body, including, but not limited to: air cavities in the gastrointestinal tract and/or pleural cavity, heterogeneities within the backbone, and any other acoustic heterogeneities.

In various aspects, the first and second PA images include a plurality of pixels in which each pixel corresponds to a spatial location within the region of interest. In addition, each pixel value of the first and second PA images is proportional to the PA signal strength obtained from the spatial location corresponding to each pixel.

Referring again to FIG. 1, each second pixel value of the second PA image obtained at step 108 may be subtracted from the corresponding first pixel value of the first PA image obtained at step 108 in a pixel-wise manner to obtain a differential PA image at step 110. In various aspects, each differential pixel of the differential PA image is the difference between each first pixel vale and each corresponding second pixel value from the first and second PA images, respectively.

In various aspects, the pixelwise subtraction of each second pixel value from each corresponding first pixel value may reduce the impact of background signals generated by any other objects within the region of interest that are not the RS-PA probes. Any other object within the region of interest is assumed to not possess reversibly switchable absorbance properties like the RS-PA probes, and as a result are assumed to have similar absorption of light pulses throughout the imaging process. As a result, each first pixel value of the first PA image and each corresponding second pixel value of the second PA image may be assumed to differ by a relatively small amount, resulting in relatively low differential pixel values for those pixels corresponding to the locations of objects other than the RS-PA probes within the differential PA image. By contrast, each first pixel value and each corresponding second pixel value corresponding to a location within the region of interest that does contain at least one RS-PA probe may differ significantly due to the difference in absorption of the light pulse by the at least one RS-PA probe in the first and the second states. As a result, the differential pixel values corresponding to locations containing at least one RS-PA probe may have significantly higher differential pixel values compared to differential pixel values corresponding to locations lacking RS-PA probes.

Overall, the plurality of differential pixels within the differential PA image may include a first subset of differential pixels originating from locations that do not contain at least one RS-PA probe, in which each differential pixel has a relatively low pixel value. The differential PA image may further include a second subset of differential pixels originating from locations that do contain at least one RS-PA probe, in which each differential pixel value within the second subset is essentially the difference between the first pixel value produced by RS-PA probes in the first (highly absorptive) state and the second (less absorptive) state at each location. In an aspect, the magnitude of the differential pixel values may depend on the switching contrast of the RS-PA probe. As used herein, "switching contrast" refers to the ratio between the PA signal amplitudes acquired from the RS-PA probe in the first (highly absorptive) state and the second (less absorptive) state. As described in further detail herein below, the switching contrast is an emergent property of each particular type of RS-PA probe that may be influenced by a variety of factors including, but not limited to: the chemical structure of the RS-PA probe, the depth of a RS-PA probe within the region of interest, and characteristics of the laser pulse used to elicit a PA signal from the region of interest, such as pulse wavelength, pulse duration, and/or pulse fluence.

Figure 14:
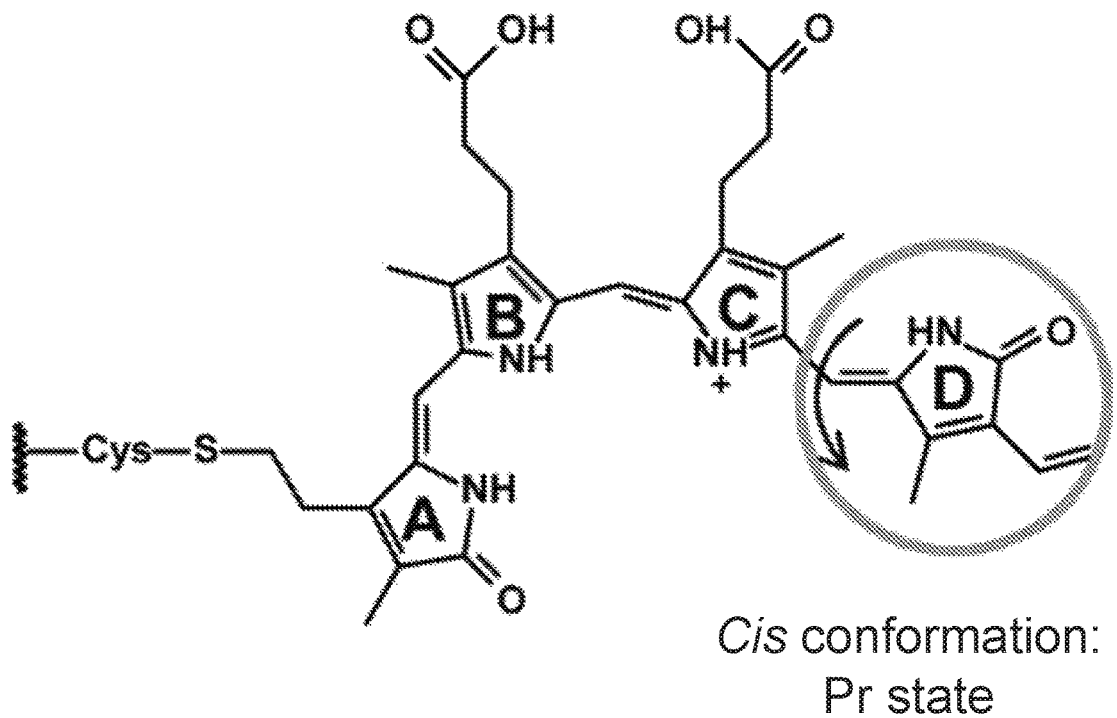
FIG. 14 shows a diagram of the chemical structure of biliverdin chromophore in a cis conformation of a non-fluorescent bacterial phytochrome BphP1 (Pr or OFF state).

In one aspect, the differential PA image obtained at step 110 may be superimposed over the first or second PA image obtained at step 108 to enable the visualization of the distribution of RS-PA probes in the context of the surrounding background cells, objects, and/or tissues within the region of interest. By way of non-limiting example, FIG. 14 illustrates a differential PAT image of tumor cells expressing an RS-PA probe, obtained using the RS-PA methods described herein above, superimposed over a conventional PAT image of an identical region of interest within a mouse kidney.

Figure 2:
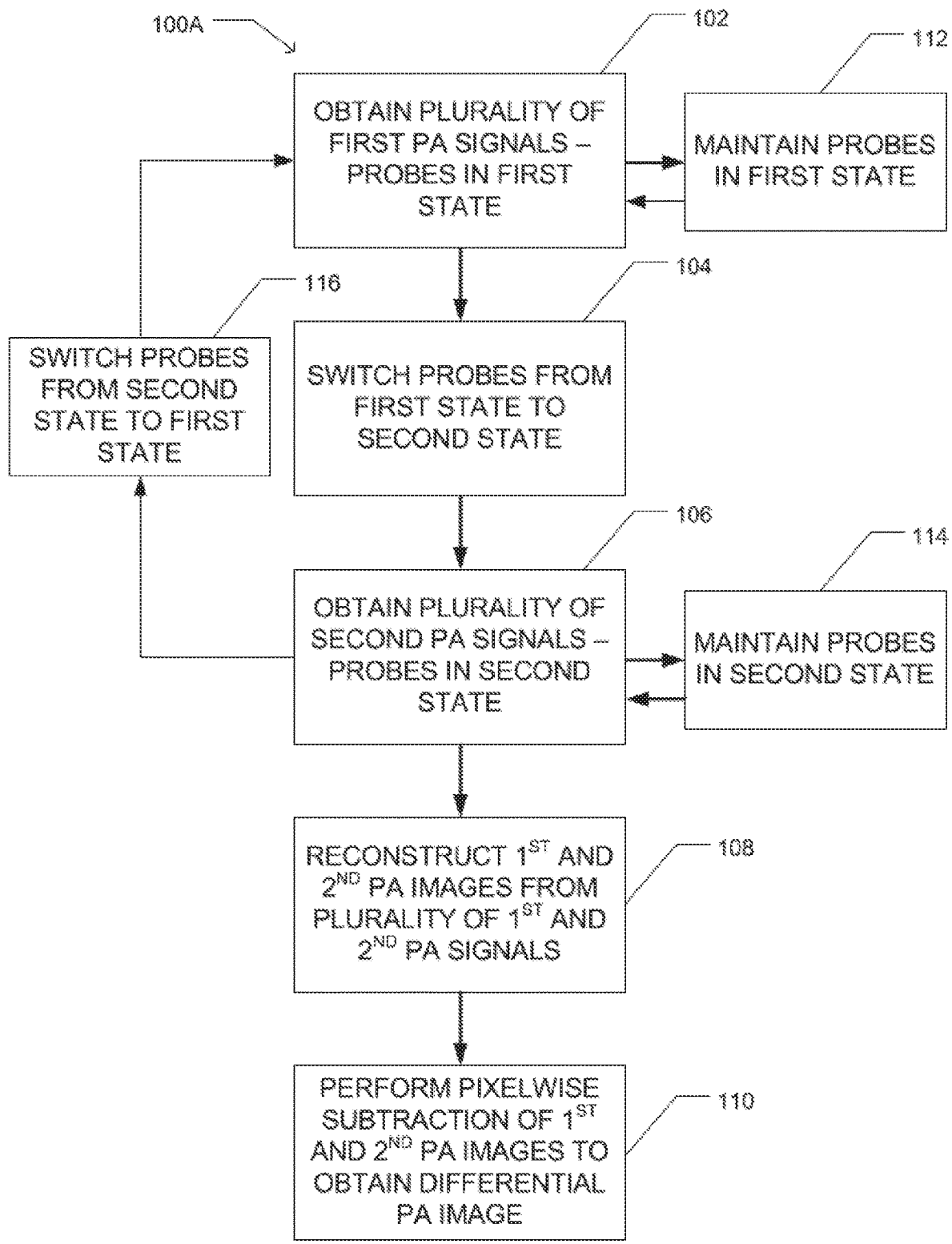
FIG. 2 shows a flow chart illustrating a method of reversibly-switchable photoacoustic imaging of a region of interest according to another aspect of the present disclosure.

FIG. 2 is a flow chart summarizing a method 100A of obtaining an image of a region of interest using RS-PA imaging in another aspect. In this other aspect, the method 100A may incorporate one or more additional step into the method 100 summarized in FIG. 1 to enable compatibility with various types of RS-PA probes and/or to enhance the resolution and/or sensitivity of the resulting RS-PA image.

Referring to FIG. 2, the method 100A may include obtaining a plurality of first PA signals at step 102 in a manner similar to step 102 described herein previously with respect to the method 100 summarized in FIG. 1. In addition, the method 100A may further include obtaining at least one additional plurality of first PA signals at step 102. In this aspect, each of the at least one additional pluralities of first PA signals represent first PA signals from throughout the region of interest that may be reconstructed using conventional PA reconstruction methods into a first PA image at step 108.

In one aspect, at least one additional plurality of first PA signals is obtained at step 102. In various other aspects, at least two, at least three, at least four, at least five, at least seven, at least nine, at least fourteen, at least nineteen, at least twenty-nine, at least thirty-nine, at least forty-nine, and at least ninety-nine additional pluralities of first PA signals are obtained at step 102.

In various aspects, each plurality of first PA signals obtained at step 102 may be reconstructed into a first PA image at step 108, and the first pixel values of each first PA image reconstructed from each plurality of first PA signals may be averaged together with each corresponding first pixel values from each of the other first PA images reconstructed at step 108 to obtain an averaged first PA image.

Referring again to FIG. 2, the method 100A may further include obtaining a plurality of second PA signals at step 106 after switching the plurality of RS-PA probes from the first state to the second state at step 106. In one aspect, the method 100A may further include obtaining at least one additional plurality of second PA signals at step 106. In this aspect, each of the at least one additional pluralities of second PA signals represent second PA signals from throughout the region of interest that may be reconstructed using conventional PA reconstruction methods into a second PA image at step 108. In various other aspects, at least two, at least three, at least four, at least five, at least seven, at least nine, at least fourteen, at least nineteen, at least twenty-nine, at least thirty-nine, at least forty-nine, and at least ninety-nine additional pluralities of second PA signals are obtained at step 106.

In various aspects, each plurality of second PA signals may be reconstructed into a separate second PA image at step 108 and the second pixel values of each second PA image reconstructed from each plurality of second PA signals may be averaged together with the corresponding second pixel values from each of the other second PA images reconstructed at step 108 to obtain an averaged second PA image.

Without being limited to any particular theory, the pixel-wise averaging of two or more PA images obtained under essentially identical conditions may reduce artifacts or noise introduced by minor variations such as random motion of objects within the region of interest, other movements of objects within the region of interest due to breathing or other movements, variation or repeatability of positions due to variability of the scanning device, and any other artifacts or noise inherent to the acquisition of PA signals from the region of interest.

In other aspects, the plurality of RS-PA probes may be configured to switch from the first state to the second state in response to illumination by a laser pulse at the wavelength used to obtain the first and second PA signals from the region of interest, as described herein below. In some of these other aspects, the plurality of RS-PA probes may have a first state that is not sufficiently stable to sustain itself while obtaining the plurality of first PA signals and/or at least one additional plurality of first PA signals at step 102. Referring again to FIG. 2, the method 100A may further include maintaining the plurality of RS-PA probes in the first state at step 112 while obtaining the one or more pluralities of first PA signals at step 102. The plurality of RS-PA probes may be maintained in the first state by any known means appropriate to the particular structure and function of the RS-PA probes within the region of interest. By way of non-limiting example, the plurality of RS-PA probes within the region of interest may be illuminated with at least one laser pulse of a second pulse wavelength different from the first pulse wavelength used to obtain the plurality of first PA signals in order to maintain the plurality of RS-PA probes in the first state at step 112. In this non-limiting example, the second pulse wavelength may be selected based on the properties of the RS-PA probes within the region of interest. In one aspect, the second pulse wavelength may be selected to produce a conformation change in the plurality of RS-PA probes within the region of interest associated with a switch from the second state to the first state.

In other aspects, the plurality of RS-PA probes may be configured to switch from the second state to the first state in response to illumination by a laser pulse at the wavelength used to obtain the first and second PA signals from the region of interest, as described herein below. In other aspects, the plurality of RS-PA probes may have a second state that is not sufficiently stable to sustain itself while obtaining the plurality of second PA signals and/or at least one additional plurality of second PA signals at step 106. Referring again to FIG. 2, the method 100A may further include maintaining the plurality of RS-PA probes in the second state at step 114 while obtaining the one or more pluralities of second PA signals at step 106. The plurality of RS-PA probes may be maintained in the second state by any known means appropriate to the particular structure and function of the RS-PA probes within the region of interest. By way of non-limiting example, the plurality of RS-PA probes within the region of interest may be illuminated with at least one laser pulse of a third pulse wavelength different from the first pulse wavelength used to obtain the plurality of second PA signals in order to maintain the plurality of RS-PA probes in the second state at step 114. In this non-limiting example, the third pulse wavelength may be selected based on the properties of the RS-PA probes within the region of interest. In one aspect, the third pulse wavelength may be selected to produce a conformation change in the plurality of RS-PA probes within the region of interest associated with a switch from the first state to the second state.

Figure 7:
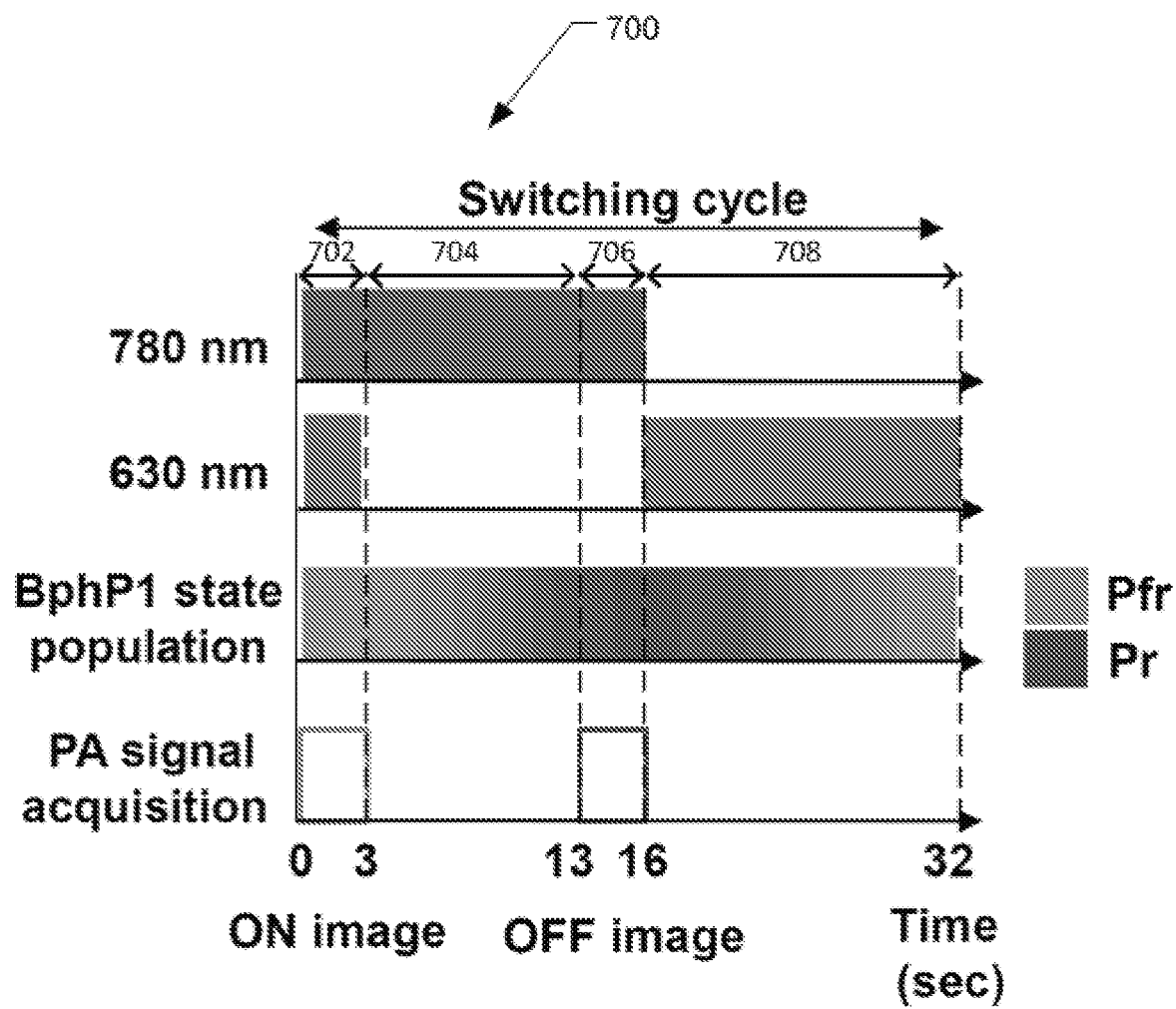
FIG. 7 shows a schematic diagram illustrating the timing of illumination by laser pulses of two wavelengths by a RS-PAM system according to one aspect of the present disclosure.
Figure 22:
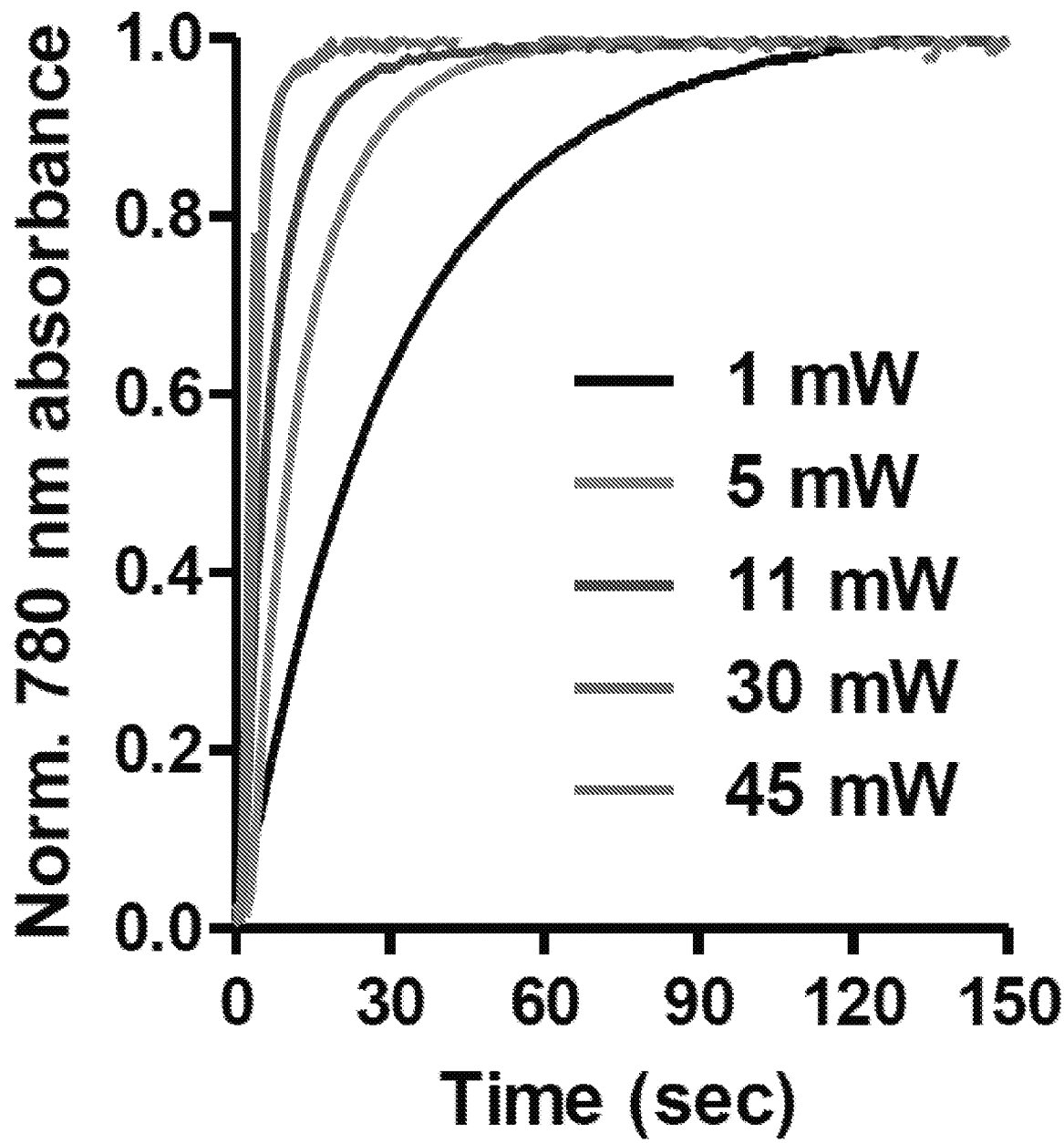
FIG. 22 shows a graph summarizing the rate of change in absorbance by non-fluorescent bacterial phytochrome BphP1 of laser pulses delivered at a pulse wavelength of 630 nm light at different power levels.

In various aspects, switching of the plurality of RS-PA probes from the first state to the second state, or vice versa may be conducted according to a predetermined switching schedule. By way of non-limiting example, FIG. 7 illustrates a switching schedule 700 associated with RS-PA imaging using BphP1 RS-PA probes situated within the region of interest. Referring to FIG. 7, the switching cycle 700 includes a first interval 702 during which the region of interest is illuminated with both 780 nm pulses to elicit PA signals from the region of interest as well as 630 nm pulses to maintain the RS-PA probes in the first (ON) state, characterized by strong absorbance of 780 nm light. During this first interval 702, one or more pluralities of first PA signals may be obtained as described herein previously. Typically, the region of interest is illuminated by 780 nm pulses used to obtain a plurality of first PA signals alternating with illumination using one or more 630 nm pulses to revert any RS-PA probes from the second (OFF) state back to the first (ON) state. In various aspects, the illumination by the 630 nm pulses is specified to ensure that essentially all RS-PA probes in the region of interest are configured in the first (ON) state prior to obtaining additional first PA signals using a subsequent 780 nm pulse. In these various aspects, one or more characteristics of the 630 nm illumination may be modulated to ensure that all RS-PA probes are maintained in the first state including, but not limited to: laser pulse fluence, pulse length, number of pulses, and any other relevant characteristic of the 630 nm illumination. By way of non-limiting example, increasing the pulse fluence to higher power levels may decrease the time needed to revert a plurality of RS-PA probes from a second (OFF) state to a first (ON) state, as illustrated in FIG. 22. In various other aspects, if the RS-PA probes used for RS-PA imaging do not switch states during illumination by the laser pulses used to obtain the plurality of first PA signals, the illumination by the second (630 nm) wavelength may be omitted.

Referring again to FIG. 7, the switching cycle 700 may further include a second interval 704 during which the region of interest is illuminated only 780 nm pulses to switch the RS-PA probes from the first (ON) state to the second (OFF) state. For the BphP1 RS-PA probes, the 780 nm light is used not only to obtain each plurality of first and second PA signals, but is also used to switch the plurality of RS-PA probes from the first (ON) state to the second (OFF) state. In this aspect, one or more characteristics of the 630 nm illumination during the second interval 704 of the switching cycle 700 may be modulated to ensure that essentially all RS-PA probes in the region of interest are switched to the second state including, but not limited to: laser pulse fluence, pulse length, number of pulses, and any other relevant characteristic of the 780 nm illumination. In various other aspects, if the RS-PA probes used to conduct RS-PA imaging switch from the first state to the second state in response to illumination by a third wavelength that is different from the first (780 nm) wavelength used to obtain PA signals or the second (630 nm) wavelength used to switch the RS-PA probes from the second state to the first state, the second interval 704 may include illumination with this third wavelength instead of with the first (780 nm) wavelength as shown in FIG. 7.

Referring again to FIG. 7, the switching cycle 700 may further include a third interval 706 during which the region of interest is illuminated by 780 nm pulses to obtain one or more pluralities of second PA signals from the region of interest containing RS-PA probes configured in the second (OFF) state. For the BphP1 RS-PA probes, the 780 nm light is used not only to obtain each plurality of first and second PA signals, but is also used to maintain the plurality of RS-PA probes in the second (OFF) state. In this aspect the characteristics of the 780 nm illumination during the third interval 706 of the switching cycle 700 are typically matched to the characteristics of the 780 nm illumination used to obtain each plurality of first PA signals during the first interval 702 to enable consistent system parameters used to obtain each plurality of first PA signals and each plurality of second PA signals as described herein above.

Referring again to FIG. 7, the switching cycle 700 may further include a fourth interval 708 during which the region of interest is illuminated by 630 nm pulses to switch the RS-PA probes from the second (OFF) state to the first (ON) state. In this aspect, one or more characteristics of the 630 nm illumination during the second interval 704 of the switching cycle 700 may be modulated to ensure that essentially all RS-PA probes in the region of interest are switched to the first state including, but not limited to: laser pulse fluence, pulse length, number of pulses, and any other relevant characteristic of the 630 nm illumination. In various other aspects, if the RS-PA probes used to conduct RS-PA imaging switch from the second state to the first state in response to illumination by a wavelength different from the 630 nm wavelength used to switch BphP1 RS-PA probes from the second state to the first state, this other wavelength may be substituted during the fourth interval 708.

By way of non-limiting example, a switching cycle may begin with 16 s of 780 nm light illumination to enable PA imaging and switching the BphP1 RS-PA probe from a first (ON) state to a second (OFF) state, followed by 16 s of 630 nm light illumination for switching the BphP1 RS-PA probe from a second (OFF) state to a first (ON) state. During the first 3.2 s of the 780 nm illumination, the 630 nm light may be concurrently introduced to maintain the BphP1 RS-PA probe population in the first (ON) state by reversing any probes in the second state back to the first state. The plurality of first PA signals acquired during the first 3.2 s of the 780 nm light illumination are used to reconstruct the first PA image, and the plurality of second PA signals acquired during the last 3.2 s of the 780 nm light illumination are used to construct the second PA image.

In various aspects, each plurality of first and second PA signals and each additional plurality of first and second PA signals may be obtained in any sequence and/or timing without limitation. By way of one non-limiting example, a plurality of first PA signals and all additional pluralities of first PA signals may be obtained prior to obtaining a plurality of second PA signals and all additional pluralities of second PA signals. By way of another non-limiting example, a first subset of the plurality of first PA signals may be obtained, followed by obtaining a corresponding first subset of the plurality of second PA signals, followed by obtaining a second subset of the plurality of first PA signals may be obtained, followed by obtaining a corresponding first subset of the plurality of second PA signals. Other combinations of sequences of obtaining first and second PA signals may be used in various aspects without limitation.

In other aspects, the method of reversibly-switchable photoacoustic (RS-PA) imaging may be performed using any existing photoacoustic imaging device without limitation, so long as modifications are made to the existing photoacoustic imaging device as described herein below. In these various aspects, at least a portion of the modifications made to an existing photoacoustic imaging device may control the switching of the plurality of RS-PA probes from the first state to the second state and vice versa, as well as the timing of this switching with respect to obtaining first and second PA signals from the region of interest.

II. System for Reversibly-Switchable Photoacoustic Imaging

Figure 3:
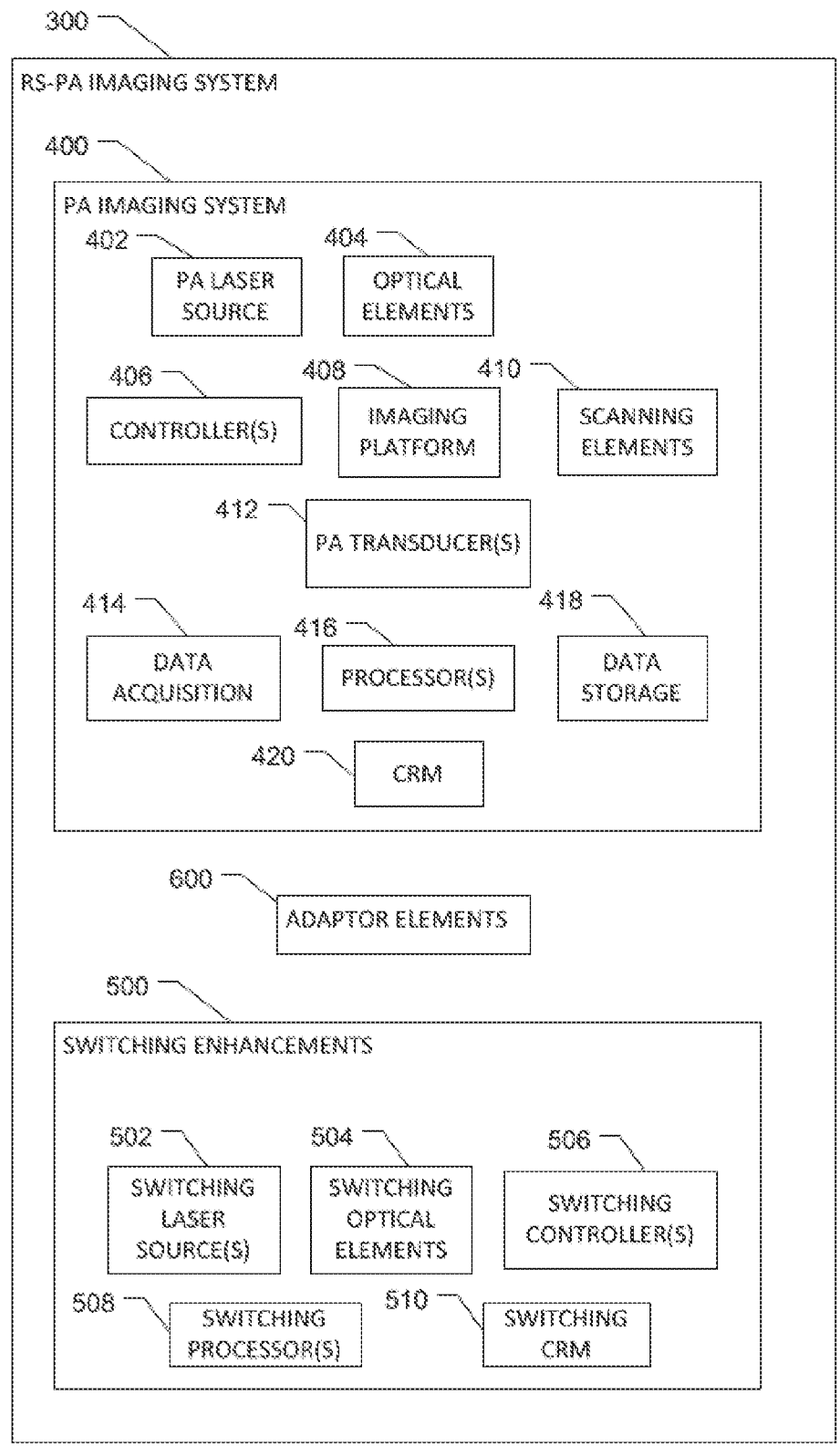
FIG. 3 shows a block diagram illustrating the elements of an RS-PA imaging system according to one aspect of the present disclosure.
Figure 4:
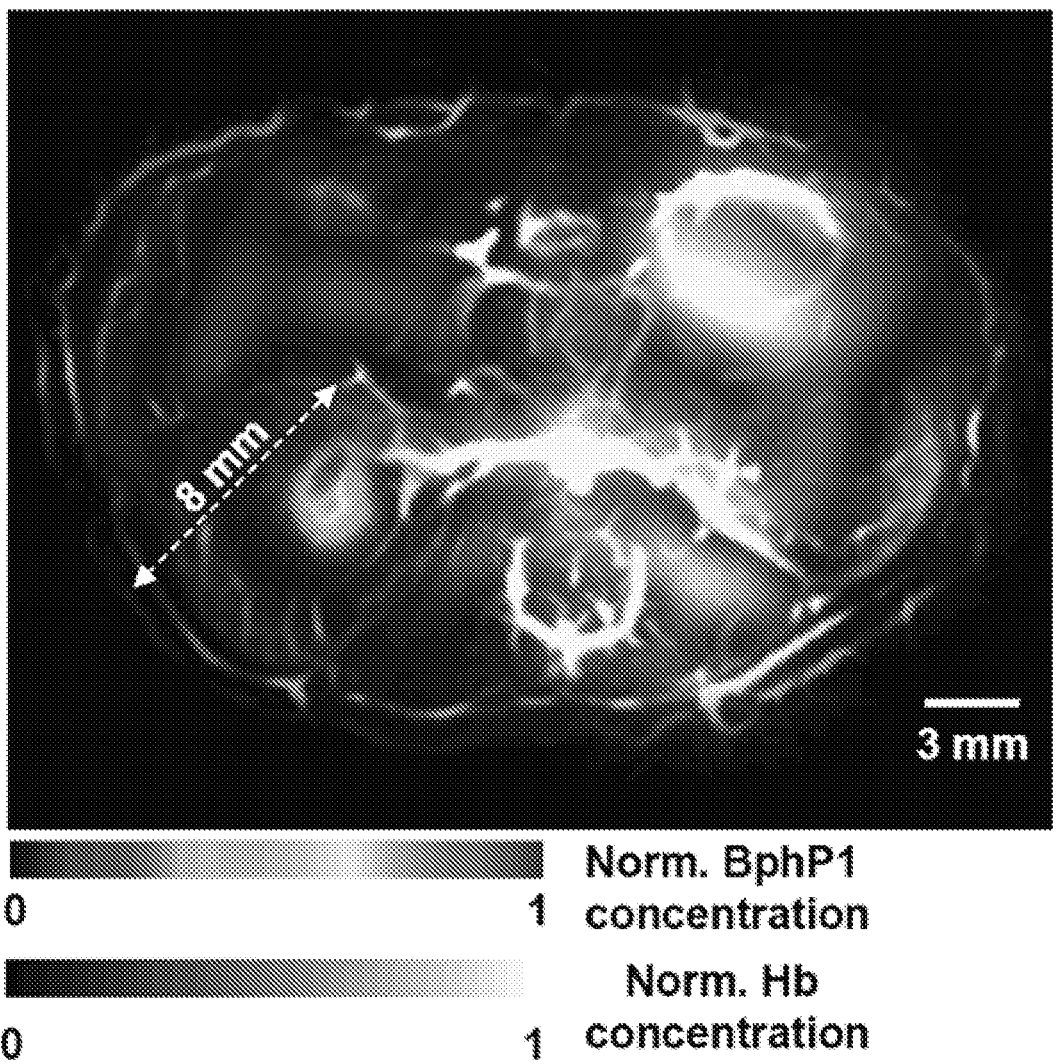
FIG. 4 shows a reversibly-switchable photoacoustic tomography (RS-PAT) image of U87 tumor cells expressing BphP1 reversibly-switchable photoacoustic probe within a kidney region of a nude mouse according to one aspect of the present disclosure. The RS-PAT image is shown overlaid with a conventional photoacoustic tomography (PAT) image obtained with the BphP1 probes configured in an OFF (low light-absorbing) state.

A reversibly-switchable photoacoustic (RS-PA) imaging system may be used in an aspect to implement the RS-PA imaging methods as described herein above. FIG. 3 is a block diagram illustrating the elements of an RS-PA imaging system 300 in one aspect. In this one aspect, the RS-PA imaging system 300 includes various elements and/or devices of a conventional PA imaging system 400 configured to obtain and process PA signals used to reconstruct a PA image according to existing methods. In addition, the RS-PA imaging system 300 includes one or more switching enhancements 500 associated with enabling the switching of the plurality of RS-PA probes within the region of interest from the first state to the second state and vice-versa during the process of RS-PA imaging as well as enabling any additional data acquisition, data conditioning, and/or data processing associated with implementing the RS-PA imaging methods as described herein above. The elements of the switching enhancements may be operatively coupled with the corresponding elements of the conventional PA imaging system 400 by means of one or more adaptor elements 600.

In various aspects, the RS-PA imaging system 300 may be an integrated system in which the PA imaging system 400 and the switching enhancements 500 are provided in a single dedicated device designed specifically to enable the imaging of a region of interest using RS-PA imaging methods. In various other aspects, the RS-PA imaging system 300 may be provided as an existing conventional PA system 400 retrofitted with the switching enhancements 500. Any existing conventional PA imaging system 400 may be retrofitted with the switching enhancements 500 to produce the RS-PA imaging system 300 in these various other aspects. Non-limiting examples of conventional photoacoustic imaging systems 400 suitable for retrofitting with the switching enhancements 500 to produce the RS-PA imaging system 300 include: acoustic-resolution photoacoustic devices, optical-resolution photoacoustic devices, hand-held photoacoustic devices, catheter-based photoacoustic devices, combination imaging devices such as photoacoustic/ultrasound imaging devices, photoacoustic/fluorescent microscopes, or any other known photoacoustic imaging devices. In these various other aspects, the RS-PA imaging system 300 may include adaptor elements 600 to facilitate the operative coupling of the elements of the PA imaging system 400 and the switching enhancements 500.

Referring again to FIG. 3, an RS-PA imaging system 300 for obtaining an image using a reversibly-switchable photoacoustic (RS-PA) imaging method may include one or more reversible switching enhancements 500 configured to enable the reversible switching of the plurality of RS-PA probes within the region of interest from the first state to the second state and vice-versa according to a pre-determined sequence and timing coordinated with the operation of the imaging elements configured to obtain the pluralities of first and second PA signals from the region of interest as described herein above using the elements of the PA imaging system 400. The one or more switching enhancements 500 may be selected according to the particular switching means of the RS-PA probes to be imaged within the region of interest. Non-limiting examples of suitable switching elements include: one or more additional laser sources and associated optics, one or more means of applying an electric field to the region of interest, one or more means of applying a magnetic field to the region of interest, and any other element suitable for reversibly switching a RS-PA probe from a first state to a second state and vice-versa.

In one non-limiting example, as illustrated in FIG. 3, the switching enhancements 500 may include one or more switching laser sources 502 and associated switching optical elements 504 to generate switching laser pulses at pulse wavelengths suitable for switching the plurality of RS-PA probes in the region of interest from the first to the second state and/or from the second state to the first state. In addition, the one or more switching laser sources 502 may further produce PA laser pulses for eliciting PA signals from the plurality of RS-PA probes within the region of interest. By way of non-limiting example, one switching laser source 502 may be a wavelength-tunable laser source to enable the switching laser source 502 to produce a PA laser pulse selected to coincide with a wavelength of maximum absorption of a RS-PA probe configured in a first or second state. If more than one RS-PA probe compound is situated within the region of interest, the switching enhancements 500 may include one or more switching laser sources 502 and associated switching optical elements 504 configured to generate laser pulses at one or more pulse laser wavelengths suitable for reversibly switching the first RS-PA probe compound, the second RS-PA probe compound, and any additional RS-PA probe compounds within the region of interest from the first state to the second state and/or vice-versa. In various aspects, the one or more switching laser sources 502 may be pulsed or continuous wave (CW) lasers.

In one aspect, the one or more switching laser sources 502 may include multiple single wavelength laser sources, in which each laser source is configured to produce switching laser pulses at a single laser pulse wavelength selected to enable the switching of a single SR-PA probe compound from a first state to a second state, or vice versa. Non-limiting examples of single wavelength laser sources suitable for incorporation into the RS-PA imaging system 300 as a switching laser source 502 includes: diode lasers, and dye lasers. In another aspect, the one or more switching laser sources 502 may include at least one tunable switching laser source capable of producing switching pulses over a range of laser pulse wavelengths, thus enhancing the compatibility of the RS-PA imaging system 300 with a variety of RS-PA probes characterized by a range of switching pulse wavelengths. Non-limiting examples of tunable laser sources suitable for use as a switching laser source 502 includes a tunable dye laser pumped by an Nd:YLF laser, an optical parametric oscillator (OPO) pumped by a Ti:Sapphire laser, and any other known tunable laser source.

In various aspects, the switching optical elements 504 are configured to deliver the one or more switching laser pulses to the region of interest as described herein. In one aspect, described in additional detail herein below, the switching optical elements 504 may function independently of the optical elements 404 of the conventional PA imaging system 400. In another aspect, the switching elements 504 may operate, along with one or more adaptor elements 600, to deliver the one or more switching pulses to the optical elements 404 of the conventional PA imaging system 400. In this other aspect, the optical elements 404 may deliver both the PA pulses from the PA laser source 402 and the switching pulses from the switching laser source 502. In yet another aspect, the optical elements 404 and the switching optical elements 504 may be integrated so that a single assemblage of optical elements directs both the PA pulses from the PA laser source 402 and the switching pulses from the switching laser source 502 to the region of interest. Non-limiting examples of suitable switching optical elements 504 include: optical fibers, lenses, prisms and/or mirrors to converge the laser light towards a focus volume within the region of interest.

Referring again to FIG. 3, the switching enhancements may further include one or more switching controllers 506 configured to control the operation of the one or more switching laser sources 502 and associated switching optical elements 504 and to enable the RS-PA imaging method described herein. In one aspect, the one or more switching controllers 506 may be provided as separate elements of the switching enhancements 500 and may function independently of the one or more controllers 406 of the conventional PA imaging system 400. In another aspect, the one or more switching controllers 506 may be operatively coupled to the one or more controllers 406 of the conventional PA imaging system 400. In this other aspect, the one or more switching controllers 506 control the operation of the one or more switching laser sources 502 via the one or more controllers 406, which may be operatively coupled to both the PA laser source 402 and the switching laser source 502. In an additional aspect, the one or more switching controllers 506 may be integrated with the one or more controllers 406 so that the one or more controllers 406 control the operation of both the PA laser source 402 and the switching laser source 502.

Referring again to FIG. 3, the switching enhancements may further include one or more switching processors 508 and associated switching computer-readable media (CRM) 510. The switching computer-readable media (CRM) 510 may include one or more instructions executable by the one or more switching processors 508 to perform one or more data processing functions associated with imaging a region of interest using the RS-PA methods described herein. Non-limiting examples of the one or more data processing functions in this aspect include: averaging one or more pluralities of PA signals obtained from the region of interest with the plurality of RS-PA probes configured in a first state or a second state; obtaining the plurality of differential signals; overlaying a RS-PA image over a reference conventional PA image; and any other data processing functions associated with imaging a region of interest using the RS-PA methods described herein. In another aspect, the one or more switching processor(s) 508 and associated switching CRM 510 may be integrated with the one or more processor(s) 416 and associated CRM 420 of the conventional PA imaging system 400. In this other aspect, the CRM 420 may include one or more instructions executable on the one or more processors 416 to perform data processing associated with conventional PA imaging as well as additional data processing associated with imaging a region of interest using the RS-PA methods.

Referring again to FIG. 3, the switching enhancements 500 may be integrated with the conventional PA imaging system 400 using one or more adaptor elements 600 to operatively couple one or more elements of the switching enhancements 500 with the corresponding elements of the conventional PA imaging system 400 in a reversible manner to assemble the RS-PA imaging system 300. In this one aspect, the one or more adaptor elements may operatively couple to the elements of the conventional PA imaging system 400 in a non-invasive manner such that the RS-PA imaging system 300 may continue to conduct conventional PA imaging methods as before by deactivating the elements of the switching enhancements 500 and/or adaptor elements 600. Non-limiting examples of suitable adaptor elements 600 include: optical connectors to operatively connect the switching optical elements 504 to the corresponding optical elements 404; electrical connectors or other electronic elements or circuitry to operatively connect the one or more switching controllers 506 to the corresponding one or more controllers 406; electrical connectors or other electronic elements or circuitry to operatively connect the one or more switching processors 508 to the corresponding one or more processors 508; and electrical connectors or other electronic elements or circuitry to operatively connect the switching computer-readable media (CRM) 510 to the corresponding CRM 420.

By way of non-limiting example, the adaptor elements 600 of the RS-PA imaging system 300 may include an optic fiber adaptor (not shown) to introduce the switching laser pulses produced by the switching laser source 502 and carried by the switching optical elements 504 into the corresponding optical elements 404 such that the switching laser pulses are carried by the optical elements 404 along the same path taken by the PA laser pulses produced by the PA laser source 402. In this non-limiting example, the RS-PA imaging system 300 may be operated as a conventional PA imaging system 400 by deactivating the switching laser sources 502, blocking or disconnecting the optic fiber adaptor and/or switching optical elements 504, or any other means of disrupting the delivery of the switching laser pulses to the region of interest.

As described herein above, the conventional PA imaging system 400 is configured to obtain a plurality of PA signals from a region of interest for use in reconstructing an image using RS-PA methods. Referring to FIG. 3, the PA imaging system 400 of the RS-PA imaging system 300 includes a PA laser source 402 to produce PA laser pulses at a first wavelength used to elicit both first and second PA signals from the region of interest as described herein above. The PA laser source 402 may be operatively coupled to one or more optical elements 404 that direct the PA laser pulses produced by the PA laser source 402 into the region of interest. The PA imaging system 400 may further include one or more PA transducers 412 to receive the plurality of first and second PA signals elicited by one or more objects within the region of interest in response to illumination by the PA laser pulse. In various aspects, these one or more objects within the region of interest may include a plurality of RS-PA probes as described herein. The region of interest to be imaged may be situated on an imaging platform 408 operatively coupled with the optical elements 404 and the one or more PA transducers 412.

The elements of the PA imaging system 400 are configured to obtain a plurality of PA signals produced by one or more structures within the region of interest, and to reconstruct a PA image by processing the plurality of PA signals using known image reconstruction methods. In use, the optical elements 404 of the PA imaging system 400 may direct one or more PA laser pulses produced by the PA laser source 402 to illuminate a focus volume within the region of interest situated on the imaging platform 408. Pressure waves induced by optical absorption of the one or more PA laser pulses by the structures within the region of interest may be received in the form of a plurality of PA signals by the one or more PA transducers 412. The received plurality of PA signals may be processed to reconstruct an image of the structures within the region of interest.

In other aspects, the one or more PA laser pulses produced by the PA laser source 402 may be focused by one or more optical elements 404. Non-limiting examples of suitable optical elements include: optical fibers, lenses, prisms and/or mirrors to converge the laser light towards a focus volume within the region of interest. In one aspect, the focus volume of the one or more optical elements 404 may be coincident with the focal point of the one or more ultrasonic transducers 412.

Without being limited to any particular theory, the location and extent of the focal region illuminated by the one or more PA laser pulses and the location and extent of the focal region of the at least one PA transducers 412 may influence the resolution of the PA images reconstructed by the PA imaging system 400 as well as the scanning time over which the plurality of PA signals sufficient to reconstruct a PA image may be obtained. In particular, the extent and location of the volume illuminated by the at least one laser pulse relative to the extent and location of the volume from which PA signals are received may influence the image acquisition speed and resolution. In various aspects, the optical elements 404 and the at least one PA transducer 412 may be selected to acquire PA images at a desired image acquisition speed and resolution.

In various aspects, the one or more PA laser pulses may illuminate a relatively large volume of the region of interest and each of the one or more PA transducers 412 may focus on a smaller sub-region of the illuminated volume. In these various aspects, the one or more PA transducers 412 may be focused ultrasound transducers including, but not limited to a curved ultrasonic transducer with a hemispherical surface, a planar ultrasonic transducer with an acoustic lens attached, or an electronically focused ultrasonic array transducer. In one aspect, the one or more PA transducers 412 may be a transducer array including, but not limited to a linear transducer array, a semi-circular ring array, a ring array, a planar transducer array, a semi-cylindrical transducer array, a cylindrical transducer array, a semi-spherical transducer array, or a spherical transducer array. In another aspect, at least a portion of the scanning elements 410 may be used to translate the one or more PA transducers 412 relative to the region of interest in order to detect PA signals originating from throughout the region of interest.

In various aspects, the transducer array may be a linear or ring array with which the two-dimensional (2D) in-plane spatial distributions and strength of ultrasonic (photoacoustic) sources can be reconstructed based on the time-resolved PA signals arriving at the array. In various other aspects, the transducer array may be a planar, cylindrical, or spherical array with which the 3D spatial distributions and strength of photoacoustic sources can be reconstructed based on the time-resolved PA signals arriving at the array. In one aspect, all transducers in the transducer array may receive PA signals elicited by a single PA laser pulse, resulting in relatively rapid acquisition of a plurality of PA signals sufficient to reconstruct a PA image of the region of interest. In another aspect, a sub-set of the transducers of the transducer array may receive PA signals elicited by a single PA laser pulse to enhance compatibility with other system elements including, but not limited to, the data acquisition element 414 of the PA imaging system 418, which may have limited data receiving capacity.

The signal recording may include digitizing the received acoustic waveforms associated with the PA signals and transferring the digitized acoustic waveforms to a computer for analysis. The image of the region of interest may be reconstructed from the recorded acoustic waveforms.

Referring again to FIG. 3, the PA imaging system 400 may further include one or more scanning elements 410 to move any one or more of the PA laser source 402, the one or more optical elements 404, the one or more PA transducers 416, and/or the imaging platform 408 in various aspects. In one aspect, if the PA imaging system 400 enables photoacoustic tomography (PAT) methods, the one or more scanning elements 410 may be configured to translate the imaging platform 408 containing the region of interest relative to the PA laser source 402 and/or one or more PA transducers 412 along a translation direction to enable the imaging of multiple planes within the region of interest perpendicular to the translation direction. In this aspect, the imaging platform 408 may be translated along the translation direction past a stationary PA laser source 402 and/or one or more stationary PA transducers 412 or vice versa. In this one aspect, the 2D PA images obtained at each of the multiple planes along the direction of translation may be combined using known methods to obtain a 3D PA image.

Figure 5:
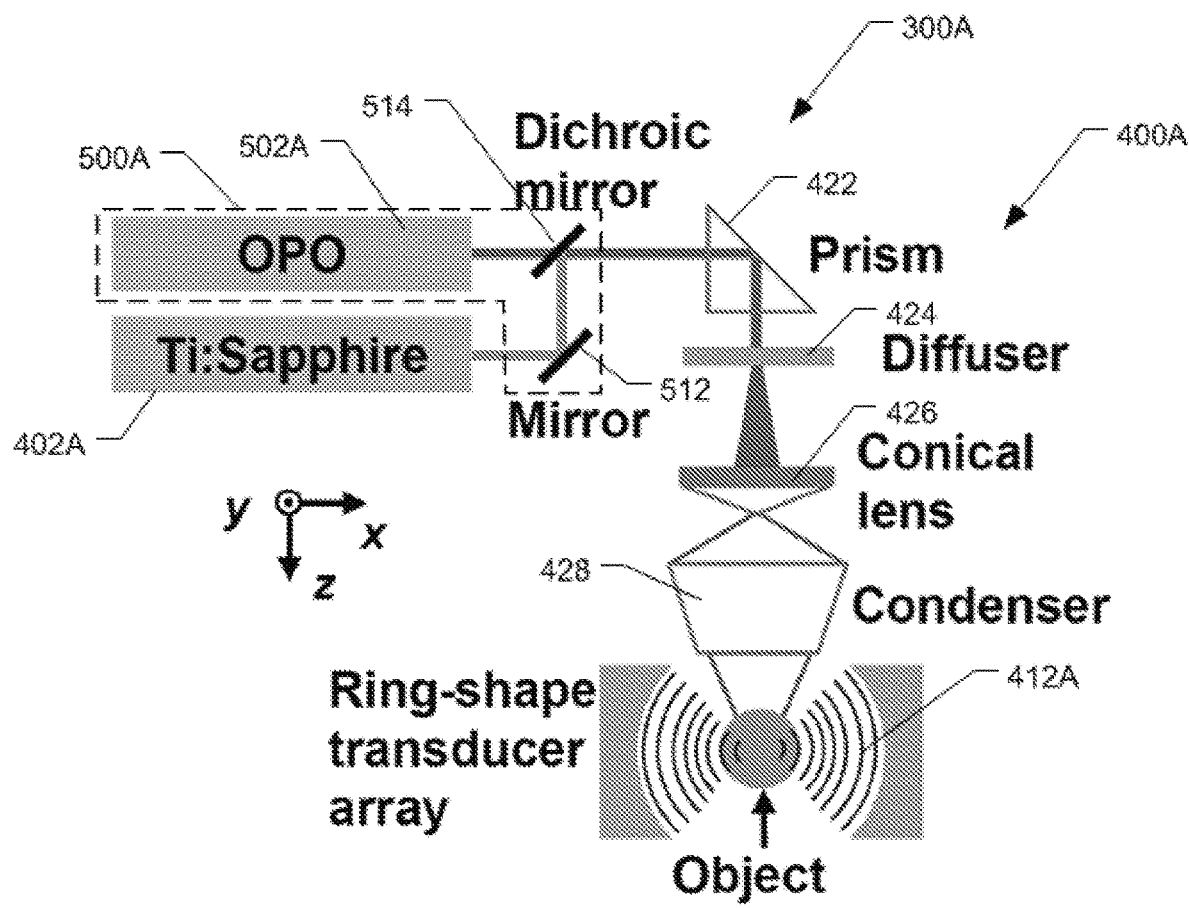
FIG. 5 shows a schematic diagram of a system used to conduct reversibly-switchable photoacoustic tomography (RS-PAT) according to one aspect of the present disclosure.

FIG. 5 is a schematic diagram of a reversibly switchable photoacoustic tomography (RS-PAT) system 300A in one aspect. An existing whole-body photoacoustic tomography (PAT) system 400A was retrofitted using several elements of the switching enhancements 500A within the dashed box in FIG. 5. The switching enhancements include a tunable optical parametric oscillator (OPO) laser 502A pumped by an Nd:YAG laser with a 10 Hz pulse repetition rate (not shown) to produce PA laser pulses and switching laser pulses at pulse wavelengths ranging from 400-900 nm. A Ti:Sapphire laser 402A, also pumped by an Nd:YAG laser with a 10 Hz pulse repetition rate (not shown) provided PA pulses in a synchronized manner. The laser beams produced by the two lasers 402A/502A are combined by a mirror 512 and dichroic mirror 514, and their incident fluences (in mJ/cm$^2$) are measured by an optical power meter (not shown). The combined laser beam may be directed by a prism 422 to an optical diffuser 424, and the homogenized beam may then pass through a conical lens 426 to form a ring-shaped light pattern. The light is then passed through an optical condenser 428 to form a ring-shape light band around the animal's trunk. The light incident area may be aligned slightly above the acoustic focal plane to ensure sufficient light diffusion. The thickness of the light band may be about 5 mm, and the diameter of the light band may be about 2-3 cm. The maximum light fluence on the skin of the animal may be about 8 mJ/cm$^2$, well below the American National Standards Institute (ANSI) safety limit.

Referring again to FIG. 5 system RS-PA system 300A may further include a full-ring ultrasonic transducer array 412A to detect photoacoustic signals. In one non-limiting example, the full-ring ultrasonic transducer array 412A may have a 5 cm diameter, 5 MHz central frequency, more than 80% one-way bandwidth, and 512 elements. In one non-limiting example, each element of the full-ring ultrasonic transducer array 412A (10 mm height, 0.3 mm pitch, and 0.1 mm inter-element space) may be cylindrically focused to produce an axial focal distance of 19.8 mm (acoustic numerical aperture: 0.25). In this non-limiting example, the combined foci of all 512 elements of the transducer array 412A form an approximately uniform imaging region with a 20 mm diameter and 1 mm thickness. Within this region, the radial resolution is 100 μm, and the tangential resolution is 100-250 µm. In an aspect, the transducer array 412A may be operatively coupled to a data acquisition system (not shown) with 64 channels and 8-fold multiplexing. In one non-limiting example, the cross-sectional imaging speed using the system described in FIG. 5 may be 1.6 s per frame. In an aspect, the elevational resolution of the RS-PAT system may be enhanced using 3D image reconstruction methods and high-frequency ultrasound detection.

Figure 6:
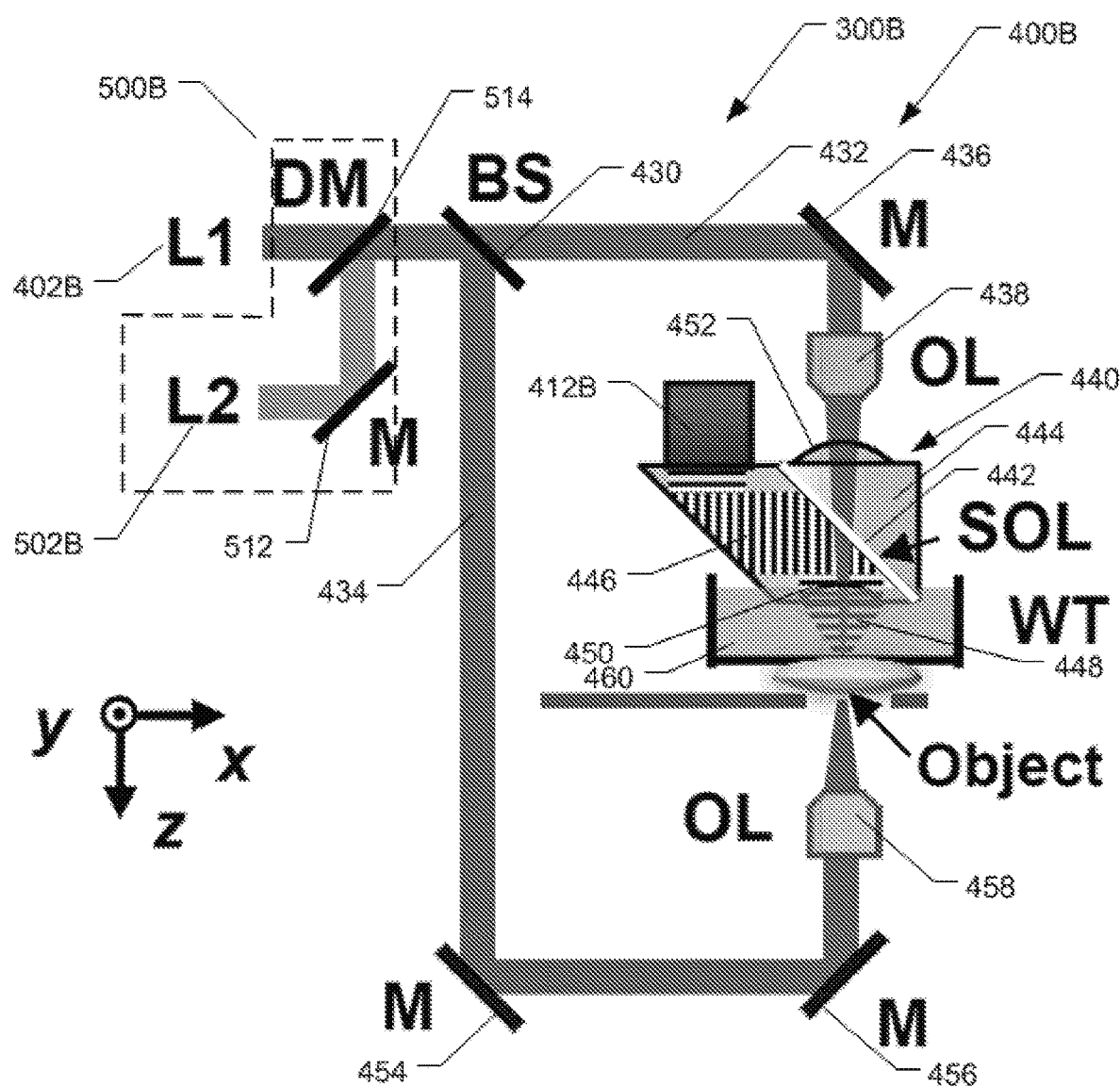
FIG. 6 shows a schematic diagram of a system used to conduct reversibly-switchable photoacoustic microscopy (RS-PAM) according to one aspect of the present disclosure.

By way of another non-limiting example, FIG. 6 is a schematic illustration of a reversibly-switched photoacoustic microscopy (RS-PAM) system 300B, configured for conducting RS-PAM of a region of interest containing a plurality of RS-PA probes in the form of BphP1 as described herein. The system 300B includes an existing conventional photoacoustic microscopy system 400B retrofitted with additional switching elements 500B. As shown in FIG. 6, the RS-PAM system 300B includes a dye laser 402B pumped by a pulsed Nd:YLF laser (not shown) to provide 780 nm light for PA imaging and for switching the RS-PA probe (BphP1) from a first (ON) state to a second (OFF) state. The RS-PAM system 300B further includes a 630 nm laser diode 502B to switch the RS-PA probe (BphP1) from a second (OFF) state to a first (ON) state. The light beams produced by the lasers 402B/502B are combined by a mirror 512 and dichroic mirror 514, reshaped by an iris (not shown) and attenuated by a neutral density filter (not shown). The attenuated beam is then split into a top beam 432 and a bottom beam 434 by a 50/50 beam splitter 430. The top beam 432 is directed by a mirror 436 into an optical assembly (not shown) that includes a condenser lens to focus the top beam 432 and a 50 µm pinhole for additional spatial filtering of the top beam 432. The RS-PAM system 300B may further include an optical objective 438 and a beam combiner 440 to focus the spatially filtered top beam 432 into the region of interest from above. The beam combiner 440 may include of a thin layer of silicone oil 442 sandwiched by a right-angle prism 444 and a rhomboid prism 446 to provide acoustic-optical coaxial alignment. Without being limited to any particular theory, the layer of silicone oil 442 transmits the spatially filtered top beam 432, but reflects the PA signals 448 produced within the region of interest. The beam combiner 440 may further include an acoustic lens 450 with a 0.5 NA ground into the bottom of the rhomboid prism 446 to provide an acoustic focal diameter of 30 µm, as well as an optical correction lens 452 attached to the top of the beam combiner 440 to correct aberration. The acoustic lens 450 may be submerged in a water-tank 460 for ultrasound coupling.

Referring again to FIG. 6, the bottom beam 434 duplicates the same path as the top beam 432, except that the bottom beam 434 is directly focused into the region of interest from the bottom. As illustrated in FIG. 6, the RS-PAM system 300B may include a series of mirrors 454/456 to direct the bottom beam 434 into a bottom objective 458 focused on the region of interest from below. In one aspect, the bottom objective 458 may have a 1.4 NA with oil immersion. By carefully adjusting the positions of the two objectives 438/458, a confocal alignment of the two optical foci and the acoustic focus may be achieved.

Referring again to FIG. 6, the resultant PA signals 448 produced within the region of interest in response to illumination by pulses from the dye laser 402B are reflected by the beam combiner 440 and detected by an ultrasonic transducer 412B with a central frequency of 50 MHz, also included in the RS-PAM system 300B. Volumetric imaging may be acquired by two-dimensional raster scanning of the object. A photodiode (not shown) may be included in the RS-PAM system 300B to monitor the fluctuations of the laser pulse energy.

Figure 8:
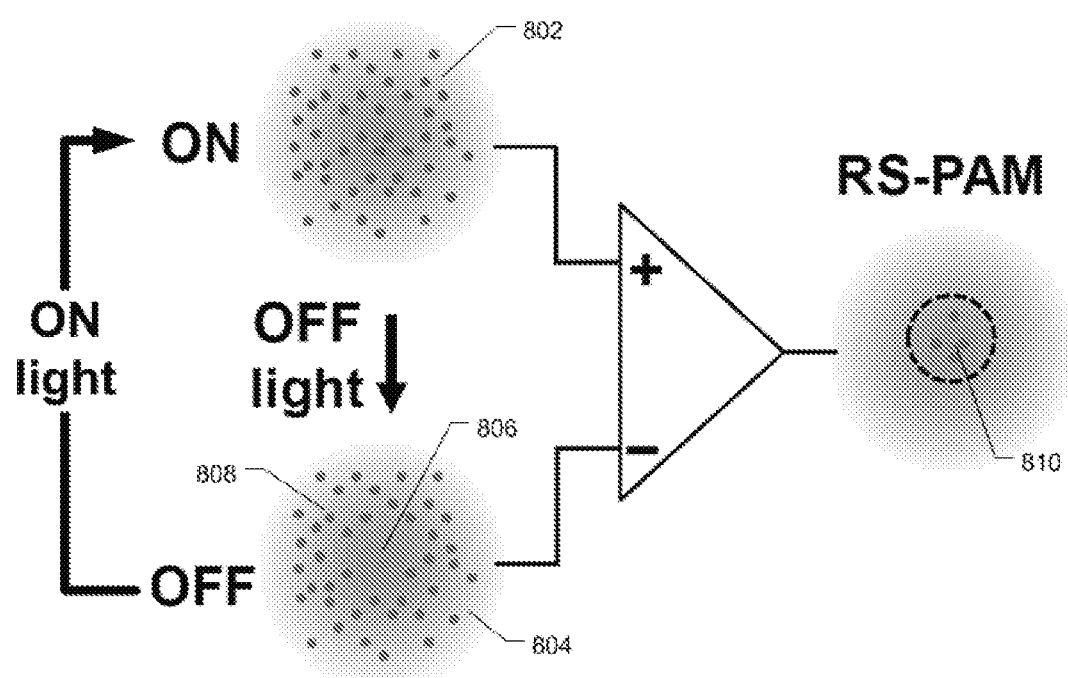
FIG. 8 shows a schematic diagram illustrating a mechanism by which a reversibly-switchable photoacoustic microscopy (RS-PAM) achieves higher lateral resolution compared to conventional photoacoustic microscopy (PAM) according to one aspect of the present disclosure.

In various aspects, the RS-PAM imaging systems described herein take advantage of the exponential photo-switching dynamics of RS-PA probes including, but not limited to, BphP1 to achieve sub-diffraction imaging resolution. FIG. 8 is a schematic illustration of the RS-PAM imaging method summarizing the process of obtaining images with sub-diffraction imaging resolution. Without being limited to any particular theory, the region of interest 802 containing RS-PA probes configured in a first (ON) state generates a first PA signal that is a summation of the contributions from all RS-PA probes inside the region of interest 802, wherein each contribution of each RS-PA probe is proportional to the local light intensity illuminating each RS-PA probe. In addition, each RS-PA probe must be illuminated by localized light intensity in excess of a minimum threshold in order to switch from the first (ON) state to the second (OFF) state. Because the spatial distribution of light intensity within the OFF light beam illuminating the region of interest is typically Gaussian with a maximum intensity situated at the center of the region of interest 802, a higher proportion of RS-PA probes are switched within a central portion 806 compared to peripheral portion 808. As a result, the region of interest 804 after obtaining a PA signal includes a distribution of RS-PA probes characterized by relatively few RS-PA probes in the first (ON) state within the central portion 806 of the region of interest 804. As a result, the PA signal from the central portion 806 of the region of interest 804 decays faster with the illumination time than that from the periphery 808.

When a second PA signal is obtained from this region of interest 804, the contributions of the RS-PA probes situated within the peripheral portion 808 are diminished to a lesser degree compared to the central RS-PA probes. When the second PA signal obtained from the region of interest 804 is subtracted from the first PA signal obtained from the region of interest 802 in order to obtain the RS-PAM image, the contributions of the peripheral RS-PA probes are cancelled out, and only the contribution of the RS-PA probes within the central portion 806 are retained.

In the polynomial fitting of the resultant PA signal decay over consecutive excitations, the extracted high-order coefficients highlight the signal contribution from the center of the excitation volume, providing sub-diffraction resolution in all dimensions. Without being limited to any particular theory, the lateral resolution of the RS-PAM imaging system may be proportional to the effective lateral point spread function (PSF) of the system, expressed as:

$$\frac{0.51}{\sqrt{1+bk}} \frac{\lambda_0}{NA}; \qquad \text{Eqn. (1)}$$

where b is the power dependence of the switching-off rate on the excitation intensity, k is the order of polynomial fitting of the signal decay, $\lambda_0$ is the excitation wavelength, and NA is the numerical aperture of the objective. In an aspect, the lateral resolution of RS-PAM may be finer than that of conventional PAM by a factor of $\sqrt{1+bk}$. In another aspect, the lateral resolution of RS-PAM may be enhanced two-fold over the lateral resolution of conventional PAM.

In another aspect, the nonlinear nature of the RS-PAM signal produced by the RS-PA probes enables optical sectioning in the axial direction, which is of particular interest for large (or planar) targets. Compared with the in-focus RS-PA probes, the out-of-focus RS-PA probes within the region of interest are less affected during the switching-off process in a manner similar to that described herein previously in connection with lateral resolution. As a result, high-order coefficients extracted from the polynomial fitting of the signal decay contain mainly the contributions of in-focus RS-PA probes, thereby enabling optical sectioning using RS-PAM methods. Like the lateral resolution enhancement, the optical-sectioning strength of RS-PAM is determined by the power dependence of the switching-off rate on the excitation intensity. For point targets, RS-PAM can achieve an axial resolution of $$1.8\sqrt{2^{1/(1+bk)} - 1} \frac{\lambda_0}{NA^2}.$$

For large targets, RS-PAM can achieve an axial resolution of $$1.8\sqrt{2^{1/(bk)} - 1} \frac{\lambda_0}{NA^2}.$$

III. Reversibly-Switchable Probes

In various aspects, the systems and methods of obtaining reversibly-switchable photoacoustic (RS-PA) images described herein are enabled by the properties of the plurality of RS-PA probes situated within the region of interest to be imaged. In particular, the RS-PA probes are configured to reversibly switch from a first (ON) state characterized by a relatively high absorbance of light at a preselected wavelength to a second (OFF) state characterized by a relatively low absorbance of light at the same preselected wavelength (the property is also referred to as photochromism), and vice-versa with negligible degradation of performance over numerous switching cycles (the property is also referred to as photoswitching fatigue). The difference in PA signals produced by the RS-PA probe in the first state compared to the second state, referred to herein as switching contrast, enhances the contrast of regions containing the RS-PA probes significantly over the contrast achieved using conventional PA imaging methods, as discussed herein previously. In addition, the switching behavior and dynamics of the RS-PA probe molecules may enhance the lateral and axial resolution of the RS-PA images significantly over the resolution of conventional PA images as described herein above.

In various aspects, any compound capable of assuming a first (high light absorbance) state and second (low light absorbance) state for the same preselected wavelength of light may be suitable for use as an RS-PA probe, so long as the compound is further capable of reversibly switching between the first state and the second state upon exposure to one or more switching signals. The one or more switching signals typically include some manner of energy transfer to the RS-PA probe that results in a conformational change in the molecular structure of the RS-PA probe associated with a change in light absorbance. Any known means of energy transfer may be used as the one or more switching signals for the RS-PA probe including, but not limited to: illumination of the RS-PA probe by light or other electromagnetic radiation of a preselected wavelength including radio waves, microwaves, infrared radiation, visible light, ultraviolet radiation, X-rays and gamma rays; application of an electric field to the RS-PA probe; application of a magnetic field to the RS-PA probe; heating of the RS-PA probe; application of ultrasound or other acoustic energy to the RS-PA probe; changes in the pH, salinity, ion concentration, or any other chemical property in the vicinity of the RS-PA probe, and any combination thereof. In one aspect, the one or more switching signals may enable the relatively rapid switching of the RS-PA probes within the region of interest to reduce the imaging time needed to obtain the pluralities of first and second PA signals needed to accomplish RS-PA imaging.

In various aspects, the one or more switching signals used to reversibly switch the RS-PA probes from the first state to the second state are light pulses at a preselected wavelength. The light pulses may be selected based on any one or more of the following factors including, but not limited to: switching properties of the RS-PA probes, transmissive efficiency to the region of interest to be imaged. In one aspect, a light pulse at a first preselected wavelength may be a first switching signal used to switch the RS-PA probes from the first state to the second state and a light pulse at a second wavelength may be a second switching signal used to switch the RS-PA probes from the second state to the first state. In other aspects, the wavelengths of the first and second switching signal may be different from the wavelength of the PA laser pulse used to elicit the first and second PA signals from the region of interest. In additional other aspects, the wavelength of the first or second switching signal may be matched to the wavelength of the PA laser pulse used to elicit the first and second PA signals from the region of interest.

In one aspect, the wavelength of the first switching signal may be matched to the wavelength at which the plurality of first PA signals and the plurality of second PA signals are obtained during RS-PA imaging according to the disclosed method. In this aspect, the first light pulse at the first preselected wavelength may be delivered both as a first switching signal to switch the RS-PA probes from the first state to the second state, and to elicit at least one first PA signal from the region of interest. In this other aspect, a light pulse of a second wavelength may be delivered as a second switching signal between the delivery of the first light pulses at the first wavelength to maintain the plurality of RS-PA probes within the region of interest in the first state during repeated bouts of obtaining pluralities of first PA signals corresponding to RS-PA probes configured in the first state.

In another aspect, the wavelength of the second switching signal may be matched to the wavelength at which the plurality of first PA signals and the plurality of second PA signals are obtained during RS-PA imaging according to the disclosed method. In this other aspect, the second light pulse at the second preselected wavelength may be delivered both as a second switching signal to switch the RS-PA probe from the second state to the first state, and to elicit at least one second PA signal from the region of interest. In this other aspect, a light pulse of a first wavelength may be delivered as a first switching signal between the delivery of the light pulses at the second wavelength to maintain the plurality of RS-PA probes within the region of interest in the second state during repeated bouts of obtaining pluralities of second PA signals corresponding to RS-PA probes configured in the second state.

For in vivo RS-PA imaging of animals, the RS-PA probes may be selected to possess at least one or more of the following characteristics: i) genetically encodable expression; ii) spectral properties that allow light penetration to deep tissues and robust unmixing from other endogenous biomolecules; iii) light-sensing chromophores that are naturally present in tissues; iv) orthogonality to mammalian cell metabolism; and v) low or no cytotoxicity.

In one aspect, genetically encoded RS-PA probes enables the labelling and detection of specific cells or cell types via RS-PAT, and further enables longitudinal monitoring of a labelled cell population, including cells subsequently descended from the initial population. In this aspect, the contrast of the RS-PA probes for each cell in the labelled population is maintained over extended periods because each descendent cell endogenously expresses additional RS-PA probes, rather than dividing a finite amount of exogenously supplied probe compound between parent cell and descendant cell at each cell division. In one aspect, the RS-PA probes may be expressed in cancer cells and RS-PA imaging may be used to monitor the labelled cancer cells to track the formation of primary and secondary tumors, metastasis, response to treatment, and any other relevant behavior or characteristic of the cancer cells.

In various aspects, the RS-PA probes configured in the first state may efficiently absorb light of any wavelength without limitation. The RS-PA probe may be selected to enhance the contrast of the RS-PA probe relative to surrounding objects within the region of interest at the PA pulse wavelength used to conduct RS-PA imaging and to enable the unmixing of PA signals originating from the RS-PA probes from background PA signals from other biomolecules or other structures within the region of interest. In addition, the RS-PA probe may be selected to efficiently absorb light at wavelengths that transmit efficiently to the region of interest, thereby enhancing the effectiveness of the RS-PA imaging. In one aspect, when the region of interest to be imaged is a biological tissue or whole organism, an RS-PA probe with strong far-red/NIR absorbance may be selected to enable deep-tissue imaging due to the known high transmissive properties of far-red/NIR light through biological tissues. In another aspect, an RS-PA probe with low photoswitching fatigue during multiple switching cycles may be selected to enable longitudinal imaging of the same region of interest including, but not limited to an individual animal, animal tissue, animal organ, or other region within the animal.

In various other aspects, the RS-PA probes may be genetically encoded light-sensing proteins including, but not limited to fluorescent proteins with reversibly photoswitchable absorption, such as derivatives and homologues of green fluorescent protein (GFP), and various chromophores. The use of light-sensing genetically encoded light-sensing proteins draws on proven methods of transforming living cells to express the light-sensing proteins for previous imaging methods such as fluorescence microscopy. In addition, the use of genetically encoded light-sensing proteins as RS-PA probes may ameliorate the impacts of introducing the RS-PA probes into a region of interest within a living animal. In one aspect, the use of naturally occurring proteins expressed within the cells to be imaged may limit the interference of these chromophores with other metabolic processes that may occur within the cell. Further, the use of naturally occurring chromophores expressed within cells to be imaged may reduce the likelihood of cytotoxicity due to cellular expression of the RS-PA probes.

Figure 12:
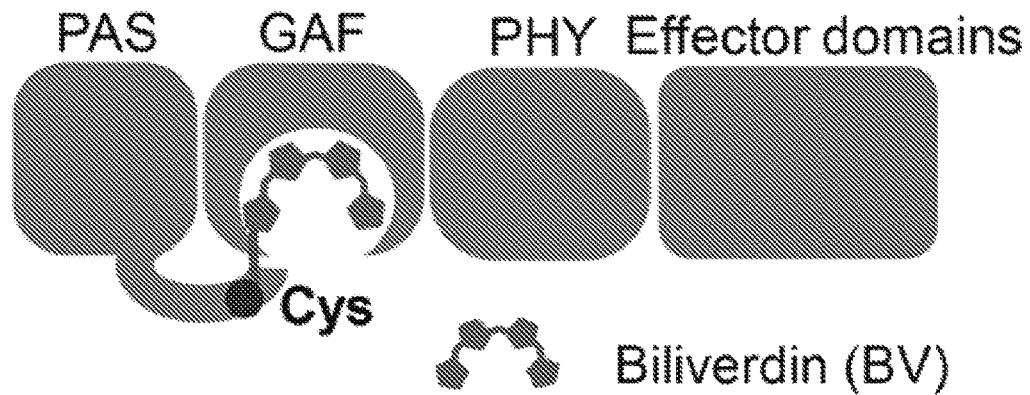
FIG. 12 shows a schematic diagram of non-fluorescent bacterial phytochrome BphP1, a reversibly-switchable photoacoustic probe according to one aspect of the present disclosure.
Figure 15:
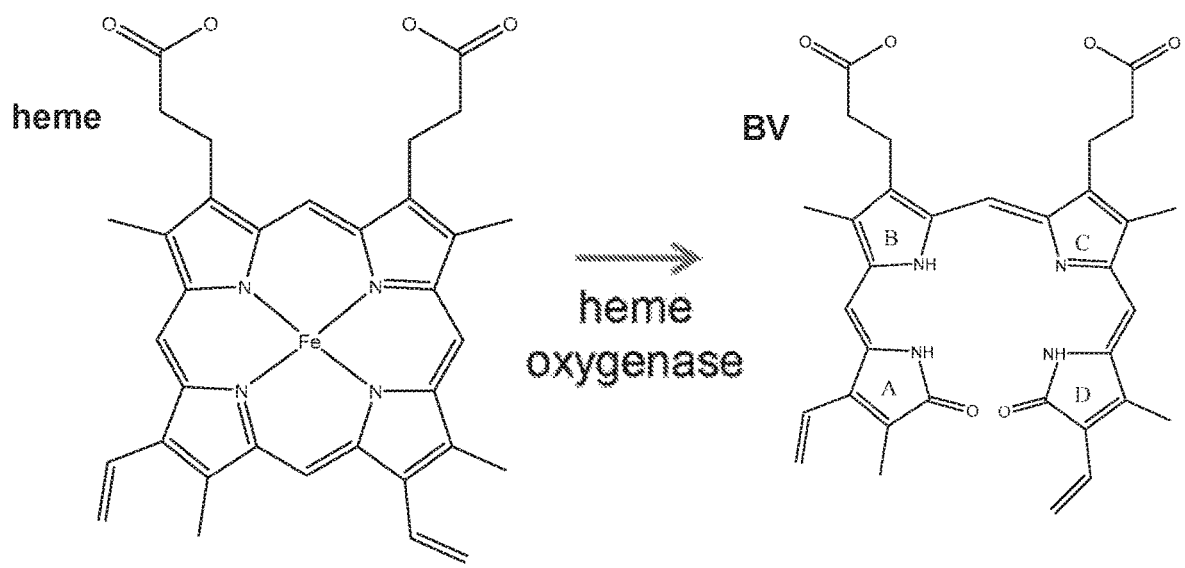
FIG. 15 shows a schematic diagram illustrating the conversion of heme into a biliverdin chromophore by heme oxygenase.
Figure 16:
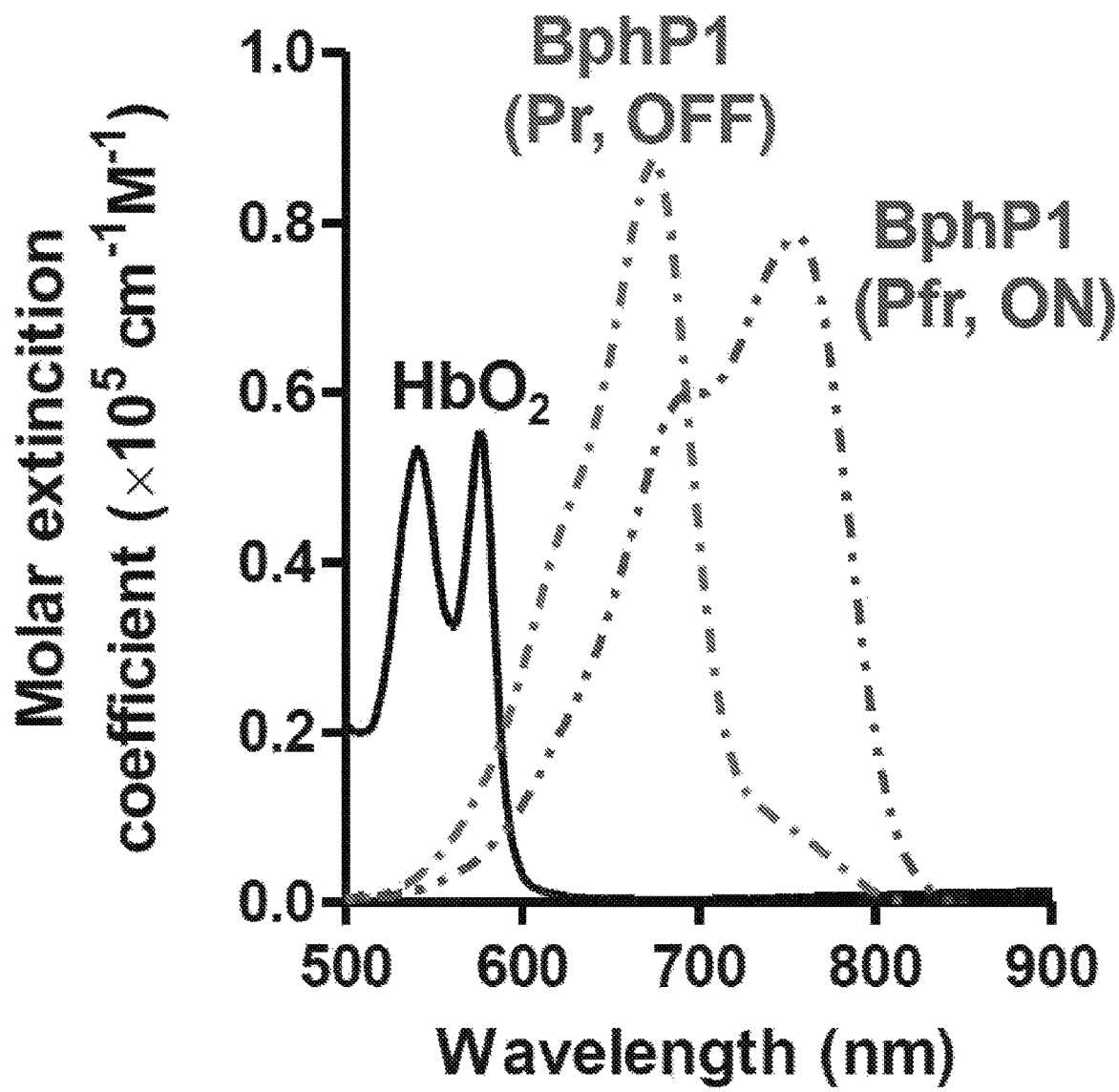
FIG. 16 shows a graph summarizing the molar extinction coefficients of oxygenated hemoglobin and a biliverdin chromophore (BphP1) in a first and second state.

In various aspects, the RS-PA probes may be naturally occurring photoswitchable phytochromes, which are genetically encoded proteins in plants, bacteria, yeast and other organisms in nature, including but not limited to subclass of bacterial phytochromes (BphPs) or genetically modified derivatives of BphPs expressed in cells, tissues or organs of animals to be imaged and/or monitored using the RS-PA imaging methods described herein. BphPs are photoreceptors that are sensitive to 600-800 nm light, a wavelength range that partially includes a deep-penetration optical range for tissues that includes far-red/NIR wavelengths. As illustrated in FIG. 12, BphPs consist of a photosensory core module and an output effector domain. Referring again to FIG. 12, the unique spectral properties of BphPs are defined by a covalently attached chromophore, biliverdin IX$\alpha$ (BV), which is a product of enzymatic heme degradation as illustrated in FIG. 15. Importantly, BV is abundant in cells of higher eukaryotes, including mammals and humans. Covalent binding of BV with the photosensory module is autocatalytic and occurs without any additional cofactors. Spectral properties of individual species of BphP compounds are determined by the chromophore-protein interaction within the photosensory module.

Figure 13:
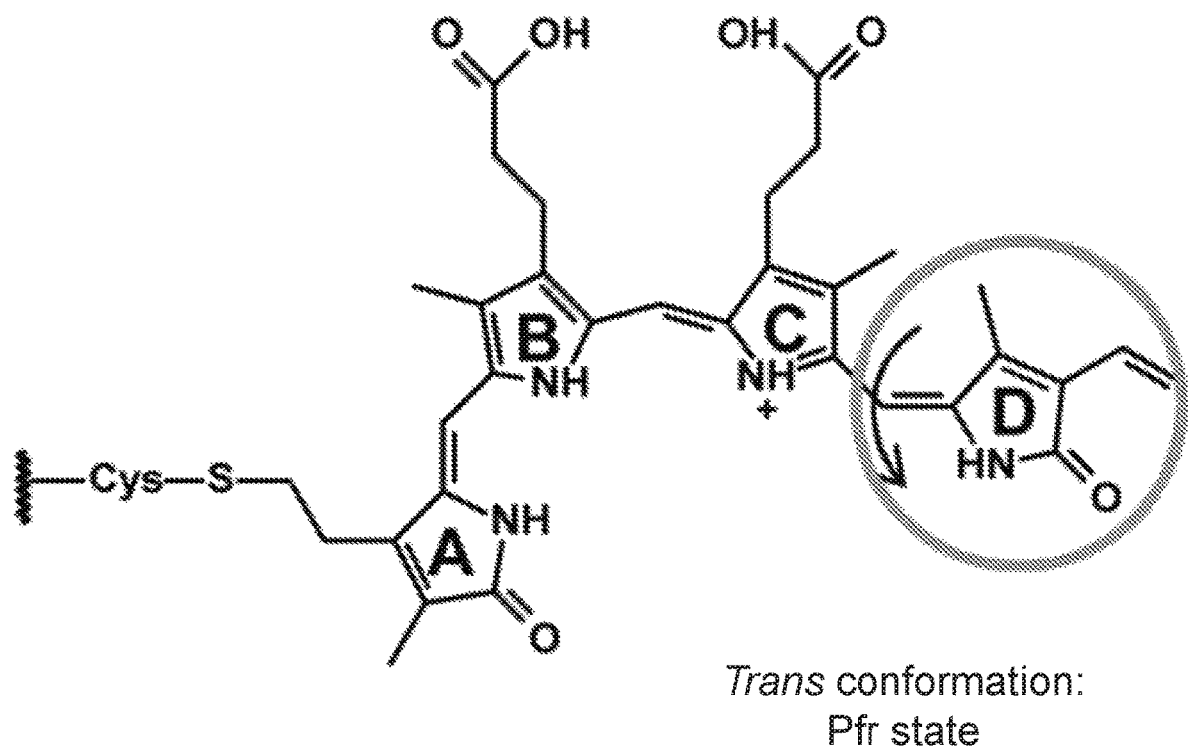
FIG. 13 shows a diagram of the chemical structure of biliverdin chromophore in a trans conformation of a non-fluorescent bacterial phytochrome BphP1 (Pfr or ON state).

Referring to FIG. 13 and FIG. 14, BV can adopt two conformational states inside the chromophore binding pocket: trans (see FIG. 13) and cis (see FIG. 14), which differ in the conformation of the C15/16 double bond between the C and D pyrrole rings of BV. In the Pfr state of BphP, the C15/16 bond is in a trans conformation, illustrated in FIG. 13, while in the Pr state of BphP, the C15/16 bond is in a cis conformation, illustrated in FIG. 14. Isomerization of the pyrrole D ring upon light absorption results in an ~80 nm absorption shift. Compared to other switchable photoreceptors that sense violet/blue light, such as cryptochromes and phototropins, BphPs are advantageous for in vivo deep-tissue imaging because they absorb light in the far-red/NIR region suitable for deep tissue imaging. Moreover, BphPs do not require an exogenous supply of BV chromophore when expressed in mammalian cells and tissues, unlike phytochromes of the plant or cyanobacterial origins.

Figure 55:
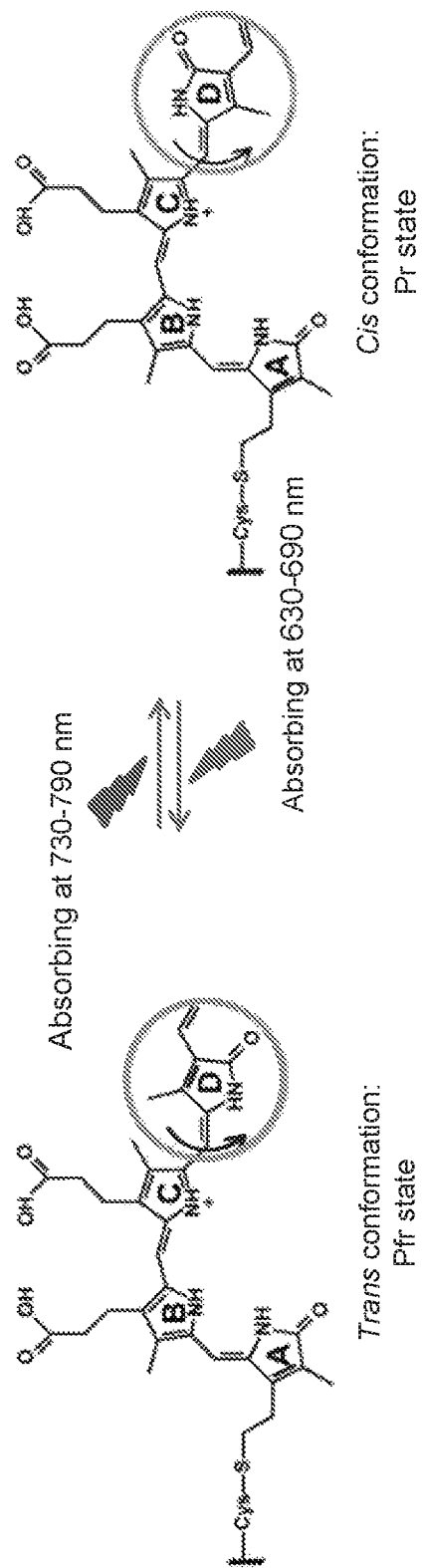
FIG. 55 shows a schematic diagram illustrating the photoswitching of BphP1.

In one aspect, the RS-PA probes may be BphP cloned from *Rhodopseudomonas palustris* bacteria, called RpBphP1 (referred to here as BphP1), a natural photoswitchable bacterial phytochrome. Referring to FIG. 55, BphP1 has two photoconvertible states, which both have strong far-red/NIR absorbance, enabling deep-tissue imaging and photoswitching. The first (Pfr) state of BphP1 is characterized by a trans conformation of the C15/16 bond, resulting in a relatively high absorbance of light at wavelengths of 730 nm-790 nm. Upon illumination by light at a wavelength of 730 nm-790 nm, BphP1 photoconverts from the first (Pfr) state to the second (Pr) state. The second (Pr) state of BphP1 is characterized by a cis conformation of the C15/16 bond, resulting in a relatively high absorbance of light at wavelengths of 630 nm-690 nm. Upon illumination by light at a wavelength of 630 nm-690 nm, BphP1 photoconverts from the second (Pr) state to the first (Pfr) state. BphP1 excited in one state quickly converts into the other state, remaining excited in the one state for only a relatively short time resulting in high photostability of BphP1.

The first (Pfr) state of BphP1 has the most red-shifted absorption among the genetically encoded probes reported to date, including GFP-like FPs and other classes of phytochromes. Cellular expression of BphP1 is non-cytotoxic and does not affect cell proliferation and metabolism. Further, BphP1 efficiently and specifically binds endogenous chromophore BV, which is known to be abundant in mammalian cells. As a result, BphP1 does not require an exogenous supply of chromophore BV to function as a RS-PA probe, unlike other classes of phytochromes. BphP1 also exhibits low photoswitching fatigue during multiple cycles of photoconversion between the first and second states, enabling longitudinal imaging of the same animals using the disclosed RS-PA imaging methods.

The photochemical features of BphP1 are well-suited for use with the RS-PA imaging methods as disclosed herein. By combining optical absorption contrast and ultrasound resolution, RS-PA imaging methods provide high-resolution imaging of BphP1 at depths far beyond that achieved by pure optical techniques with photoswitchable fluorescent probes, such as optical lock-in detection microscopy. Further, BphP1 enhances quantification accuracy at large imaging depths because a single wavelength (e.g., 780 nm) is used to generate PA signals from BphP1 at both the first (highly absorbent) state and the second (less absorbent) state, while a different wavelength (e.g., 630 nm) is used to reconfigure the BphP1 from the second state back to the first state.

In various aspects, genetically-encoded RS-PA probes as described herein above may be produced in living cells that have been transformed to produce the fluorescent proteins. The cells may be transformed using any known transformation method without limitation. In one aspect, the cells may be transformed by transfecting vectors containing genes encoding the light-sensing protein into the cell. By way of non-limiting example, a BphP1 gene may be transfected into bacteria using a pBAD/His-B vector (Life Technologies-Invitrogen). In this non-limiting example, the BphP1 gene may be PCR amplified as NheI-BglII fragments and cloned into multi cloning sites, and BphP1 with a polyhistidine tag at the N-terminus may be expressed in LMG194 bacterial cells (Life Technologies-Invitrogen) containing a plasmid (e.g., pWA23h) encoding heme oxygenase for BV synthesis in $E. coli$.

By way of another non-limiting example, a pIRES2-EGFP (Takara-Clontech) vector may be used for expression of BphP1 in animal cells including, but not limited to U87 human glioblastoma cells. A U87 stable preclonal mixture may be obtained by transfecting cells with a pIRES2-EGFP-BphP1 plasmid. Plasmid transfection may be performed using an Effectene reagent (Qiagen). Cells may be further selected with 700 µg/ml of G418 antibiotic for two weeks and enriched using a FACSAria sorter (BD Biosciences) equipped with a 488 nm laser and a 530/30 nm emission filter.

In various aspects, additional RS-PA probes may include probes with NIR absorbance properties including but not limited to: additional naturally-occurring BphPs and additional BphPs derived from BphP1 using molecular engineering approaches. Non-limiting examples of desirable characteristics of the additional RS-PA probes include: higher switching contrast between the Pfr and Pr states, larger absorbance in the Pfr state, higher affinity to endogenous chromophore BV, and faster photoswitching kinetics. In various other aspects, several RS-PA probes characterized by different first and second states may be introduced into the region of interest to enable multi-parametric RS-PA imaging for simultaneous detection of multiple distinct biological processes or cell populations in a living animal.

In various aspects, phytochrome based, in general, and BphP-based, in particular, RS-PA imaging may be suitable for a variety of biomedical applications. By way of non-limiting example, transgenic mouse models that express BphP in neurons may be used for longitudinal RS-PA monitoring of neural network development, and/or for studies of dynamic interactions between neurons and the supporting vascular network. BphP-expressing cardiomyocytes may enable direct RS-PA imaging of heart activities, which may be otherwise challenging due to the large amount of blood (i.e. high background noise) inside the heart. The high detection sensitivity of genetically encoded BphP RS-PA probes may also be useful for capturing non-pigmented cancer cells circulating in the blood stream in deep tissue and monitoring the homing of these non-pigmented cancer cells to distant locations, as well as for cell tracking in immune-cell-based cancer therapies.

It will be understood that particular embodiments described herein are shown by way of illustration and not as limitations of the disclosure. The principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations can be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present disclosure have been described in detail, it will be understood by those skilled in the art that various modifications can be made therein without departing from the spirit and scope of the disclosure as set forth in the appended claims.

A controller, computer, or computing device, such as those described herein, includes at least one processor or processing unit and a system memory. The controller typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

In some embodiments, the terms "reflection mode" and "transmission mode" refer to a laser photoacoustic microscopy system that employs the detection of acoustic or pressure waves transmitted from the volume of their generation to the optically irradiated surface and a surface that is opposite to, or substantially different from, the irradiated surface, respectively.

In some embodiments, the term "multi-focus 1D array illumination" refers to optical illumination for photoacoustic excitation with a one-dimensional array of focused pulsed laser beams.

In some embodiments, the term "multi-focus matrix illumination" refers to optical illumination for photoacoustic excitation using a two-dimensional array (matrix) of focused pulsed laser beams.

In some embodiments, the term "linear ultrasonic array" refers to a one-dimensional array of ultrasonic transducers, with which the two-dimensional (2D) in-plane spatial distributions and strength of ultrasonic (photoacoustic) sources can be reconstructed based on the time-resolved signals arriving at the array.

In some embodiments, the term "matrix ultrasonic array" refers to a two-dimensional array of ultrasonic transducers, with which the 3D spatial distributions and strength of photoacoustic sources can be reconstructed based on the time-resolved signals arriving at the array. Ultrasonic transducers generally refer to all types of ultrasonic wave detection devices including devices utilizing optical interferometers to sense ultrasonic waves.

In some embodiments, the term "diffraction limited resolution" refers to the best possible resolution by focusing light within the limitations imposed by diffraction.

In some embodiments, the term "photoacoustic emissions" refers to the pressure waves produced by light absorption.

In some embodiments, the term "B-scan image" refers to a cross-sectional two-dimensional image in the plane containing the acoustic axis.

In some embodiments, the term "integrated focusing assembly" refers to an integrated assembly including optical focusing components, an ultrasonic array, and the coupling devices between them.

In some embodiments, the term "photoacoustic reconstruction" refers to a signal processing technique used to reconstruct a photoacoustic B-scan image from received signals.

Although the present disclosure is described in connection with an exemplary imaging system environment, embodiments of the disclosure are operational with numerous other general purpose or special purpose imaging system environments or configurations. The imaging system environment is not intended to suggest any limitation as to the scope of use or functionality of any aspect of the disclosure. Moreover, the imaging system environment should not be interpreted as having any dependency or requirement relating to any one or combination of components illustrated in the exemplary operating environment.

Embodiments of the disclosure may be described in the general context of computer-executable instructions, such as program components or modules, executed by one or more computers or other devices. Aspects of the disclosure may be implemented with any number and organization of components or modules. For example, aspects of the disclosure are not limited to the specific computer-executable instructions or the specific components or modules illustrated in the figures and described herein. Alternative embodiments of the disclosure may include different computer-executable instructions or components having more or less functionality than illustrated and described herein.

To facilitate the understanding of this disclosure, a number of terms are defined below. Terms defined herein have meanings as commonly understood by a person of ordinary skill in the areas relevant to the present disclosure. Terms such as "a," "an" and "the" are not intended to refer to only a singular entity, but include the general class of which a specific example may be used for illustration. The terminology herein is used to describe specific embodiments of the disclosure, but their usage does not delimit the disclosure, except as outlined in the claims.

To be consistent with the commonly used terminology, whenever possible, the terms used herein will follow the definitions recommended by the Optical Society of America (OCIS codes).

In some embodiments, the terms "photoacoustic microscopy" and "photoacoustic tomography" refer to a photoacoustic imaging technology that detects pressure waves generated by light absorption in the volume of a material (such as biological tissue) and propagated to the surface of the material. Photoacoustic imaging obtains images of the optical contrast of a material by detecting acoustic or pressure waves traveling from the object. As used herein, the terms "photoacoustic microscopy" and "photoacoustic tomography" include detection of the pressure waves that are still within the object.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

The following examples are provided to demonstrate various aspects of the disclosure.

Example 1: Comparison of BphP1 with Available Genetically Encoded Probes

To assess the characteristics of the bacterial phytochrome BphP1 compared to existing genetically encoded probes (rsTagRFP and iRFP720) for use as reversibly-switchable photoacoustic (RS-PA) probes, the following experiments were conducted.

A whole-body reversibly-switchable PACT system (RS-PACT) was upgraded to utilize BphP1 as a RS-PA probe, as described herein previously and as illustrated in FIG. 5. In this experiment, the RS-PACT system included an optical parametric oscillator (OPO) laser and a Ti:Sapphire laser that were synchronized to provide an excitation optical wavelength range of 400-900 nm. 780 nm light from the Ti:Sapphire laser was used for both whole-body PA imaging and switching off BphP1 at the same time, while the 630 nm light from the OPO laser was used for switching on the protein. The flashlamps of the two pump lasers were synchronized, and the two lasers were individually triggered by an FPGA-based controller (sbRIO9323, National Instruments). The two laser beams were combined by a dichroic mirror, and their incident fluences (in $mJ/cm^2$) were measured by an optical power meter. The laser beam was first homogenized by an optical diffuser (EDC-5, RPC Photonics), and then passed through a conical lens (cone angle 130 degree, Delmar Photonics) to form a ring-shaped light pattern. The light was then passed through an optical condenser to form a ring-shape light band around the region of interest. The light incident area was aligned slightly above the acoustic focal plane to ensure sufficient light diffusion. The thickness of the light band was ~5 mm, and its diameter was similar to the cross-sectional diameter (~2-3 cm) of a mouse. The maximum light fluence on the skin of an animal imaged using the RS-PACT system described above was ~8 $mJ/cm^2$, which was well below the American National Standards Institute (ANSI) safety limit. Three wavelengths at 567 nm, 715 nm and 780 nm were selected for PA imaging based on the absorption spectra of the proteins and the power spectra of the lasers.

rsTagRFP and iRFP720 were purified using known methods. BphP1 protein was expressed in bacteria and purified for subsequent use in this experiment. For bacterial expression of BphP1, the pBAD/His-B (Life Technologies-Invitrogen) vector was used. The BphP1 gene was PCR amplified as NheI-BglII fragments and cloned into multi cloning sites. BphP1 with a polyhistidine tag at the N-terminus was expressed in LMG194 bacterial cells (Life Technologies-Invitrogen) containing a pWA23h plasmid encoding heme oxygenase for BV synthesis in *E. coli*. The bacterial cells were grown in RM medium supplemented with ampicillin, kanamycin, and 0.02% rhamnose for 6-8 h, followed by induction of protein expression by adding 0.002% arabinose. The proteins were purified using a Ni-NTA agarose (Qiagen). For absorbance measurements, a Hitachi U-2000 spectrophotometer was used.

Plastic tubes containing the three purified proteins (BphP1, rsTagRFP, and iRFP720) at a concentration of about 30 µM were immersed in water and subjected to PA imaging by the RS-PACT system at the three wavelengths described above. A similar plastic tube containing oxygenated whole bovine blood with an $HbO_2$ concentration of about 2.3 mM was similarly subjected to PA imaging at the three wavelengths as a reference. The bovine blood was diluted 100-fold when measured at 567 nm because of its strong absorption at this wavelength. A laser fluence of 8 $mJ/cm^2$ was used for PA imaging of all samples at all three wavelengths. Tables 1 and 2 summarize the spectral and photoacoustic properties of the three purified proteins used in these experiments.

TABLE 1

Spectral properties of the purified RpBphP1, rsTagRFP and iRFP720 proteins.

| Protein | Chromophore State | Absorbance Max., nm | Emission Max., nm | Extinction Coeff. $M^{-1}cm^{-1}$ | Quantum Yield of Fluorescence, % |
|---|---|---|---|---|---|
| iRFP720 | Pr (On) | 702 | 720 | 96,000 | 6.0 |
| BphP1 | Pfr (On) | 756 | None | 78,300 | None |
| | Pr (On) | 675 | None | 87,500 | None |
| rsTagRFP | Off | 440 | 585 | 15,300 | 0.1 |
| | On | 567 | 585 | 36,800 | 11 |

TABLE 2

Photoacoustic properties of the purified RpBphP1, rsTagRFP and iRFP720 proteins.

| Protein | Chromophore State | PA excitation wavelength, nm | Signal to noise ratio, fold Tissue depth, mm | | Switching contrast, fold Tissue depth, mm | | Differential Contrast (protein/blood), fold Tissue depth, mm | |
|---|---|---|---|---|---|---|---|---|
| | | | 0 | 10 | 0 | 10 | 0 | 10 |
| iRFP720 | Pr (On) | 715 | 610 | 6 | 0 | 0 | 0 | 0 |
| BphP1 | Pfr (On) Pr (On) | 780 | 501 | 15 | 4.3 | 2.8 | 380 | 21 |
| rsTagRFP | Off On | 567 | 302 | 1 | 8.5 | 1 | 260 | 1 |

Figure 38:
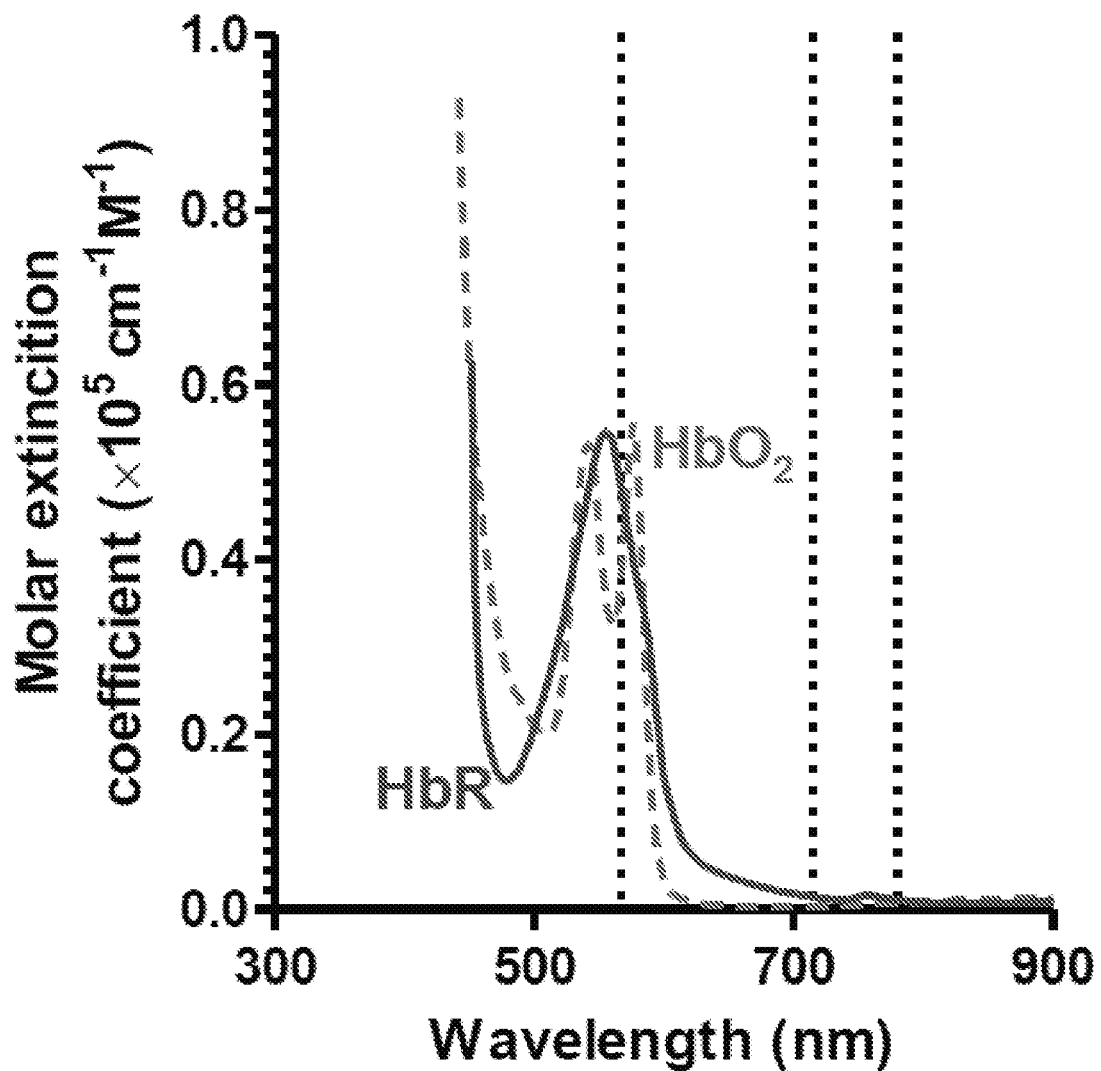
FIG. 38 shows a graph summarizing the molar extinction coefficients of oxy-hemoglobin ($HbO_2$) and deoxy-hemoglobin (HbR) for a range of wavelengths.
Figure 39:
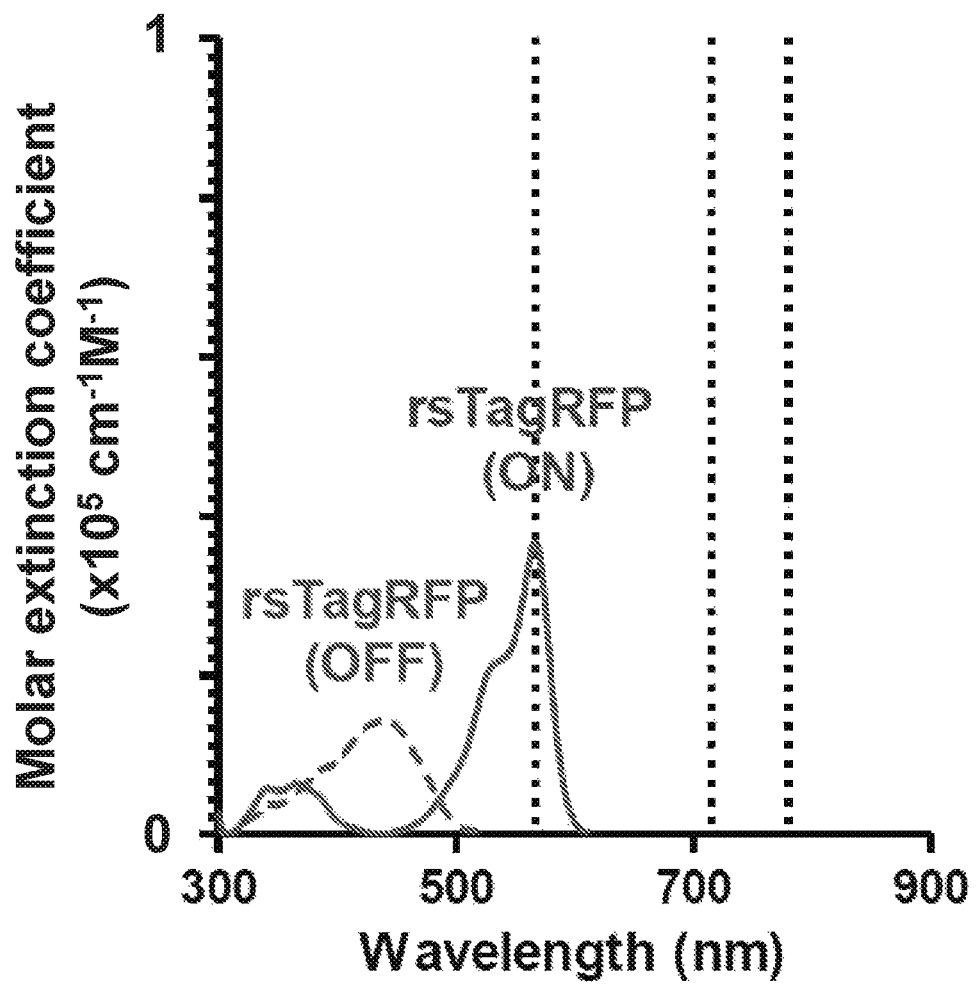
FIG. 39 shows a graph summarizing the molar extinction coefficients of rsTagRFP in an absorbent conformation (ON) and a less absorbent conformation (OFF) for a range of wavelengths.
Figure 40:
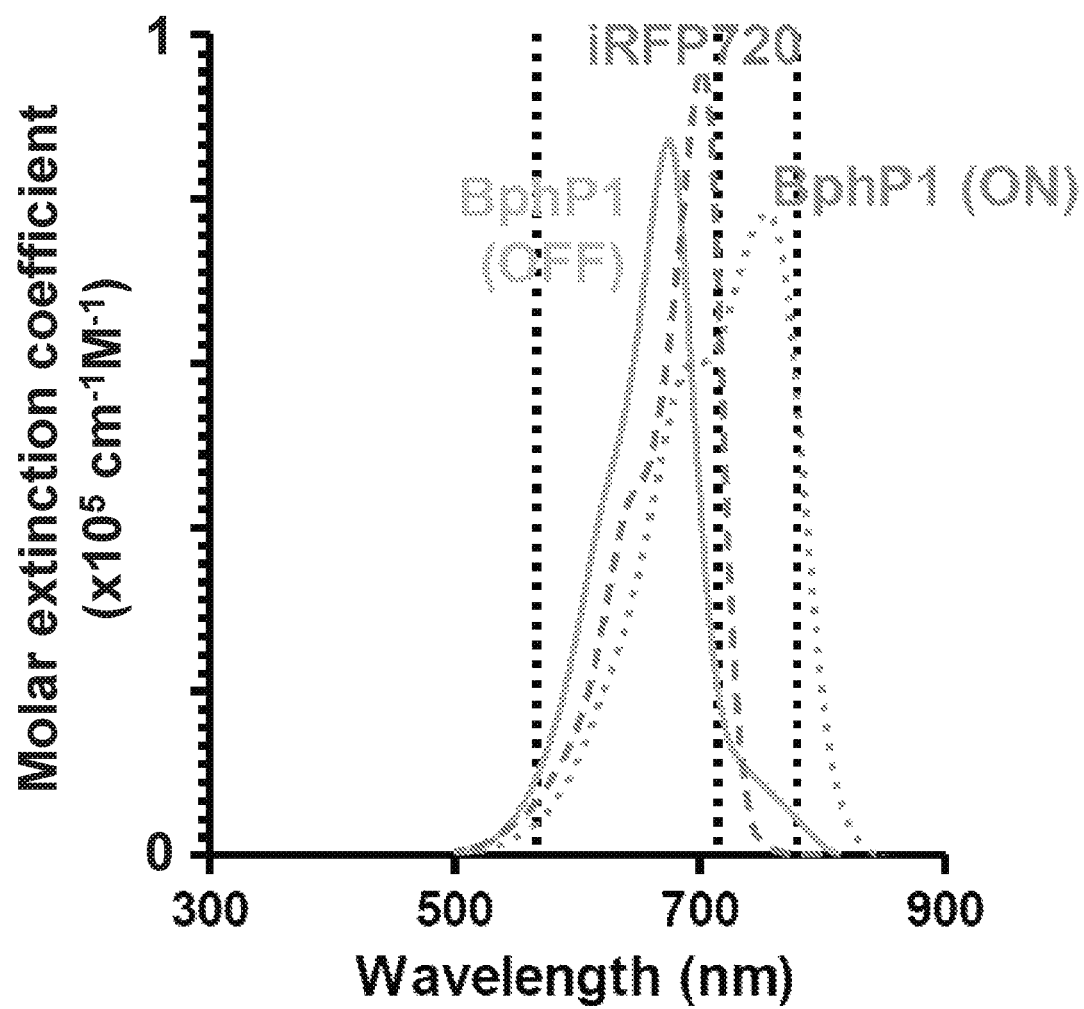
FIG. 40 shows a graph summarizing the molar extinction coefficients of iRFP720 and BphP1 in an ON state and an OFF state.
Figure 41:
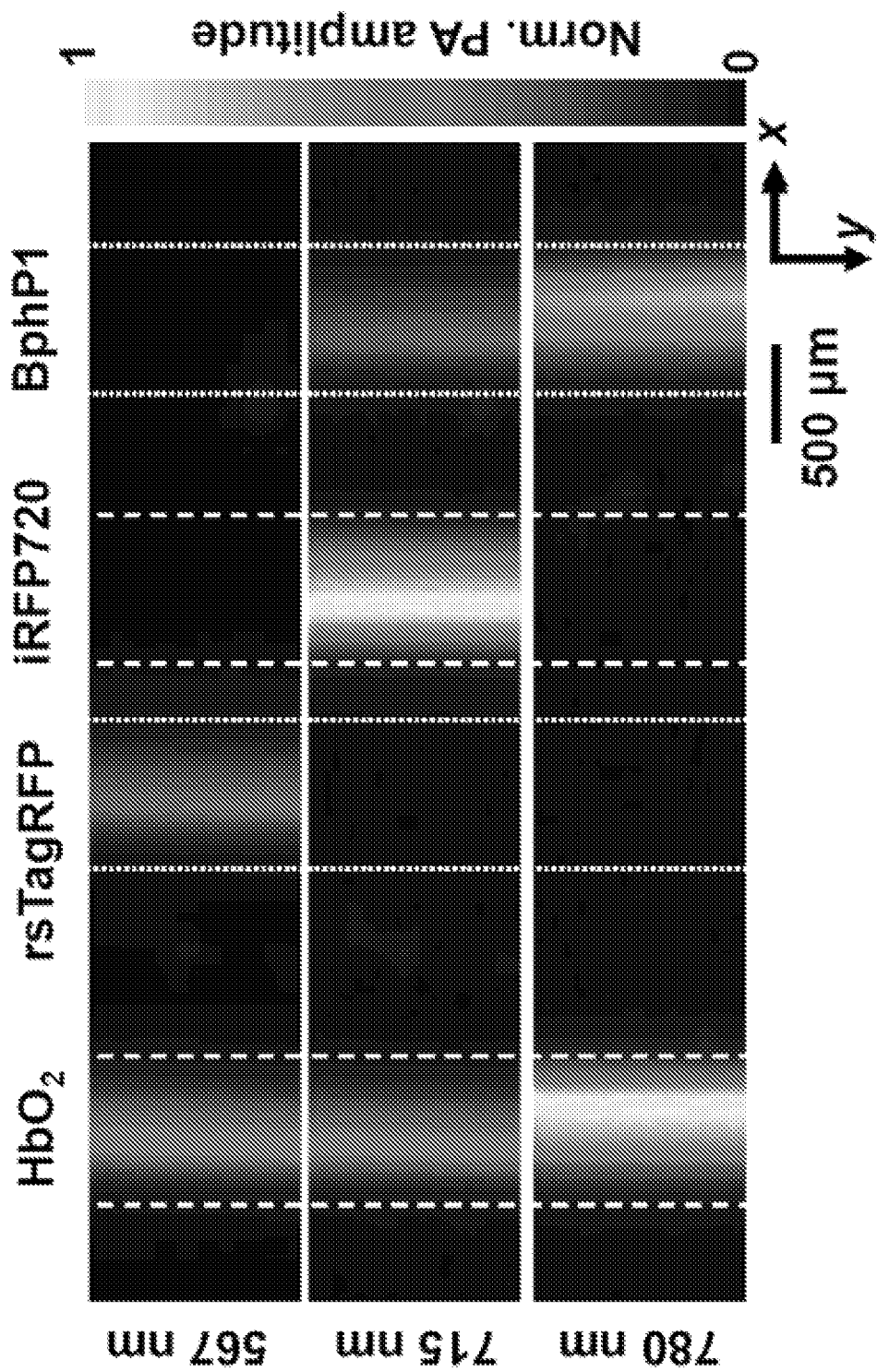
FIG. 41 shows series of conventional PA images of plastic tubes filled with purified proteins (oxy-hemoglobin ($HbO_2$), rsTagRFP, iRFP720, and BphP1) acquired at three different wavelengths (567 nm, 715 nm, and 780 nm), with all PA amplitude signals normalized to that of $HbO_2$ at 780 nm.

FIG. 41 summarizes the relative PA signal amplitudes, normalized to the PA signal amplitude of the oxygenated whole bovine blood ($HbO_2$) obtained at a wavelength of 780 nm. The relative PA signal amplitudes were consistent with their respective optical absorption spectra as shown in FIG. 38 ($HbO_2$), FIG. 39 (rsTagRFP) and FIG. 40 (iRFP720 and BphP1). At a PA excitation wavelength of 780 nm, BphP1 exhibited higher PA signal amplitude than either rsTagRFP or iRFP720.

The results of this experiment demonstrated that BphP1 generated higher PA signal amplitude than either rsTagRFP or iRFP720 in response to 780 nm excitatory pulses, confirming the compatibility of BphP1 with deep tissue PA imaging methods.

Example 2: Effect of Imaging Depth on Reversibly-Switchable Probe

To assess the ability of BphP1 to function as a RS-PA probe for deep PA imaging in scattering media representative of biological tissues, the following experiments were conducted. Samples of the purified proteins described in Ex.

1 were embedded at depths ranging from 0 mm to 10 mm in a scattering media. The scattering media included 1% intralipid, 10% gelatin, and 7% oxygenated bovine blood in distilled water. The scattering media had a reduced scattering coefficient of about 10 cm$^{-1}$. The RS-PACT system described in Ex. 1 was used to obtain PA signals at a laser pulse wavelength match to each probe protein's maximum response: 567 nm (rsTagRFP), 715 nm (iRFP720) and 780 nm (BphP1).

Figure 17:
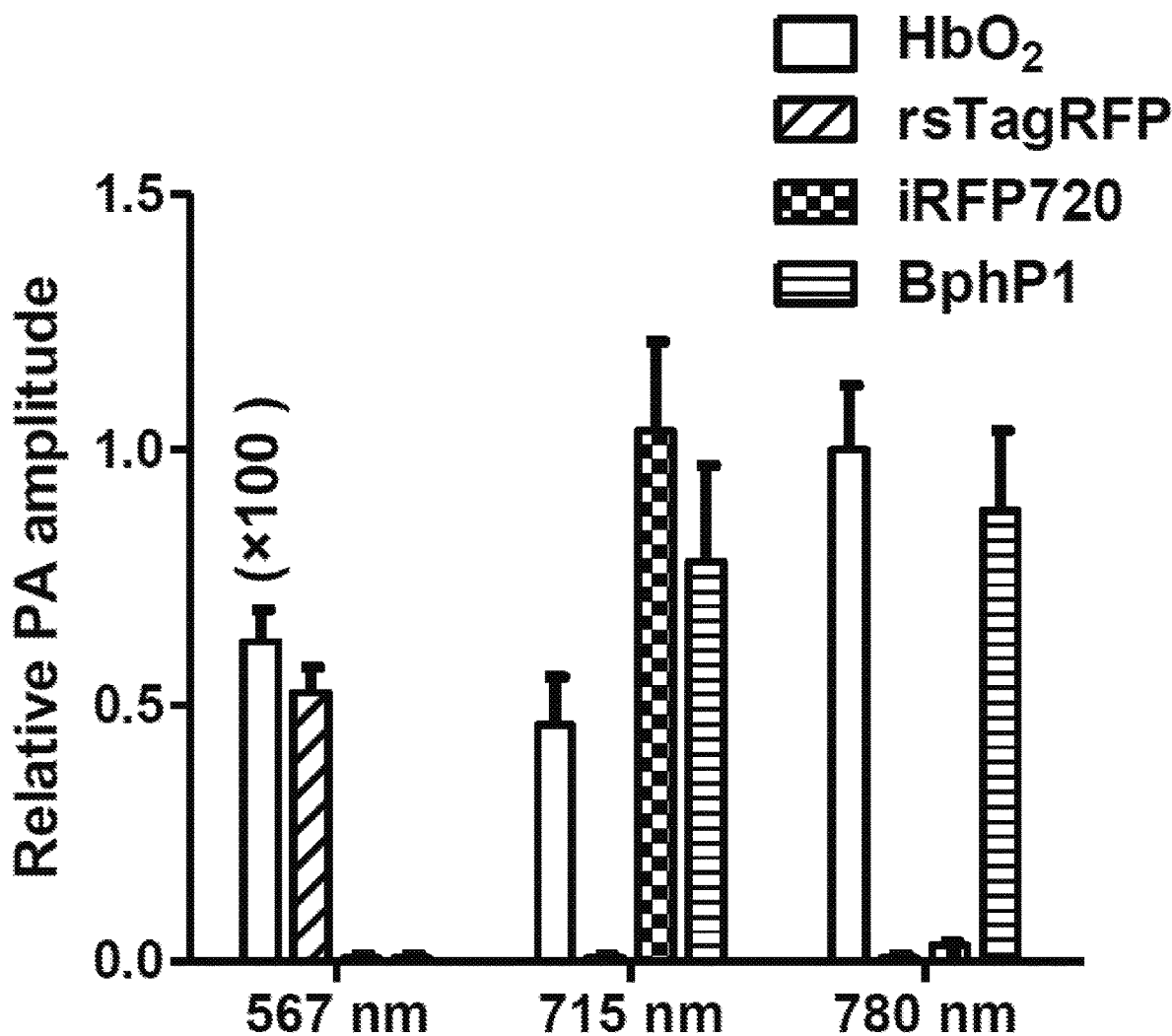
FIG. 17 shows a bar graph comparing the relative amplitude of PA signals generated by hemoglobin and several PA probe compositions at each probe's absorbing wavelength (567 nm, 715 nm, and 780 nm).
Figure 18:
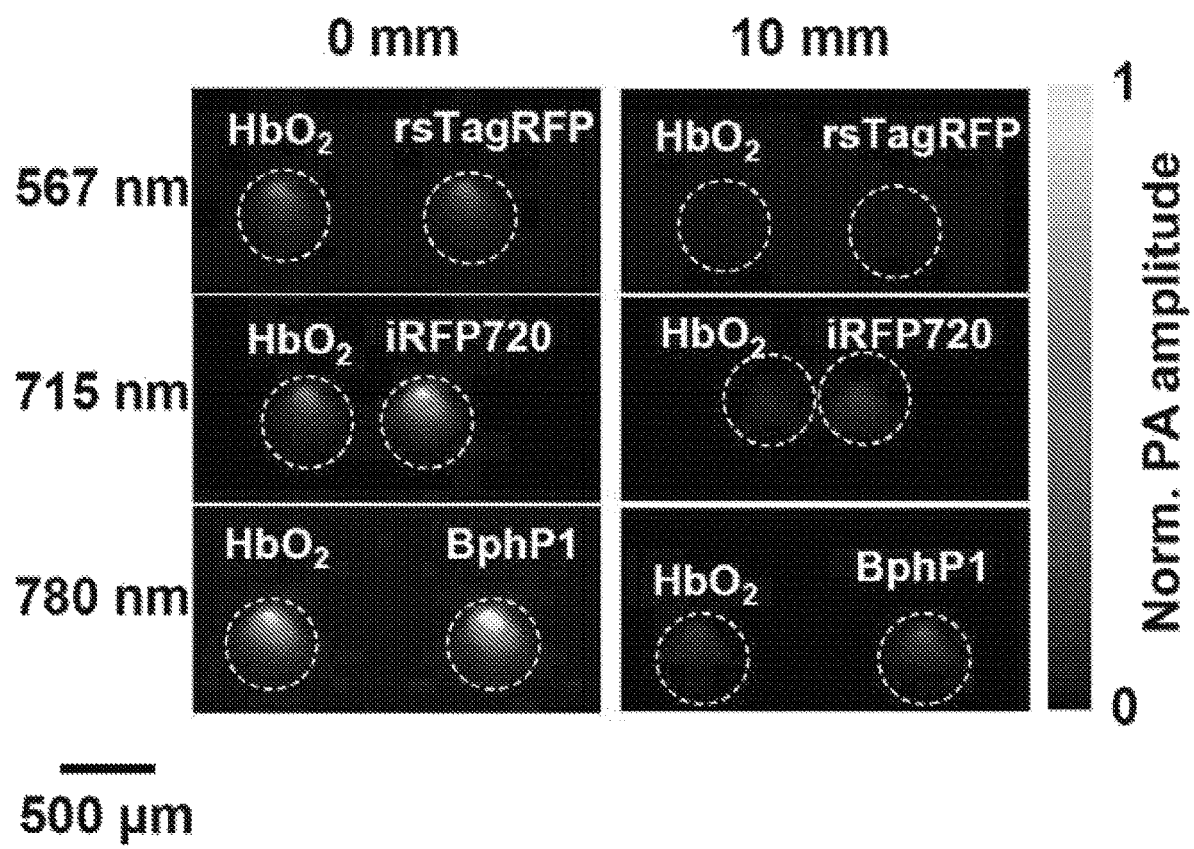
FIG. 18 shows PA images of transparent plastic tubes filled with hemoglobin and several PA probe compositions at each probe's absorbing wavelength (567 nm, 715 nm, and 780 nm) in clear media (left column) and with addition of 10 mm thick scattering media (right column).
Figure 19:
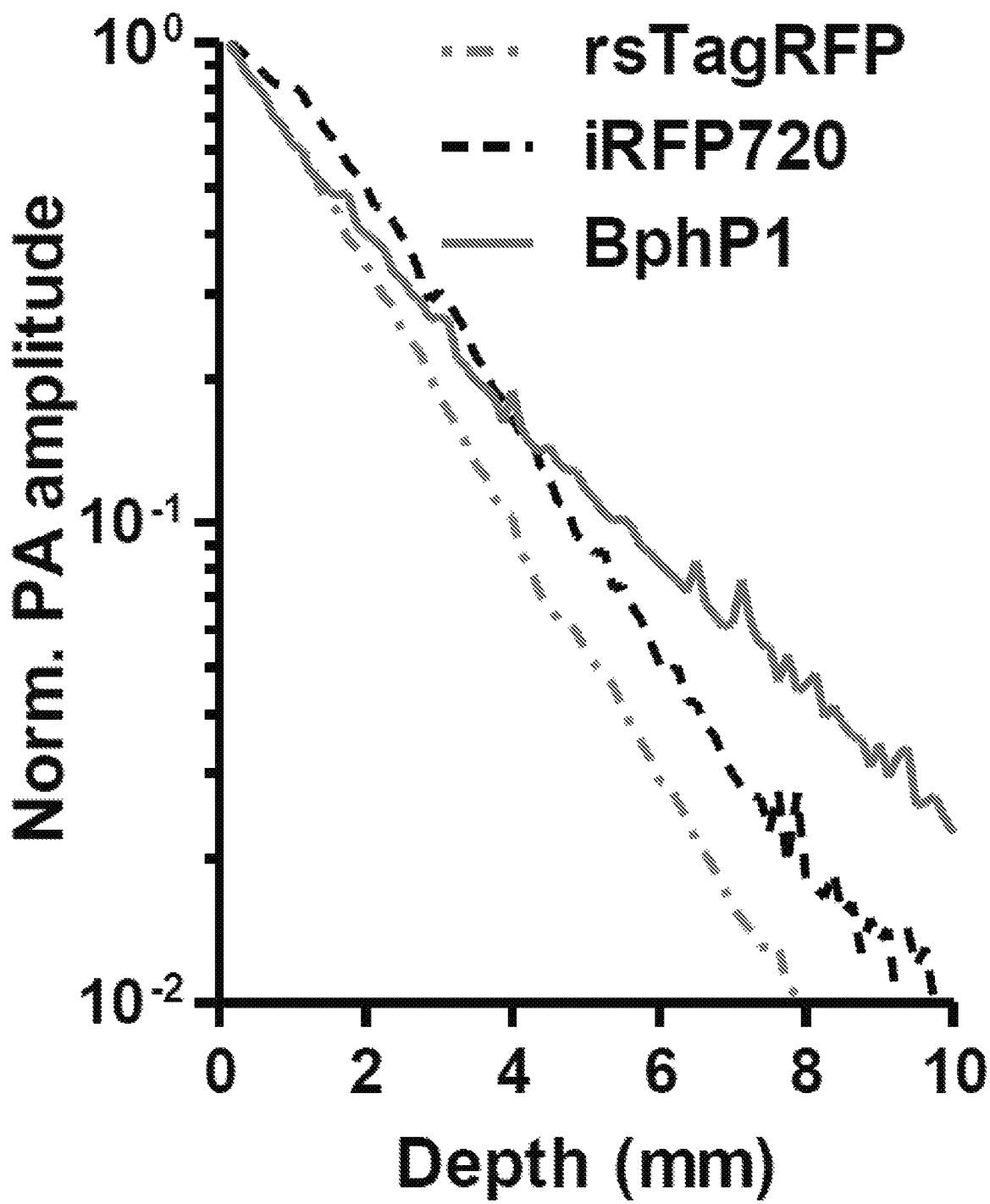
FIG. 19 shows a graph summarizing the reduction in PA signal amplitude as a function of depth within a region of interest for PA signals generated by hemoglobin and several PA probe compositions at depths up to 10 mm in scattering media.

FIG. 18 is a series of PA images of the protein samples obtained as described above at a depths of 0 mm and 10 mm. Each PA image is paired with an image of oxygenated whole bovine blood obtained under matched conditions for comparison. FIG. 19 is a graph summarizing the reduction in the normalized PA signal amplitude as a function of depth within the scattering medium. As summarized in FIG. 17, the normalized PA signal amplitude at 10 mm depth dropped by about 32-fold for BphP1 at 780 nm, by about 101-fold for iRFP720 at 715 nm, and by about 320-fold for rsTagRFP at 567 nm.

Figure 20:
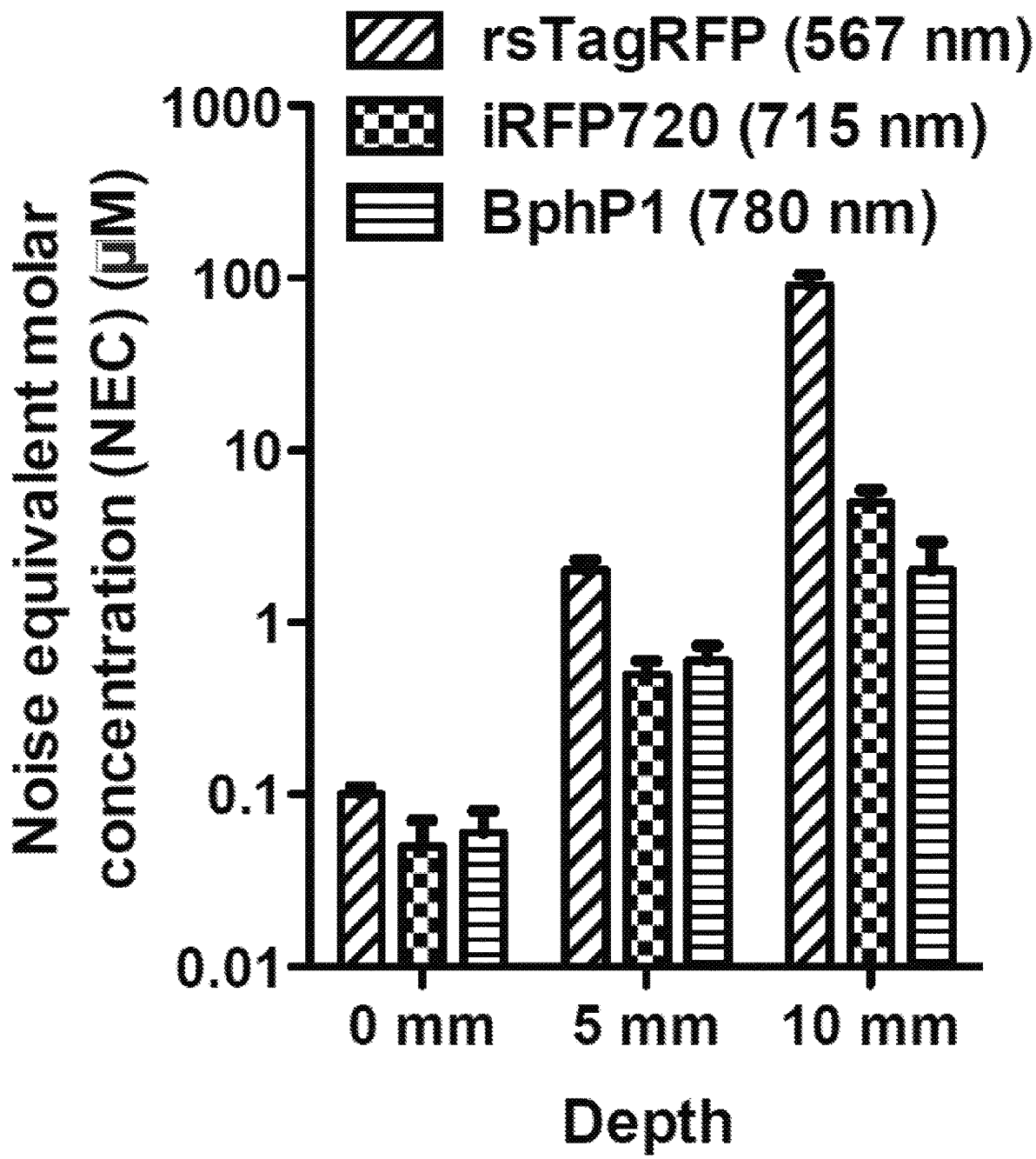
FIG. 20 shows a bar graph comparing the noise equivalent molar concentrations of several PA probe compositions at each probe's absorbing wavelength (567 nm, 715 nm, and 780 nm) obtained at depths up to 10 mm in scattering media.

FIG. 20 is a comparison of the noise equivalent molar concentrations (NEC) of the three protein samples at depths of 0 mm, 5 mm, and 10 mm. From the signal to noise ratio of about 6, the NEC for iRFP720 at 715 nm was computed to be 5.0±0.8 μM. According to the signal to noise ratio of about 15, the NEC for BphP1 at 780 nm was found to be 2.0±0.9 04.

The results of these experiments demonstrated that BphP1 was well-suited for deep-tissue PA imaging due to the low NIR light attenuation in the scattering media.

Example 3: Characterization of Reversible Photoswitching of BphP1

To characterize the reversible photoswitching of BphP1, the following experiments were conducted.

Figure 21:
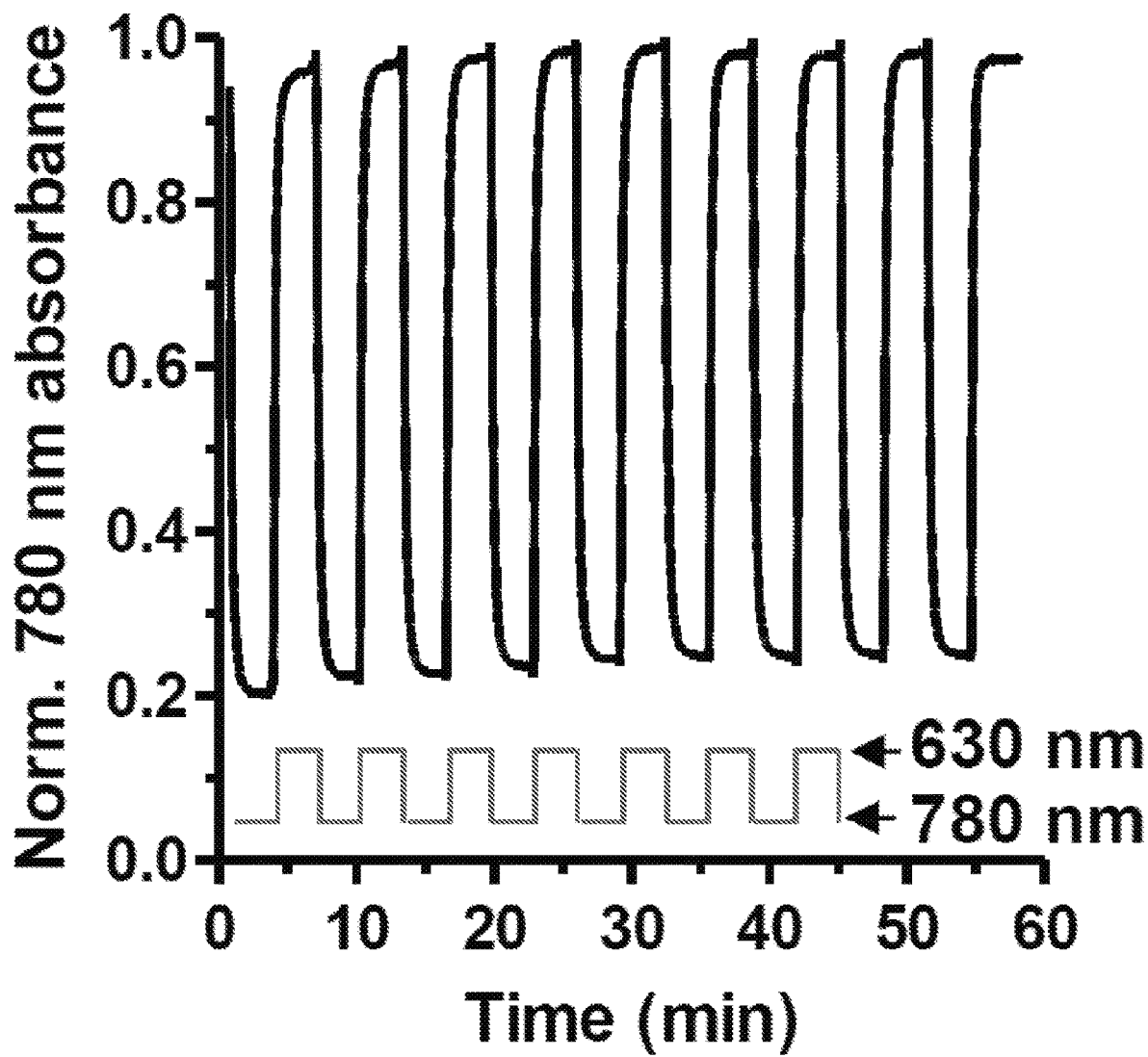
FIG. 21 shows a graph summarizing the absorbance of PA laser pulses delivered at a pulse wavelength 780 nm by a reversibly-switchable PA probe over several switching cycles.

The optical absorbance of a sample of purified BphP1 at 780 nm was assessed during two transitions: i) a transition from the Pfr (ON) state to the Pr (OFF) state induced by 780 nm illumination; and ii) a transition from the Pr (OFF) state to the Pfr (ON) state induced by 630 nm illumination. FIG. 21 is a graph summarizing the normalized absorbance at 780 nm of the BphP1 over numerous switching cycles. As shown in FIG. 21, the optical absorbance of BphP1 showed an exponential decay from ON to OFF under 780 nm illumination, and an exponential recovery from OFF to ON under 630 nm illumination. For absorbance measurements, a Hitachi U-2000 spectrophotometer was used.

The BphP1 sample was further assessed during the transition from the Pr (OFF) state to the Pfr (ON) state induced by 630 nm illumination at illumination intensities ranging from 1 mW to 46 mW. FIG. 22 is a summary of the normalized 780 nm absorbance of the BphP1 sample subjected to the different intensities of 630 nm illumination. As illustrated in FIG. 22, the switching rate of the BphP1 sample from the Pr (OFF) state to the Pfr (ON) state was approximately proportional to the 630 nm illumination intensity, similar to photoswitchable fluorescent proteins (FPs).

The PA signals produced over several photoswitching cycles of the purified proteins described in Ex. 1 (iRFP720, rsTagRFP, and BphP1) as well as oxygenated whole bovine blood (HbO$_2$) were also assessed using the RS-PACT system described in Ex. 1. For the photoswitching cycle, the iRFP720 sample was illuminated with 716 nm light only and the HbO$_2$ sample was illuminated with 780 nm light only because these proteins are not known to be photoswitchable. The rsTagRFP sample was illuminated with 440 nm and 567 nm light in an alternating switching cycle and the BphP1 sample was illuminated with 630 nm and 780 nm light in a similar alternating switching cycle. The PA signals were obtained using PA pulses with wavelengths matched to each protein's absorbance spectrum: 567 nm (rsTagRFP), 715 nm (iRFP720), and 780 nm (BphP1 and HbO$_2$).

Figure 42:
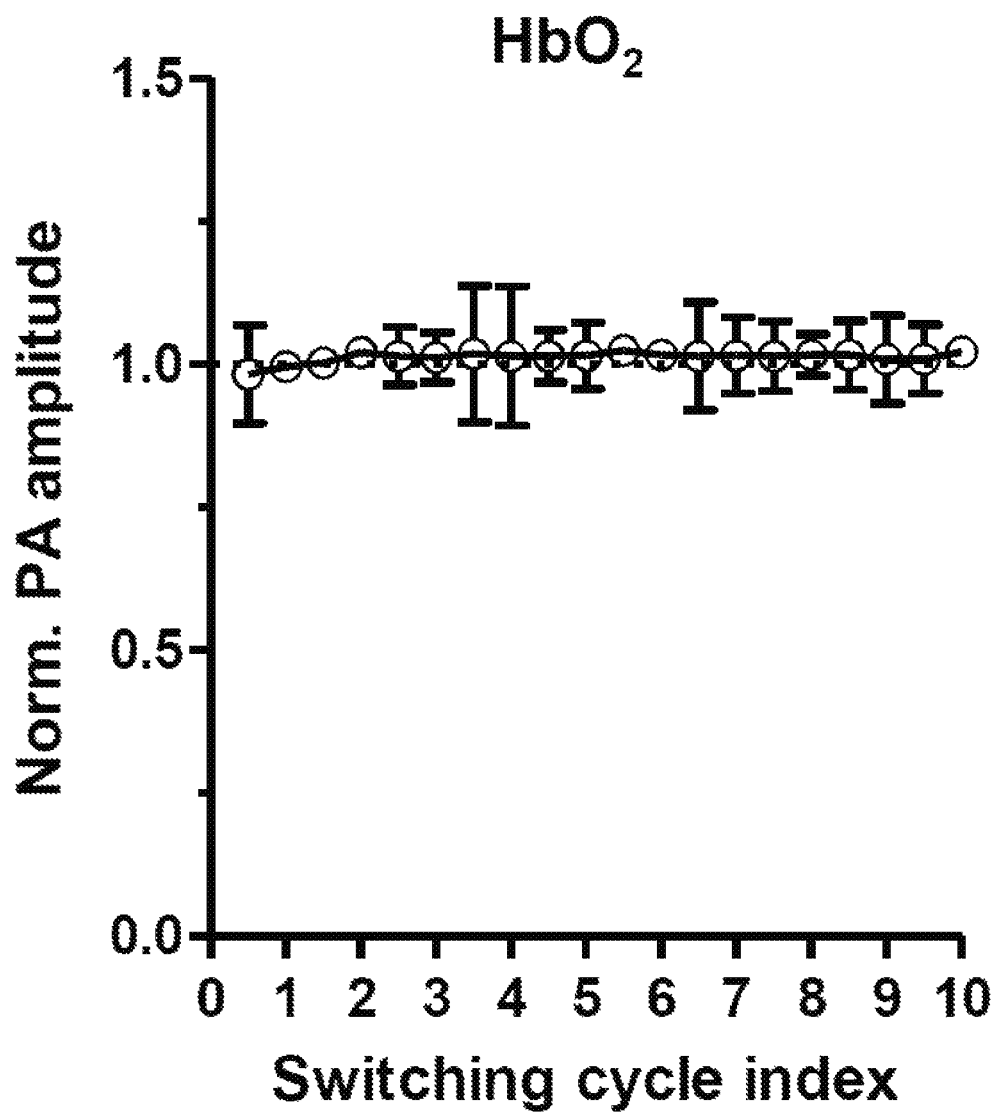
FIG. 42 shows a graph summarizing PA amplitudes produced by oxyhemoglobin (normalized to that of oxyhemoglobin at 780 nm) during exposure to 10 switching cycles between two illumination wavelengths.
Figure 43:
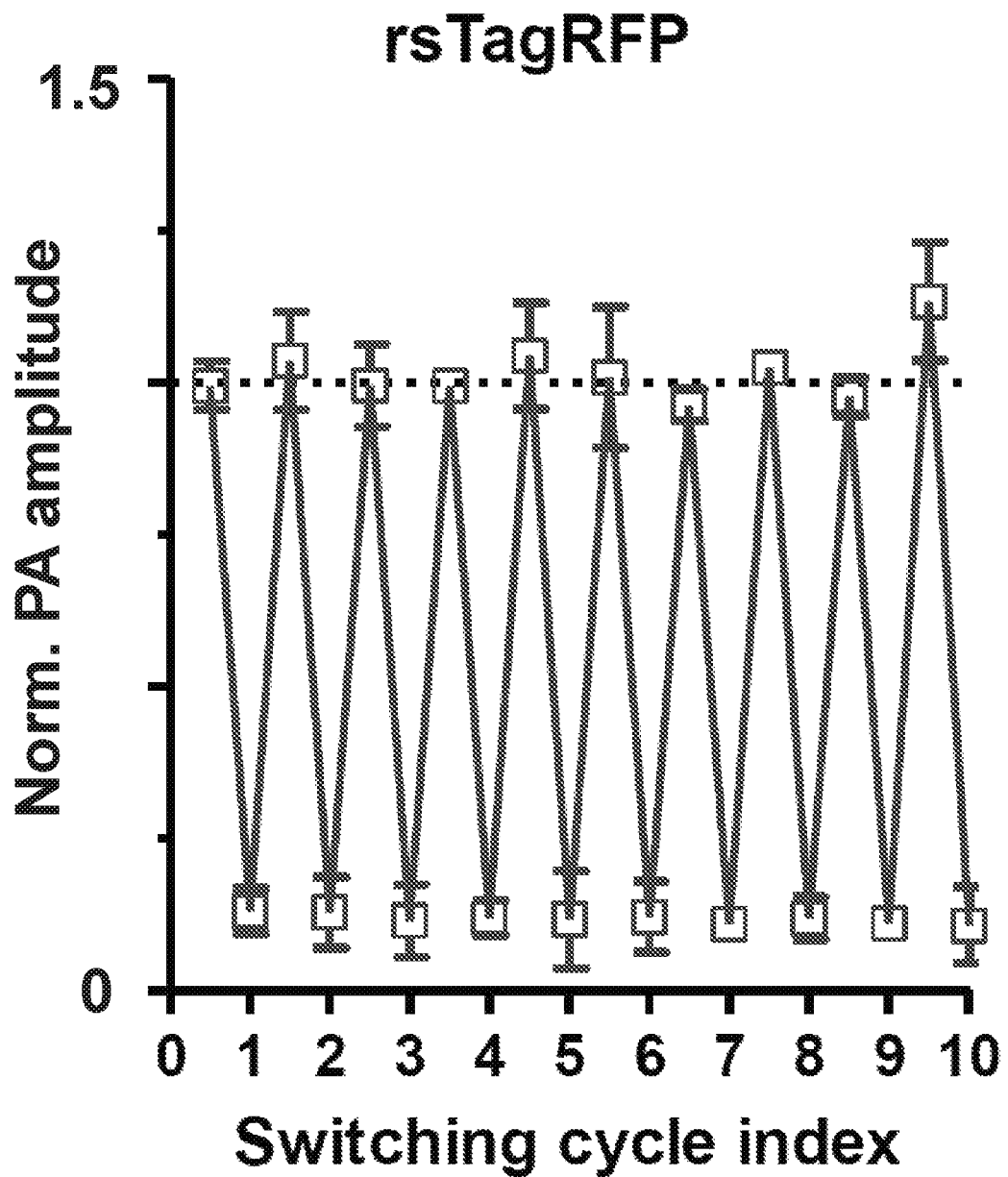
FIG. 43 shows a graph summarizing PA amplitude (normalized to that of oxyhemoglobin at 780 nm) produced by rsTagRFP during exposure to 10 switching cycles between two illumination wavelengths (440 nm and 567 nm).
Figure 44:
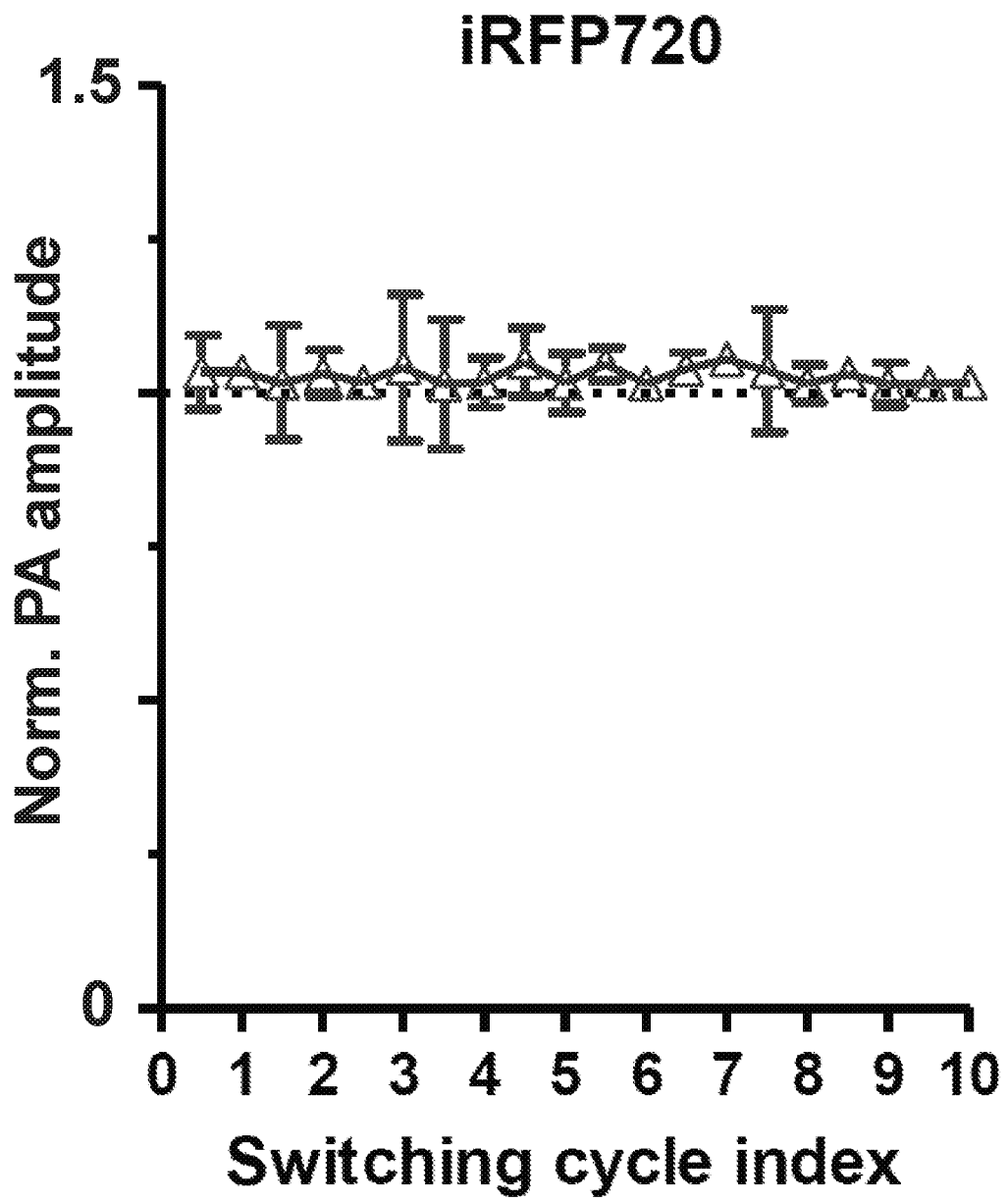
FIG. 44 shows a graph summarizing PA amplitude (normalized to that of oxyhemoglobin at 780 nm) produced by iRFP720 during exposure to 10 switching cycles between two illumination wavelengths.
Figure 45:
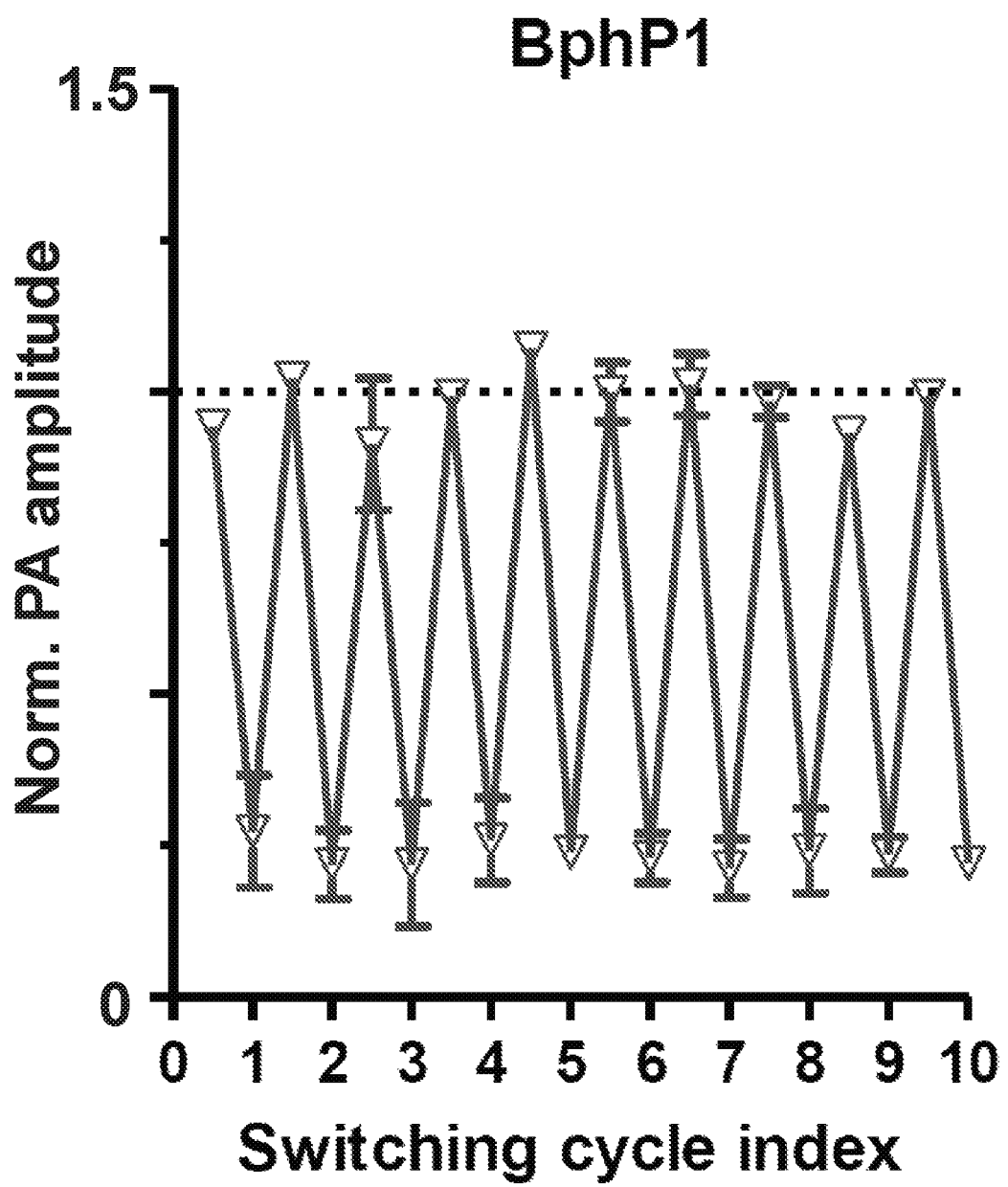
FIG. 45 shows a graph summarizing PA amplitude (normalized to that of oxyhemoglobin at 780 nm) produced by BphP1 during exposure to 10 switching cycles between two illumination wavelengths (630 nm and 780 nm).

FIG. 42 summarizes the normalized PA amplitude produced by the oxygenated whole bovine blood (HbO$_2$) sample over ten switching cycles. FIG. 43 summarizes the normalized PA amplitude produced by rsTagRFP sample over ten switching cycles. FIG. 44 summarizes the normalized PA amplitude produced by the iRFP720 sample over ten switching cycles. FIG. 45 summarizes the normalized PA amplitude produced by the BphP1 sample over ten switching cycles. Multiple switching cycles did not cause photobleaching of BphP1.

The results of this experiment demonstrated that BphP1 had a significant change in the PA signal amplitude between the Pr (OFF) state to the Pfr (ON) state. In addition, BphP1 could be photoswitched over numerous photoswitching cycles with no photobleaching effects.

Example 4: Effect of Imaging Depth on Activated and Deactivated Reversibly-Switched Probes To evaluate the effect of depth of the region of interest on the photoswitching of BphP1 and other potential RS-PA probe proteins, the following experiments were conducted.

RS-PA imaging for each of the purified proteins described in Ex. 1 (rsTagRFP, iRFP720, and BphP1) was conducted with each protein sample situated at depths of 0 mm, 5 mm, and 10 mm within the scattering media similar to the scattering media described in Ex. 2. Using the RS-PACT system described in Ex. 1, each sample was switched using the light pulse wavelengths as described in Ex. 3. A sample of oxygenated whole bovine blood (HbO$_2$) was placed beside each protein sample as a control.

Figure 23:
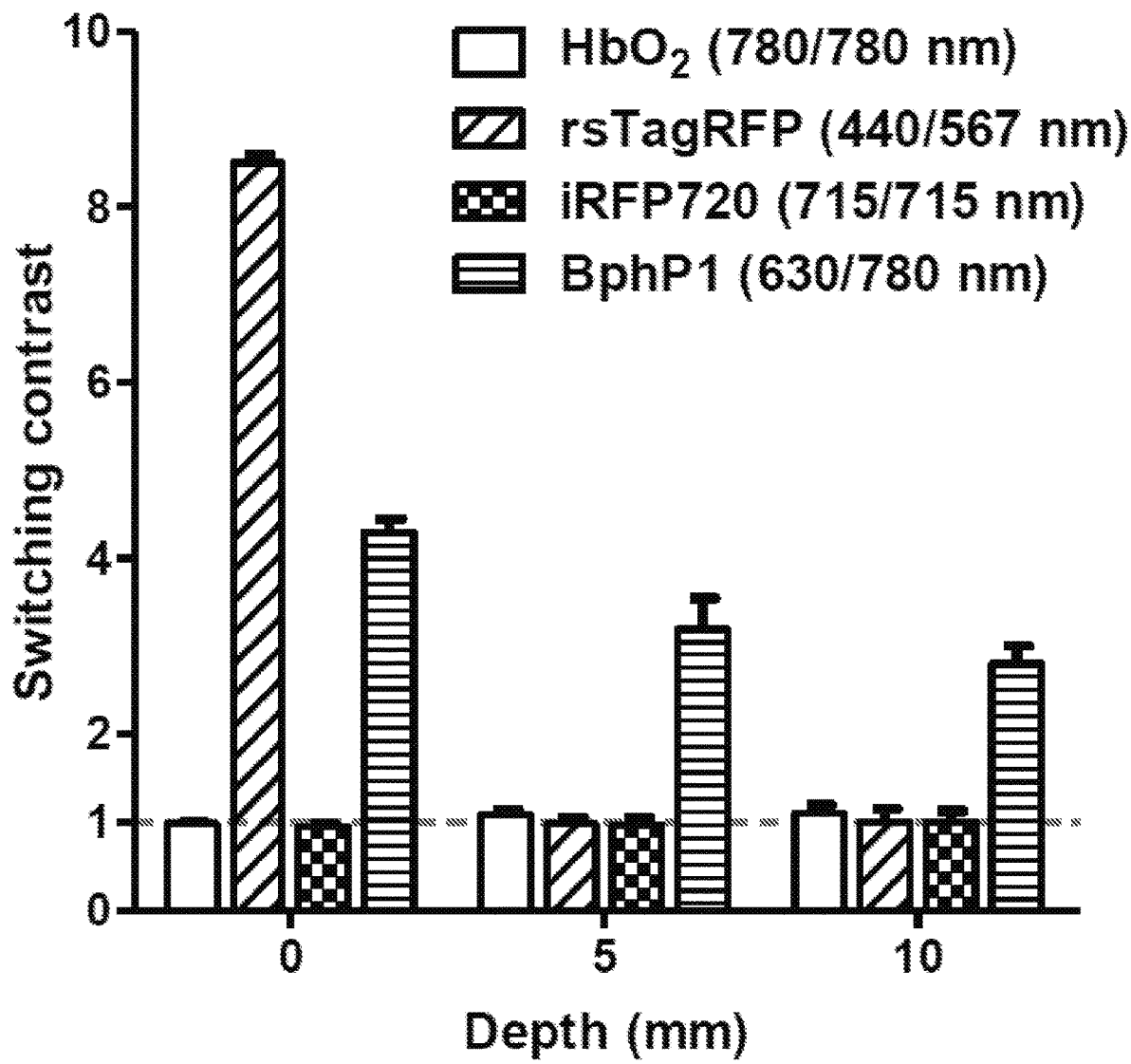
FIG. 23 shows a bar graph summarizing the switching contrast of hemoglobin and several other PA contrast compounds at depths of up to 10 mm in scattering media.

The switching contrast, defined herein as the ratio between the PA signal amplitudes measured in the ON and OFF states of each protein, were calculated for each of the protein samples, including the oxygenated whole bovine blood sample. FIG. 23 is a summary of the switching contrasts measured for each of the depths within the scattering media. HbO$_2$ and iRFP720 could not be photoswitched and thus had a switching contrast of unity at all depths. Although rsTagRFP had the best switching contrast of 8.5±0.3 in clear media (0 mm depth), rsTagRFP could not be photoswitched at depths beyond 2 mm, due to the strong light attenuation at 440 and 567 nm in the scattering media. BphP1, exhibited photoswitching capability at 630 and 780 nm at all depths, only reducing the switching contrast from 4.3±0.2 in clear media (0 mm) to 2.8±0.2 at 10 mm depth. The NIR switching wavelengths of BphP1 was clearly advantageous for deep PACT.

Figure 24:
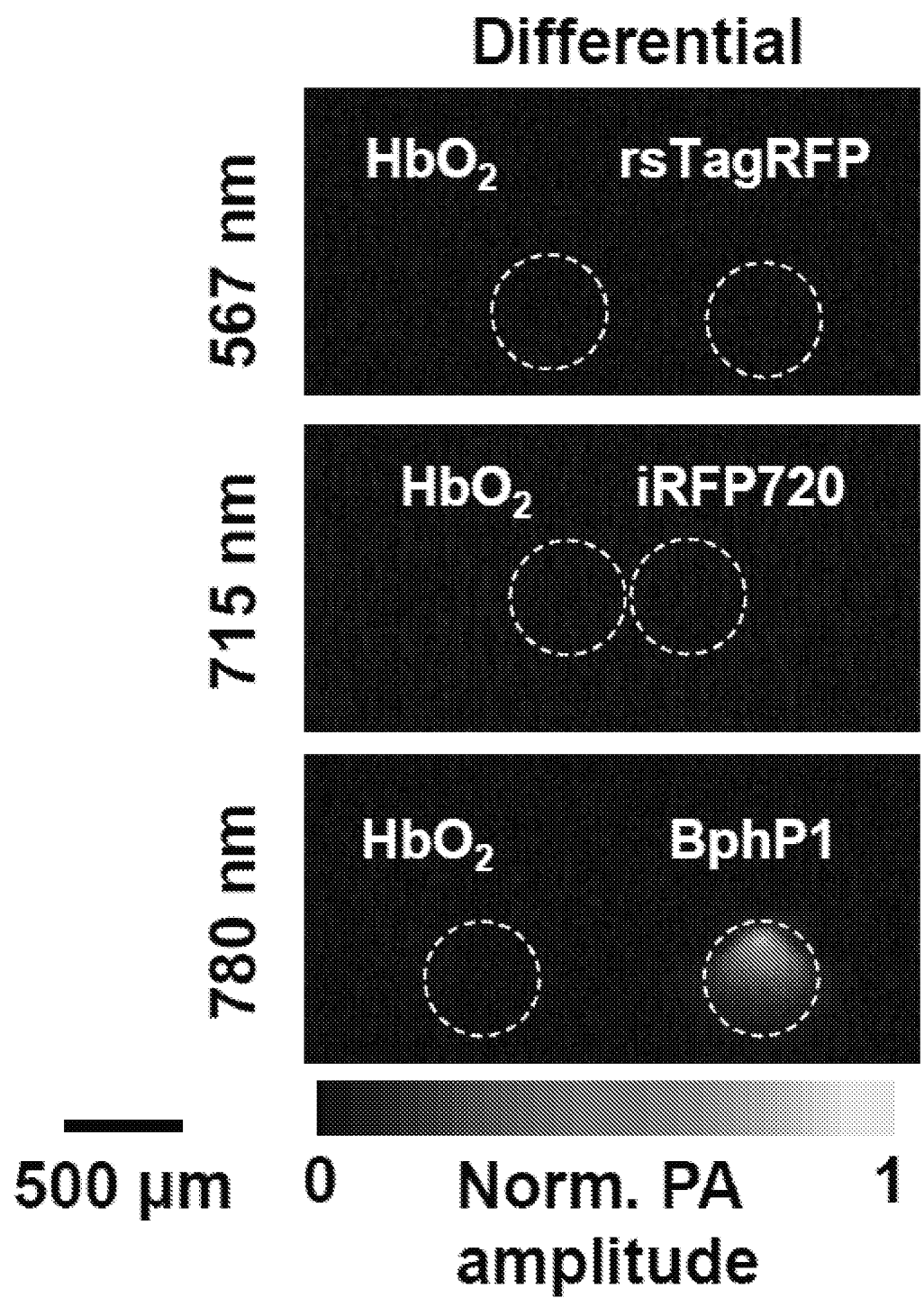
FIG. 24 shows differential PA images of hemoglobin and several PA probe compounds acquired at each compound's respective wavelength (567 nm, 715 nm, and 780 nm) at a depth of 10 mm.

FIG. 24 shows the RS-PA images obtained for each of the rsTagRFP, iRFP720, and BphP1 purified protein samples at a depth of 10 mm within the scattering media using PA pulses of 715 nm, 567 nm, and 780 nm, respectively. A sample of oxygenated whole bovine blood (HbO$_2$) was placed beside each protein sample as a control for the images shown in FIG. 24. Only the BphP1 sample produced a clearly visible RS-PA image at the 10 mm depth.

Figure 25:
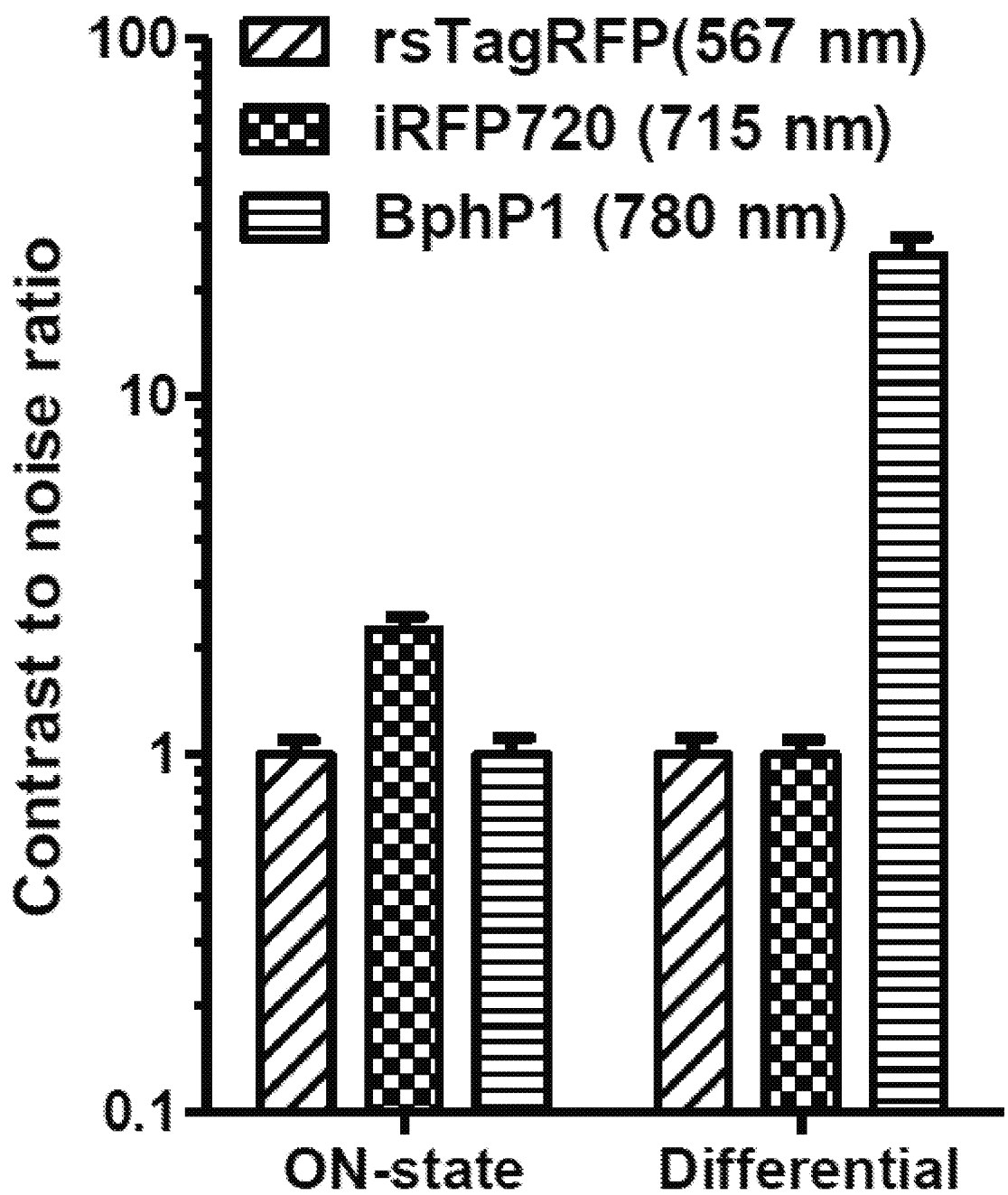
FIG. 25 shows a bar graph summarizing the contrast to noise ratio of several PA probe compounds measured using conventional PA imaging and reversibly-switchable PA imaging.

In addition, the contrast (between proteins and blood) to noise ratio (CNR) of the ON state and differential PA images for each of the samples at a depth of 10 mm was calculated for the each of the proteins. FIG. 25 is a summary of the contrast to noise ratios, showing that the differential PA image of BphP1 had the best CNR among the three proteins, which was ~21-fold higher than that of its ON state PA image. By contrast, the differential PA images had no improvements for rsTagRFP and iRFP720, which could not be detected or photoswitched at the 10 mm depth.

The results of this experiment demonstrated that RS-PA imaging using the BphP1 RS-PA probes provided a powerful detection method with a sensitivity limited, in principle, only by the noise inherent in the elements of the PAT system itself.

Example 5: RS-PACT of BphP1 in Mammalian Cells

To demonstrate the imaging of living cells expressing an RS-PA probe using the RS-PA imaging methods described herein above, the following experiments were conducted.

U87 human glioblastoma cells were used to stably express BphP1. Because BphP1 is non-fluorescent, in order to monitor its expression, a plasmid containing an internal ribosome entry site between BphP1 and EGFP was used. U87 cells were grown in DMEM medium supplemented with 10% FBS, penicillin-streptomycin mixture, and 2 mM glutamine (all from Life Technologies-Invitrogen) at 37° C. in 5% $CO_2$ air atmosphere. U87 stable preclonal mixture was obtained by transfecting cells with pIRES2-EGFP-BphP1 plasmid. Plasmid transfection was performed using an Effectene reagent (Qiagen). Cells were further selected with 700 μg/ml of G418 antibiotic for two weeks and enriched using a FACSAria sorter (BD Biosciences) equipped with a 488 nm laser and a 530/30 nm emission filter. For further cultivation of U87 cells stably expressing BphP1, the culture medium was additionally supplemented with 500 μg/ml of G418 (Corning).

Figure 46:
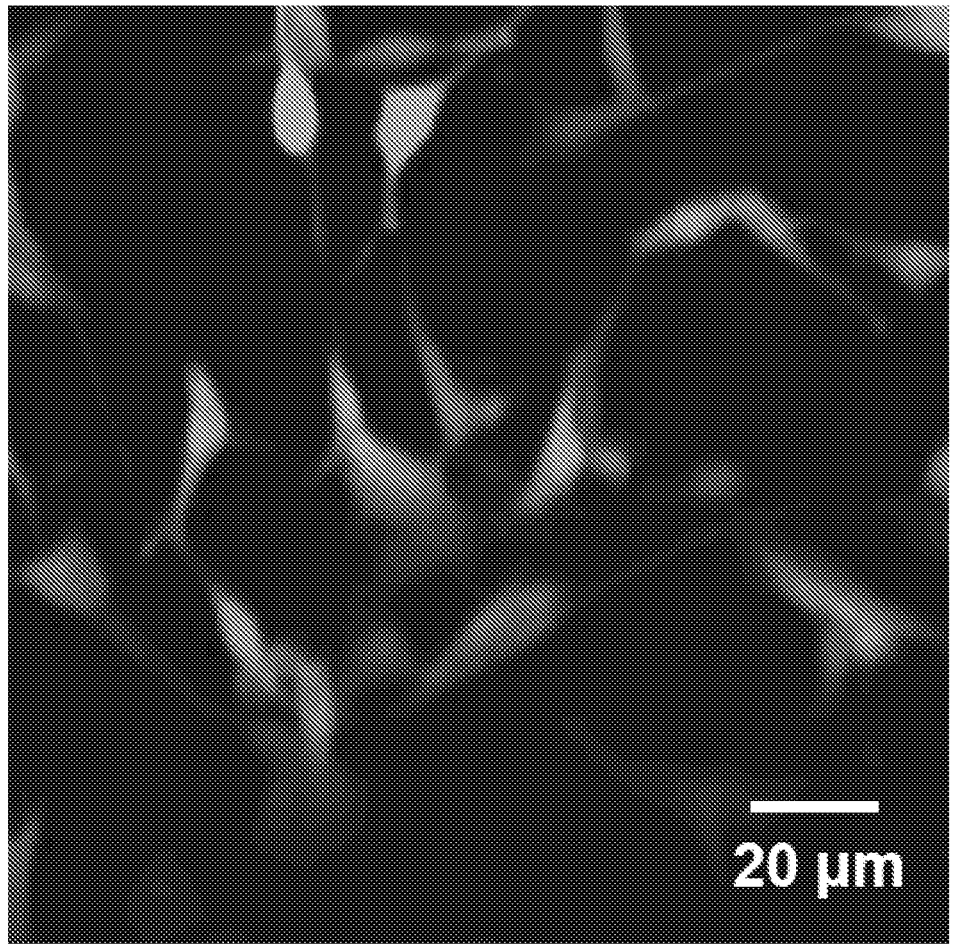
FIG. 46 shows a fluorescence microscopic image of BphP1-expressing U87 cells, in which EGFP was co-expressed to provide a fluorescence signal.

The BphP1-expressing U87 cells were imaged by widefield fluorescence microscopy (Fluoview 1000, Olympus), using the co-expressed EGFP protein (excitation wavelength: 488 nm; emission filter wavelength: 510 nm). A 20× objective (NA=0.70) was used to image the cells. FIG. 46 is an image of the U87 cells obtained using fluorescent imaging.

Figure 26:
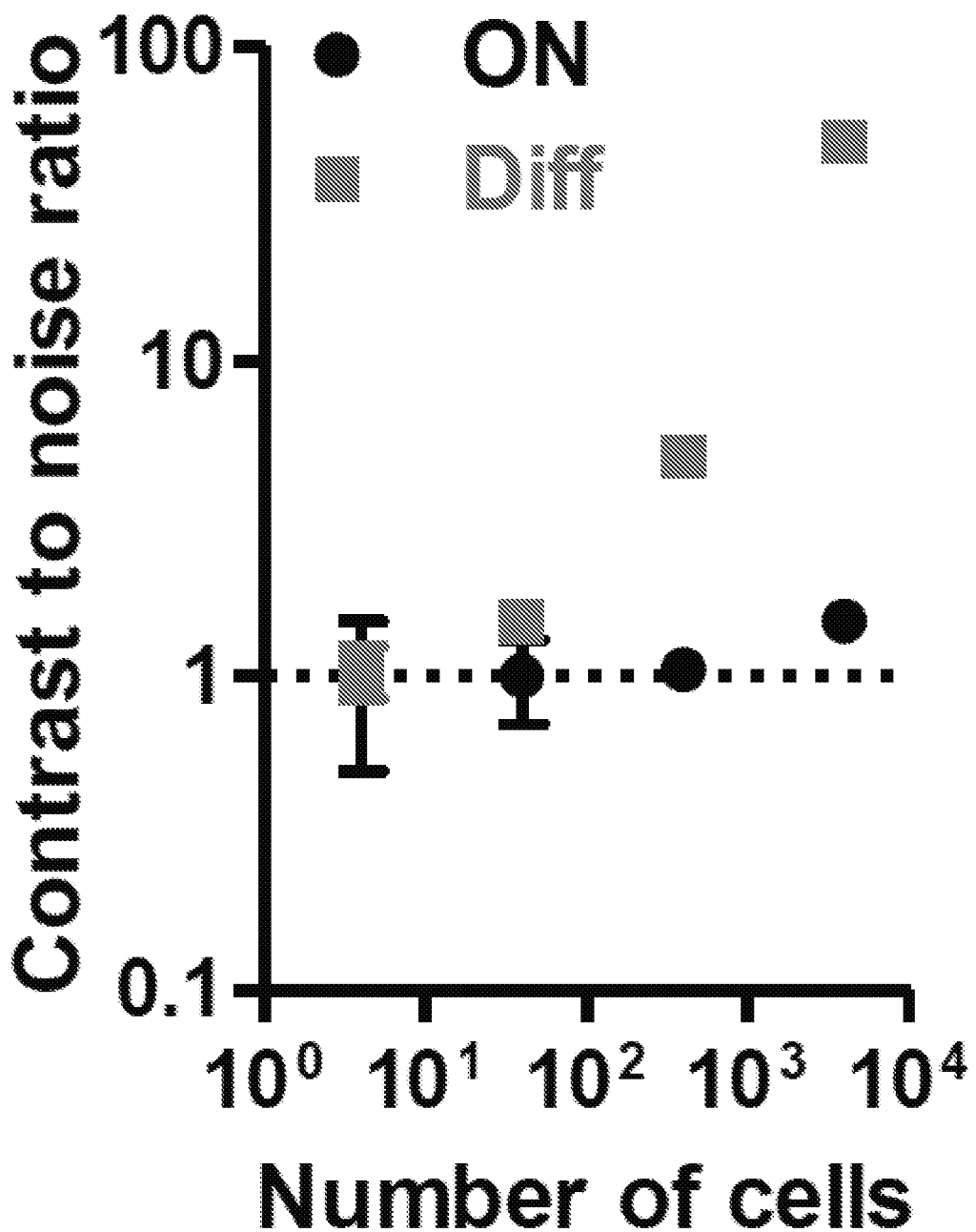
FIG. 26 shows a graph summarizing the contrast to noise ratio of cells expressing the non-fluorescent bacterial phytochrome BphP1 measured using conventional PA imaging and reversibly-switchable PA imaging as a function of the number of cells expressing the PA probe.
Figure 47A:
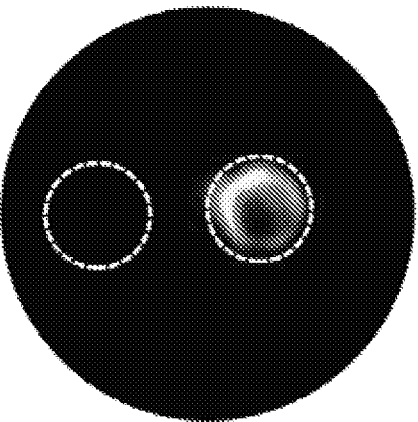
FIG. 47A shows a conventional PA image of BphP1-expressing U87 cells and $HbO_2$ placed at 10 mm depth in scattering media mixed with blood to provide background signal in which the BphP1 cells are in an absorbent ON state.
Figure 47B:
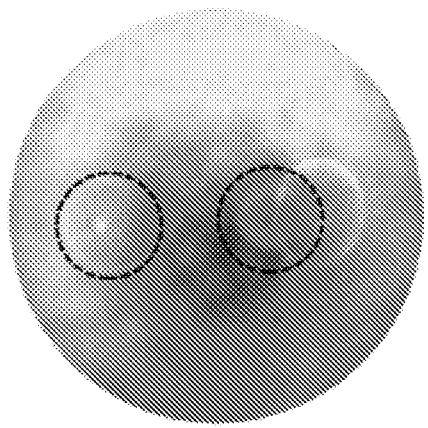
FIG. 47B shows a conventional PA image of BphP1-expressing U87 cells and $HbO_2$ placed at 10 mm depth in scattering media mixed with blood to provide background signal in which the BphP1 cells are in a less-absorbent OFF state.
Figure 47C:
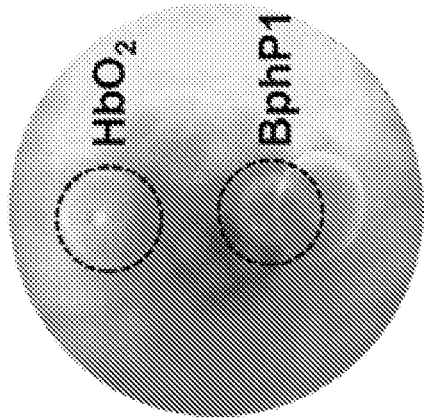
FIG. 47C shows an RS-PA image (differential) of BphP1-expressing U87 cells and $HbO_2$ placed at 10 mm depth in scattering media mixed with blood to provide background.
Figure 48:
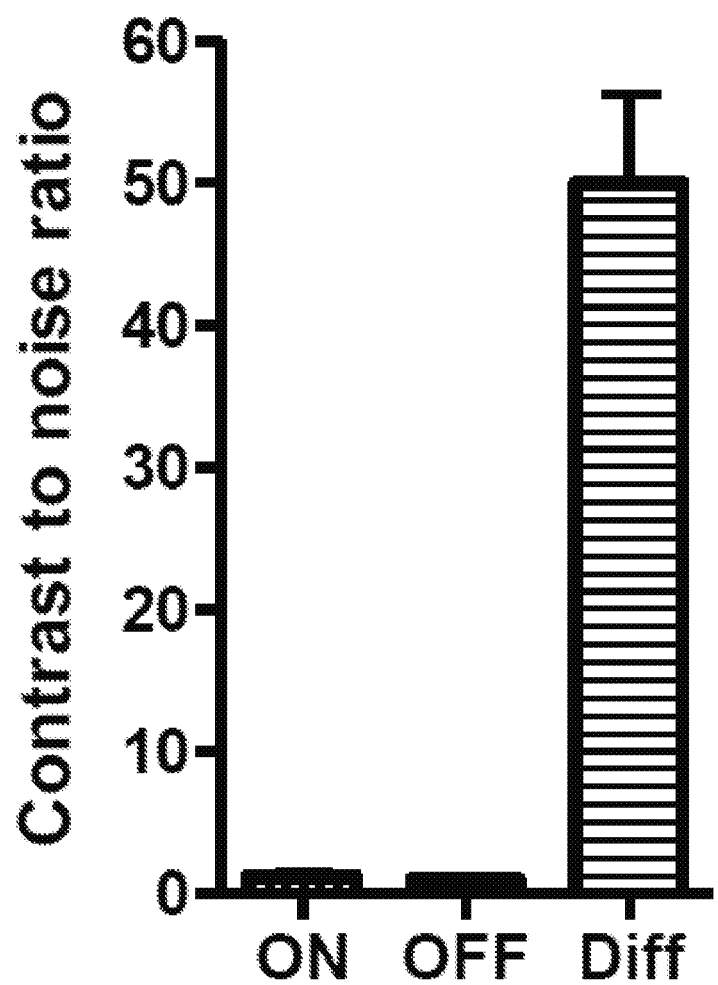
FIG. 48 shows a bar graph summarizing the contrast to noise ratios quantified from the images of FIG. 47A (ON), FIG. 47B (OFF), and FIG. 47C (Diff).
Figure 49:
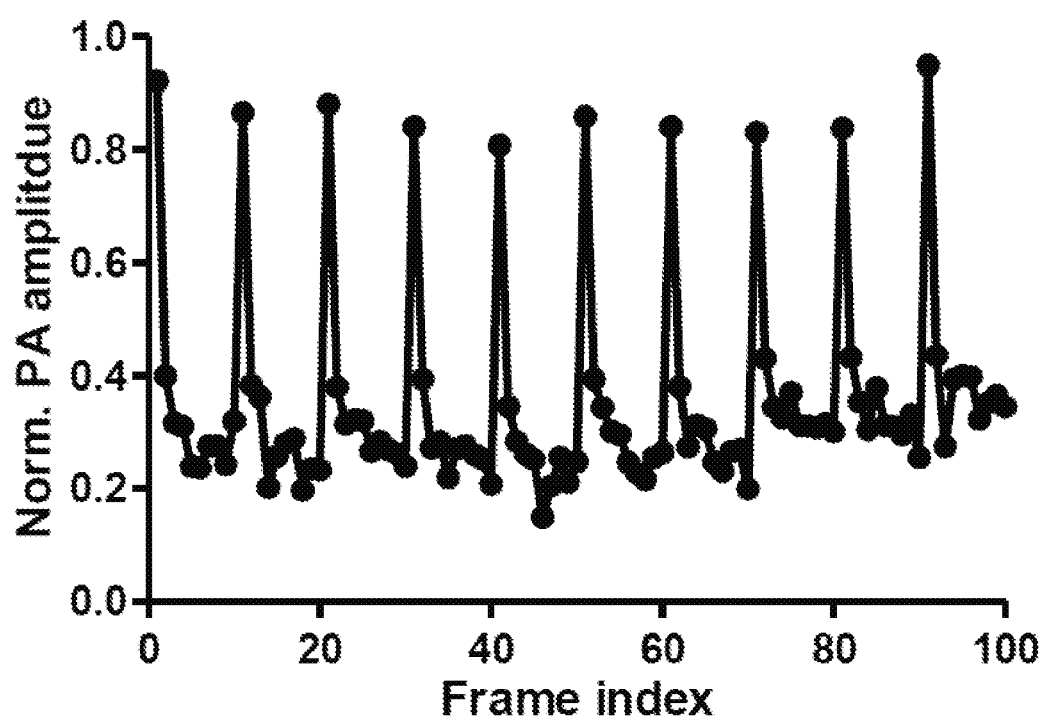
FIG. 49 shows a graph summarizing normalized PA amplitude produced by BphP1-expressing U87 cells during exposure to 10 switching cycles between two illumination wavelengths (630 nm and 780 nm).

BphP1-expressing U87 cells embedded in scattering media at 10 mm depth were also imaged using the RS-PACT system of Ex. 1. All PA images were acquired at PA pulse wavelengths of 780 nm. FIG. 47A, FIG. 47B, and FIG. 47C, show the PA images of the BphP1-expressing U87 cells, shown next to an oxygenated whole bovine blood ($HbO_2$) sample for comparison. The PA images acquired before (ON) and after (OFF) the photoswitching both had strong background signals, resulting in extremely poor image contrast of the U87 cells, as illustrated in FIG. 47A and FIG. 47B. However, the differential image (Differential) averaged over 20 switching cycles and shown in FIG. 47C, largely removed the non-switchable background signals and achieved a 50-fold enhancement in CNR (see FIG. 48), allowing clear visualization of the otherwise undetected U87 cells. Multiple switching cycles did not cause detectable photobleaching of the cells, as shown in FIG. 49. By gradually decreasing the number of U87 cells, a noise-equivalent detection sensitivity of ~20 cells with the differential PA imaging was observed, whereas the detection sensitivity for ON state PA imaging was ~1000 cells, as illustrated in FIG. 26.

Example 6: In Vivo RS-PACT of BphP1 Expressed in Mouse Kidney Tumor

To demonstrate RS-PACT imaging of a tumor within a living animal, the following experiments were conducted.

Adult, two- to three-month-old nude mice (Hsd:Athymic Nude-Fox1$_{NU}$, Harlan Co.; body weight: ~20-30 g) were used for all in vivo experiments. To implant xenograph tumors into the animal kidney, about $10^6$ U87 cells, stably expressing BphP1 in 0.2 mL PBS were injected into mice with the guidance of a commercial ultrasound system (Vevo LAZR, Visualsonics). A whole-body PACT was performed one week after injection of $10^6$ BphP1-expressing U87 cells into the left kidney of a mouse.

Throughout the experiment, the mouse was maintained under anesthesia with 1.5% vaporized isoflurane. The mouse was taped to a lab-made motorized animal holder, which held the animal upright during imaging. The top of the holder was a small aluminum tube affixed to the animal's nose and mouth, and the bottom was an aluminum cylinder attached to a permanent magnet. The magnet securely held the animal holder to the scanning stage for elevational scanning. The animal's fore and hind legs were taped to the top and bottom parts of the holder, respectively. The two parts were connected by four lengths of high-strength fishing line (0.13 mm diameter braided line). The combination of the magnet and a counterweight put the thin lines in tension to minimize holder movement caused by animal respiratory motion. The animal's trunk was immersed in water, and its body temperature was maintained at 37° C. by circulating the water through a heating bath outside the tank.

Figure 27A:
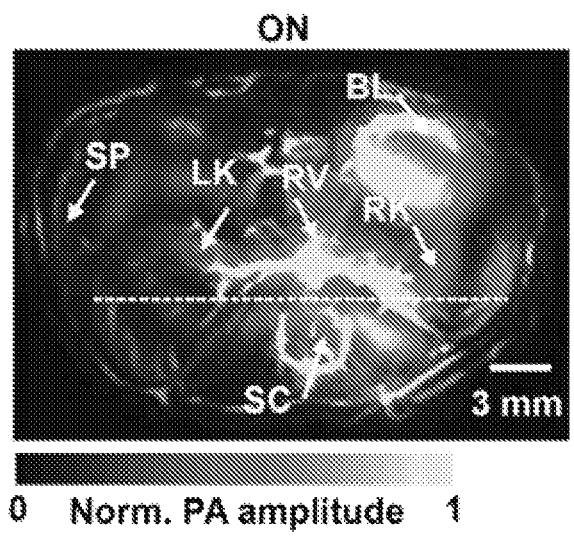
FIG. 27A shows an in vivo whole-body PACT image of the kidney region of a nude mouse, acquired one week after injection of ~$10^6$ BphP1-expressing U87 cells into the left kidney in which the BphP1 is switched into an absorbent ON state; overlaid arrows and text denote major blood-enriched internal organs, including: left kidney (LK), right kidney (RK), spinal cord (SC), renal vein (RV), bladder (BL), and spleen (SP).
Figure 27B:
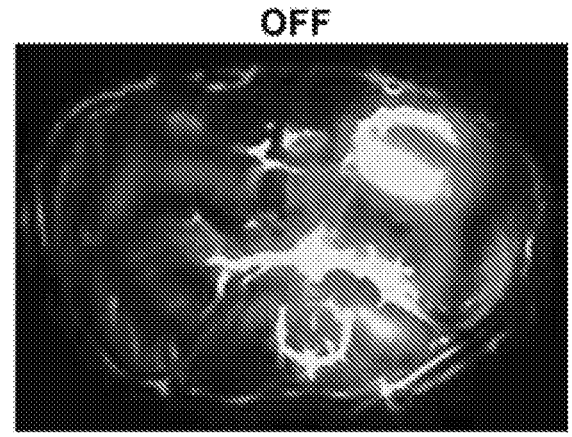
FIG. 27B shows a similar in vivo whole-body PACT image of the kidney region of a nude mouse in which the BphP1 is switched into a less-absorbent OFF state.
Figure 27C:
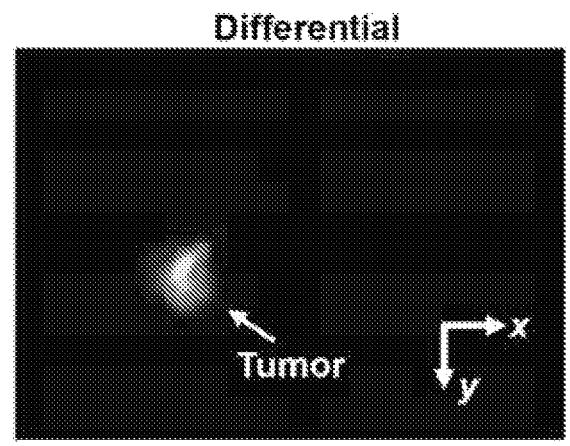
FIG. 27C shows a differential (RS-PA) image between the Pfr state image of FIG. 27A and the Pr state image of FIG. 27B, highlighting a tumor containing U87 cells within the kidney region.

FIGS. 27A, 27B, and 27C are images of the left kidney of the mouse obtained PACT with the BphP1 in the ON state (FIG. 27A), PACT with the BphP1 in the OFF state (FIG. 27B), and RS-PACT (FIG. 27C). Major organs, including the skin, kidneys, spleen, bladder, and spinal cord, could be delineated with hemoglobin as the endogenous contrast (see FIGS. 27A and 27B). However, the BphP1-expressing U87 tumor in the left kidney, overwhelmed by the blood signals, could not be detected in the ON and OFF state images of FIG. 27A and FIG. 27B, respectively. By contrast, the differential PA image clearly showed the tumor at a depth up to ~8 mm, with an average CNR of ~20, as illustrated in FIG. 27C.

Figure 28:
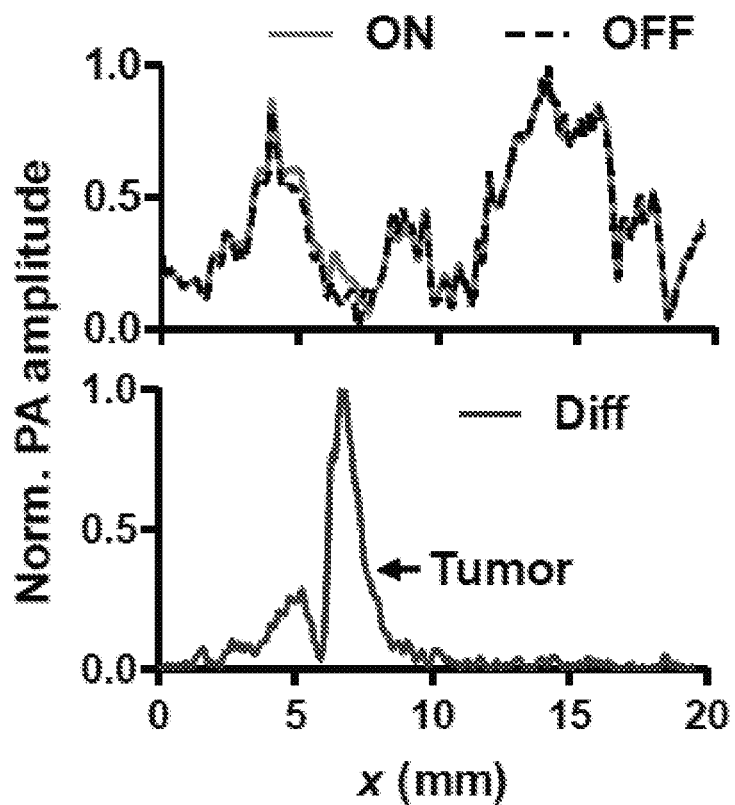
FIG. 28 shows a graph summarizing a normalized signal profiles of the images of FIG. 27A (ON), FIG. 27B (OFF), and FIG. 27C (Diff) images obtained along a transect defined by the line overlaid on the image of FIG. 27A.

The PA signal along a transect positioned along the dashed line shown in FIG. 27A was evaluated for each of the images of FIGS. 27A, 27B, and 27C. This additional quantitative analysis confirmed that the photoswitchable tumor cells had different signal amplitudes in the ON and OFF state images, while the non-switchable background signals from blood cells were virtually identical, as summarized in FIG. 28.

Figure 29:
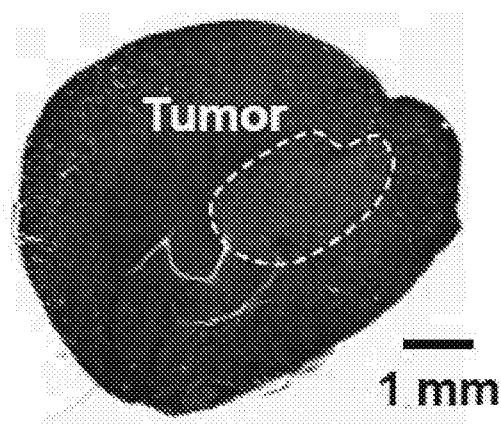
FIG. 29 shows an H&E histological image of a harvested left kidney similar to the kidney imaged in FIGS. 27A, 27B, 27C, and 28, showing a circled tumor region.
Figure 30:
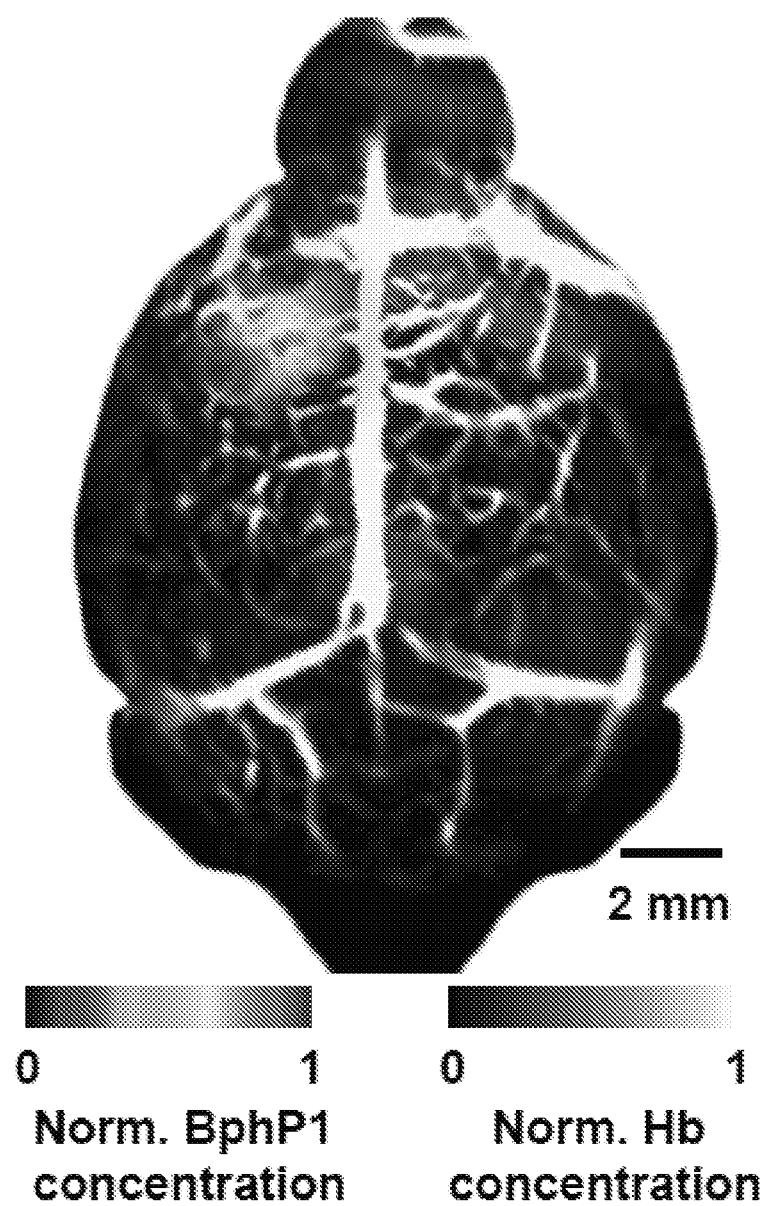
FIG. 30 shows an overlay image similar to the overlay image of FIG. 4 obtained for a tumor containing BphP1-expressing U87 cells within a mouse brain approximately 3 mm below the scalp surface.

After PA imaging, the tumor region in the left kidney was histologically confirmed, as shown in FIG. 29. The tumor-bearing kidney was harvested and postfixed in 4% paraformaldehyde for 24 h. Coronal sections (5 μm thick) were cut with paraffin embedding. Standard H&E staining was performed on the sections, which were examined using brightfield microscopy (NanoZoomer, Hamamatsu) with a 20× objective (NA=0.67).

Figure 50A:
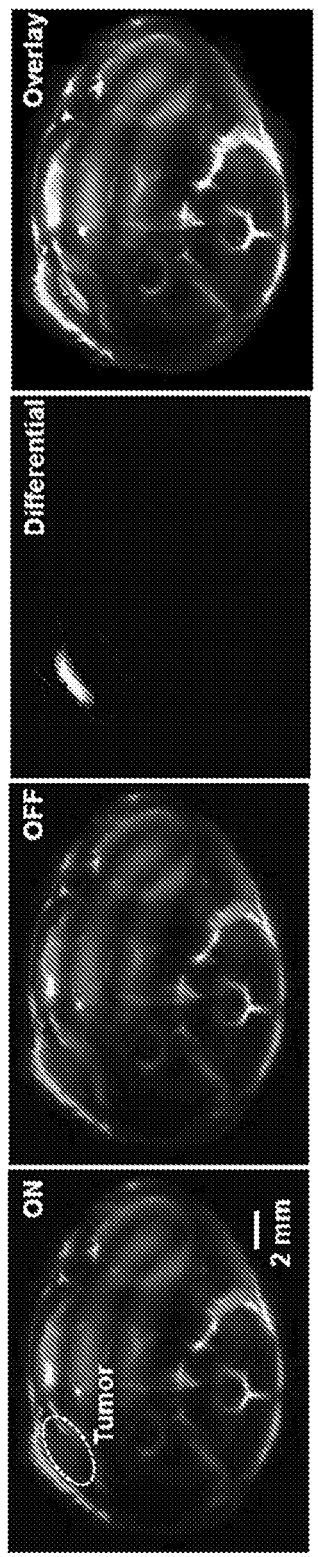
FIG. 50A shows a series of images of a BphP1-expressing U87 cell tumor: a conventional PA image obtained with the BphP1 switched into an absorbent ON state; a conventional PA image obtained with the BphP1 is switched into a less-absorbent OFF state, an RS-PA image (Differential), and an RS-PA image in color overlaid on a greyscale conventional PA image obtained with the BphP1 switched into a less-absorbent OFF state (Overlay).
Figure 50B:
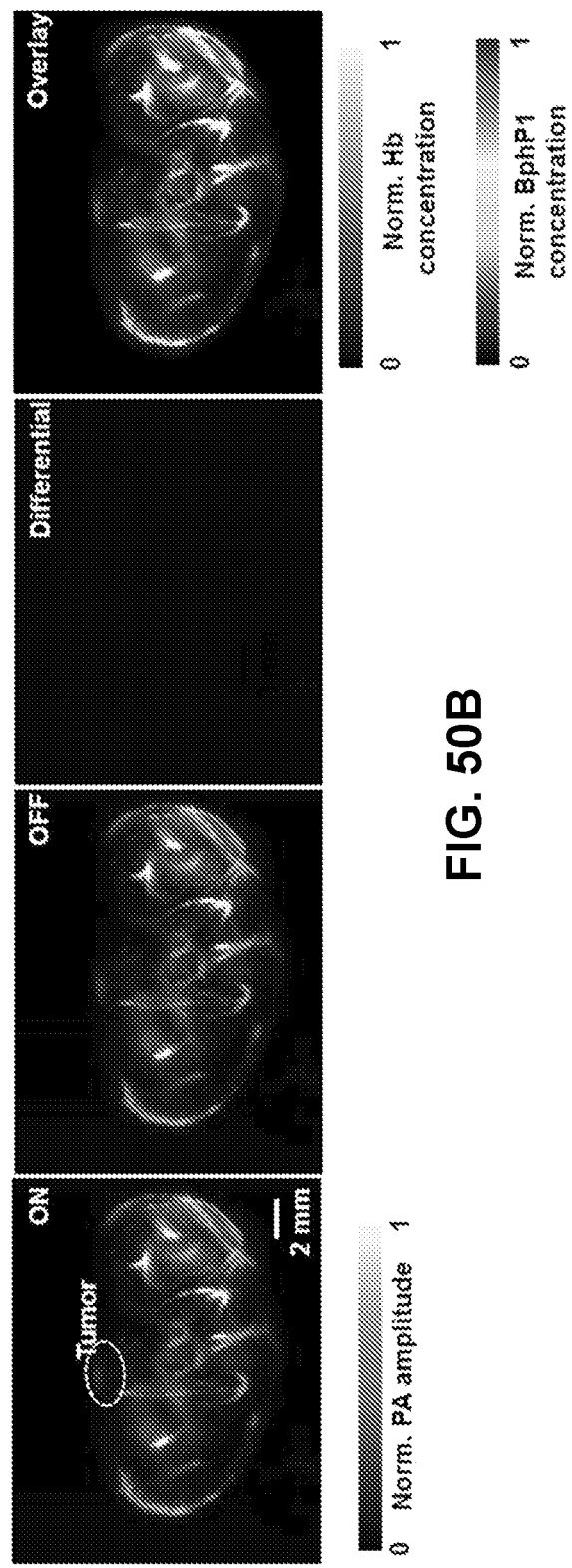
FIG. 50B shows a series of images corresponding to the images of FIG. 50A, in which the U87 tumor cells do not express BphP1.

In addition, BphP1-expressing U87 cells were similarly injected into a flank of a mouse similar to the mice described previously. In the same flank of the same mouse, wild-type U87 cells that did not express BphP1 were injected at a different site. FIG. 50A is a series of images obtained using the RS-PACT system with the BphP1 in the ON state (ON), PACT with the BphP1 in the OFF state (OFF), RS-PACT (Differential), and the RS-PACT image in color overlaid on the PA image in the off state (Overlay). FIG. 50B is a series of images of the wild-type U87 cells obtained using the same conditions and settings as the corresponding images in FIG. 50A. The RS-PACT image obtained with the BphP1-expressing U87 cells (see FIG. 50A, Differential) resulted in a substantially superior image of the U87 tumor.

The results of this experiment demonstrated that RS-PACT was capable of three-dimensional (3D) imaging of the BphP1-expressing tumor with elevational scanning along the animal's trunk.

Example 7: In Vivo RS-PACT of Mouse Brain Tumor

To demonstrate RS-PACT imaging of a brain tumor within a living animal, the following experiments were conducted.

About $10^6$ U87 cells stably expressing BphP1 in 0.2 mL PBS were injected into the brains of mice with the guidance of a commercial ultrasound system (Vevo LAZR, Visualsonics) as described in Ex. 6. A whole-body PACT was performed two weeks after injection of $10^6$ BphP1-expressing U87 cells into the brain of a mouse as described in Ex. 6.

Figure 51:
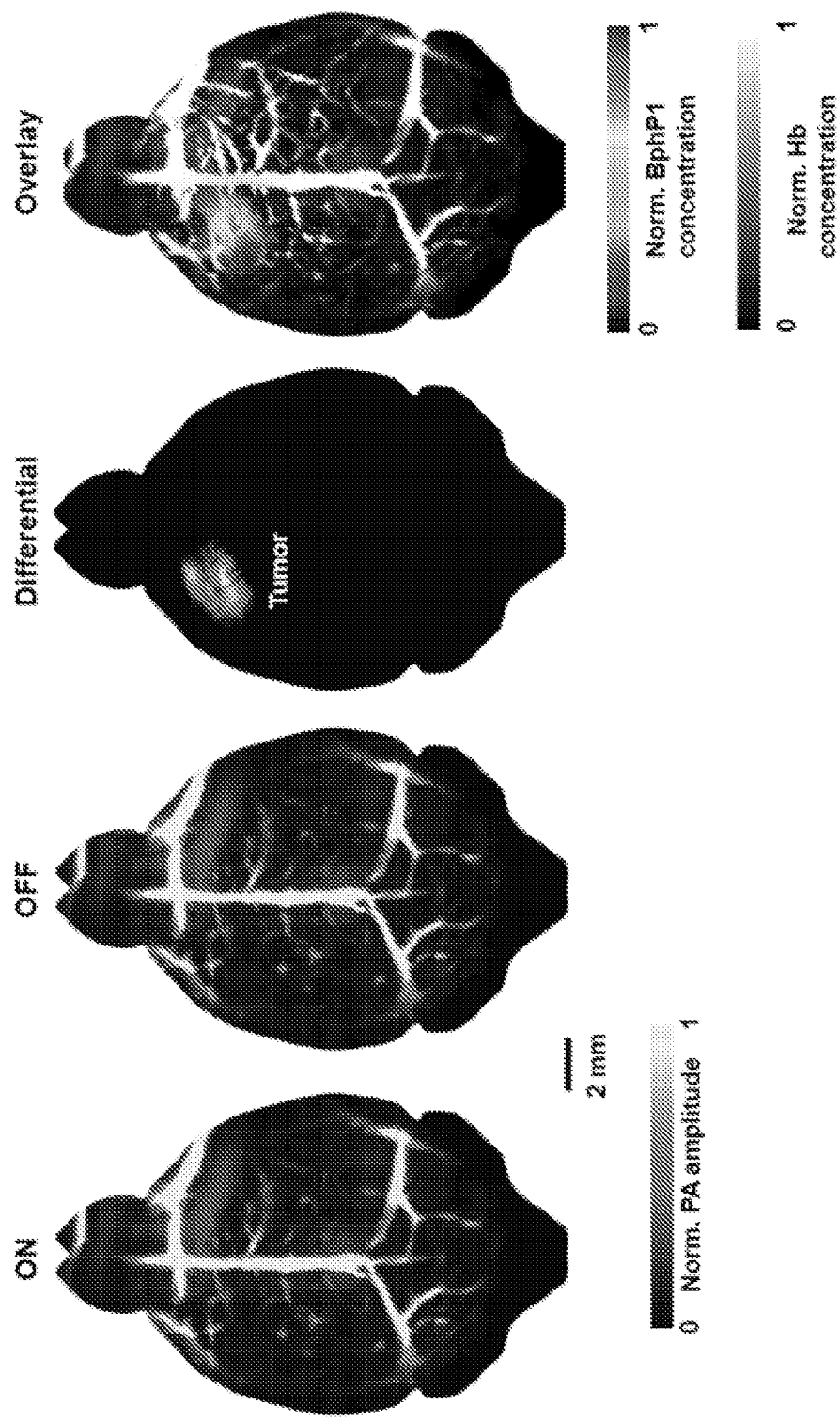
FIG. 51 shows a series of images of a BphP1-expressing U87 cell tumor in a mouse brain approximately 3 mm beneath the scalp surface: a conventional OR-PAM image obtained with the BphP1 switched into an absorbent ON state (ON); a conventional PA image obtained with the BphP1 is switched into a less-absorbent OFF state (OFF), an RS-PAM image (Differential), and the color RS-PA image overlaid on a greyscale conventional PA image obtained with the BphP1 switched into a non-absorbent cis conformation (Overlay).

FIG. 51 is a series of images obtained using the RS-PACT system: PACT with the BphP1 in the ON state (ON), PACT with the BphP1 in the OFF state (OFF), RS-PACT (Differential), and the RS-PACT image in color overlaid on the PA image in the off state (Overlay). The tumor, situated at ~3 mm depth beneath the scalp surface, was invisible in either the ON state or OFF state images due to the overwhelming background signals from blood in the mouse brain. The differential image, by contrast, clearly shows the tumor by substantially suppressing these background signals. The overlay image shows the BphP1 signal in color and the background blood signal (from the OFF PACT image) in gray.

The results of this experiment demonstrated the effectiveness of RS-PACT imaging for the visualization of brain tumors that may not otherwise be amenable to detection using other imaging methods.

Example 8: Longitudinal Monitoring In Vivo of Tumor Metastases Using RS-PACT To demonstrate the longitudinal monitoring of the growth of a tumor in vivo in a mouse liver, the following experiments were conducted.

Figure 31:
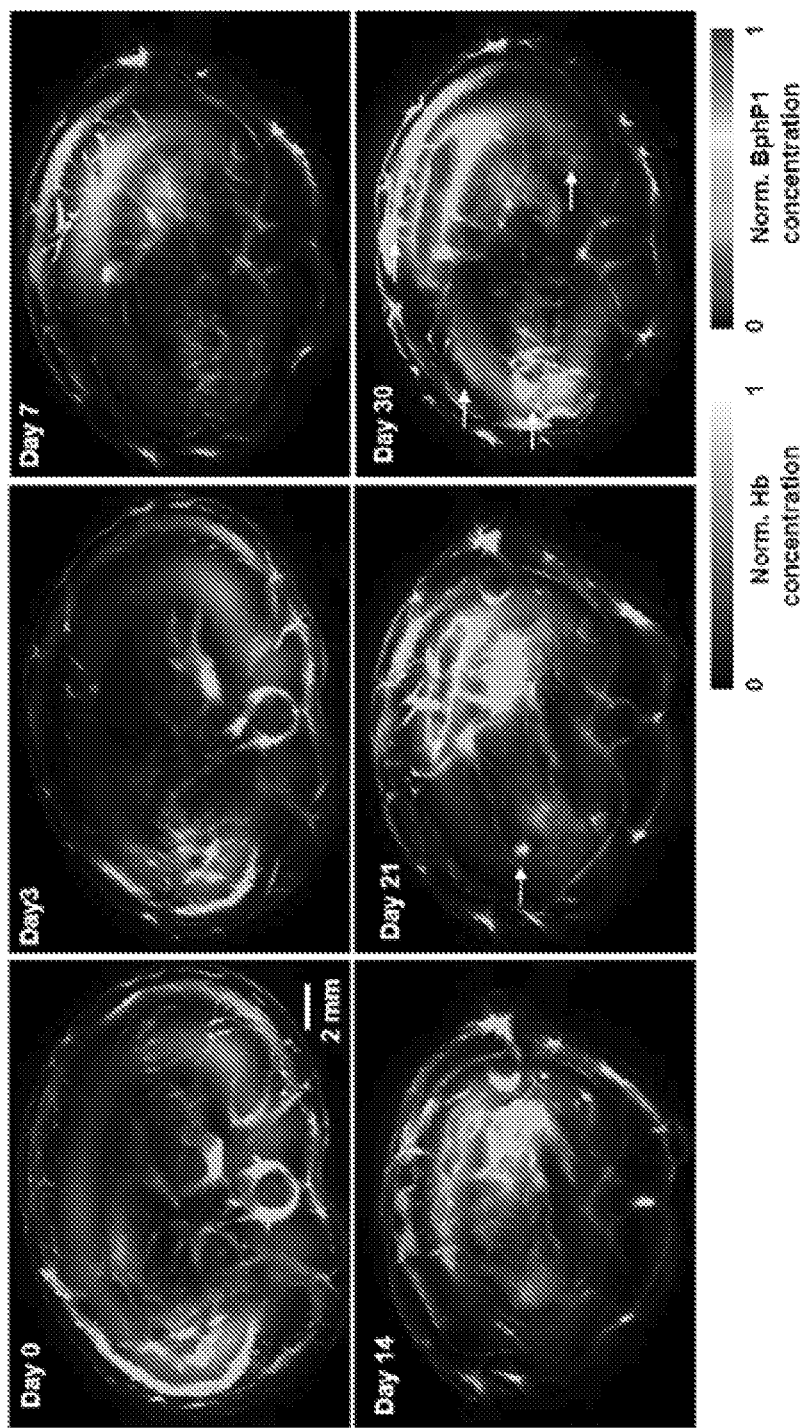
FIG. 31 shows a representative series of overlay images, similar to the overlay image of FIG. 4, obtained during longitudinal RS-PA monitoring of cancer metastasis in a mouse liver (n=6). The whole-body overlay images of the liver region of a representative nude mouse were obtained repeatedly for 30 days after the injection of BphP1-expressing U87 cells into the right liver lobe. White arrows superimposed on the Day 21 and Day 30 images indicate secondary tumors resulting from metastasis of the primary tumor.

BphP1-expressing U87 tumors were induced by injecting about $10^6$ U87 cells stably expressing BphP1 in 0.2 mL PBS into the livers of mice with the guidance of a commercial ultrasound system (Vevo LAZR, Visualsonics) as described in Ex. 6. The growth of a BphP1-expressing U87 tumor in a mouse liver and tumor metastases in the liver lobes (n=6) were monitored by longitudinally imaging the mouse livers using the RS-PACT system described in Ex. 1. The liver region was first imaged before the implantation of U87 cells (day 0), and then tumor growth was monitored for a month. FIG. 31 is a series of color RS-PACT images overlaid on a corresponding series of PA images obtained with the BphP1 in the OFF state at days 0, 3, 7, 14, 21, and 30 after injection of the U87 cells.

Figure 32:
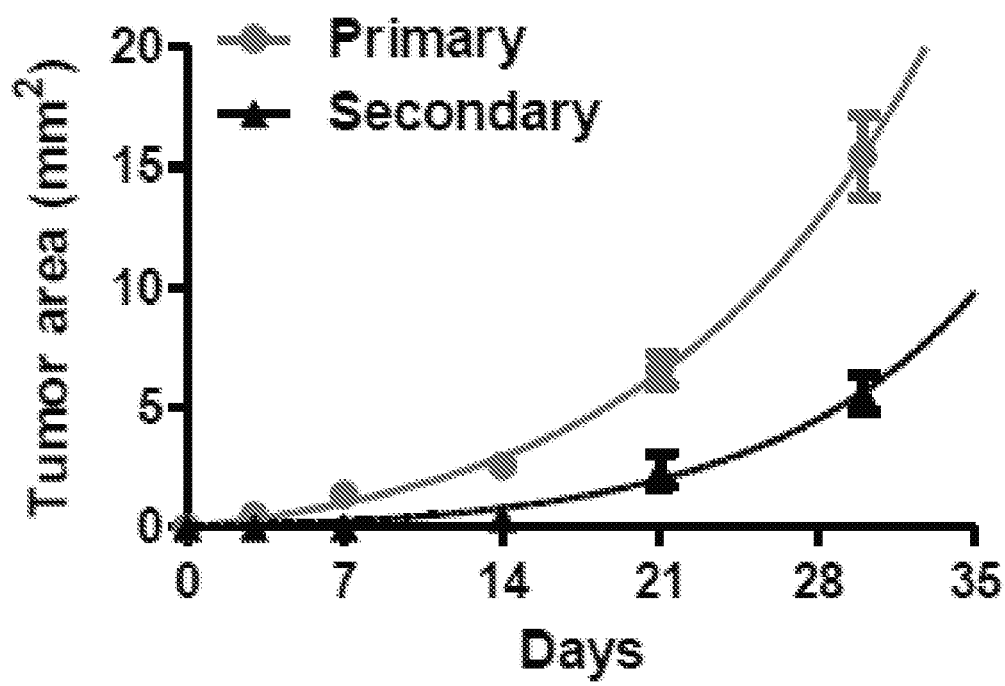
FIG. 32 shows a graph summarizing the increase in areas of the primary and secondary tumors monitored using longitudinal RS-PA imaging as summarized in FIG. 31. Error bars on the graph indicate standard errors.

As illustrated in FIG. 31, the RS-PACT images clearly detected the growth of a primary tumor in the right liver lobe for the first two weeks, and later the secondary tumors as well, resulting from metastatic spread to other liver lobes. FIG. 32 summarizes the growth of the primary tumor and secondary tumors detected in the images of FIG. 31. The smallest secondary tumor had an average diameter of ~300 µm. Given that the mean diameter of each U87 cell is ~20 µm (measured using fluorescence microscopy), each image voxel of the secondary tumor corresponds to ~375 U87 cells. The CNR of the above-mentioned tumor is ~15 in the differential image, suggesting it is possible to detect as few as ~25 cells at this depth, which is consistent with the in vitro cell detection limit indicated in FIG. 26 of Ex. 5. Over the period of one month, a clear exponential growth in the primary tumor cross-sectional area, and a delayed exponential growth in the secondary tumor cross-sectional area was observed, as illustrated in FIG. 32. There was no significant difference between the growth rates of the primary tumor (from day 0) and secondary tumor (from day 7). The cross-sectional area doubling times of the primary tumor and secondary tumors were respectively 8.0±1.2 days and 7.2±2.7 days, suggesting cell doubling times of 5.3±0.8 days and 4.8±1.8 days.

Figure 33:
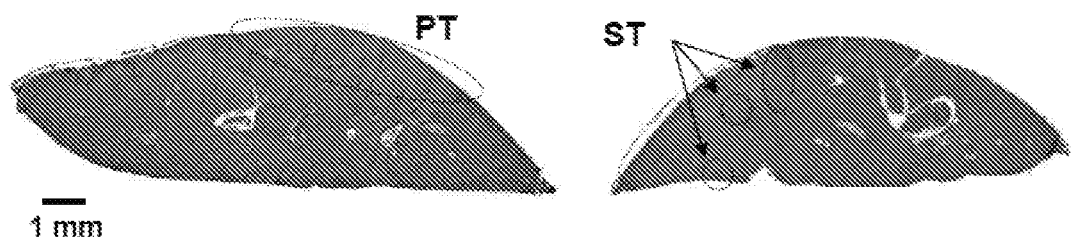
FIG. 33 shows representative H&E histological images of the mouse liver lobes imaged in FIG. 31 with the primary tumor (PT) and secondary tumors (ST) indicated.

After the PA imaging, the tumor regions by histology of the isolated liver was confirmed, as shown in FIG. 33. The tumor-bearing kidney was harvested and postfixed in 4% paraformaldehyde for 24 h. Coronal sections (5 µm thick) were cut with paraffin embedding. Standard H&E staining was performed on the sections, which were examined using bright-field microscopy (NanoZoomer, Hamamatsu) with a 20× objective (NA=0.67).

The results of this experiment demonstrated the capability of the RS-PACT system, in concert with the cell-expressed BphP1 RS-PA probe, to monitor the growth and metastasis of tumors in vivo with high sensitivity and resolution.

Example 9: Reversibly-Switched Microscopy (RS-PAM) of Tumors within Mouse Ear To demonstrate the microscopy of structures in vivo using the reversibly-switched photoacoustic (RS-PA) methods disclosed herein, the following experiments were conducted.

A reversibly-switchable photoacoustic microscopy (RS-PAM) system similar to the RS-PAM system described herein previously and illustrated in FIG. 6 was used to obtain RS-PAM images. In this RS-PAM, a pulsed Nd:YLF laser (INNOSLAB, 523 nm, Edgewave) pumped a dye laser (CBR-D, Sirah) to provide 780 nm light for PA imaging and for switching off BphP1. A 630 nm laser diode (Information Unlimited Inc.) switched on the protein. The light beams were combined by a dichroic mirror, reshaped by an iris (ID25SS, Thorlabs) and attenuated by a neutral density filter (NDC-50C-2M, Thorlabs). The attenuated beam was then split into two sub-beams (top and bottom) by a 50/50 beam splitter (BSW04, Thorlabs). The top beam was focused by a condenser lens (LA1131, Thorlabs) before passing through a 50 µm pinhole (P50C, Thorlabs) for further spatial filtering. The filtered beam was then focused by an optical objective (AC127-050-A, Thorlabs. NA: 0.1 in air) into the object from the top. A beam combiner composed of a thin layer of silicone oil sandwiched by a right-angle prism (NT32-545, Edmund Optics) and a rhomboid prism (NT49-419, Edmund Optics) provided acoustic-optical coaxial alignment. The resultant photoacoustic waves were detected by an ultrasonic transducer (V214-BB-RM, Olympus-NDT) with a central frequency of 50 MHz. An acoustic lens with a 0.5 NA was ground into the bottom of the rhomboid prism to provide an acoustic focal diameter of 30 µm. An optical correction lens was attached to the top of the beam combiner to correct aberration. The acoustic lens was submerged in a water-tank for ultrasound coupling. The bottom beam duplicated the same path as the top beam, except that it was directly focused into the object from the bottom without going through the beam combiner and water-tank. The bottom objective had a 1.4 NA with oil immersion (MPLAPON100XO, Olympus). By carefully adjusting the positions of the two objectives, a confocal configuration of the two optical foci and the acoustic focus was achieved. Volumetric imaging was acquired by two-dimensional raster scanning of the object. A photodiode was added to monitor the fluctuations of the laser pulse energy.

BphP1-expressing U87 tumors were induced by injecting about $10^6$ U87 cells stably expressing BphP1 in 0.2 mL PBS into the ears of mice with the guidance of a commercial ultrasound system (Vevo LAZR, Visualsonics) as described in Ex. 6.

Figure 52:
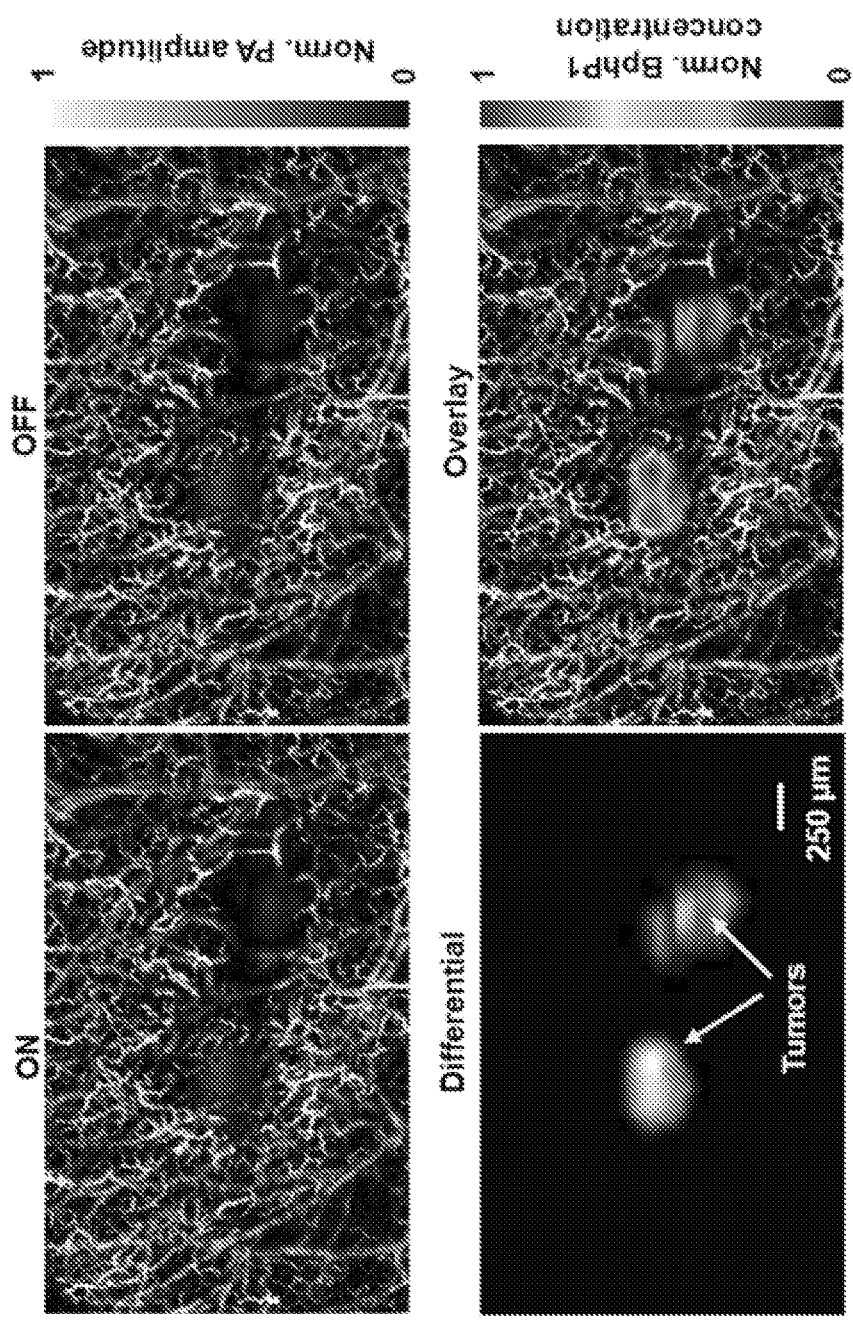
FIG. 52 shows a series of optical-resolution PA microscopic (OR-PAM) images of BphP1-expressing U87 cell tumors in a mouse ear: a conventional OR-PAM image obtained with the BphP1 switched into an absorbent ON state (ON); a conventional OR-PAM image obtained with the BphP1 is switched into a less-absorbent OFF state (OFF), an RS-PAM image (Differential), and the color RS-PAM image overlaid on a greyscale conventional OR-PAM image obtained with the BphP1 switched into a less-absorbent OFF state (Overlay).

FIG. 52 is a series of images of the mouse ear bearing two BphP1-expressing U87 tumors obtained using the RS-PAM system described above: PAM with the BphP1 in the ON state (ON), PAM with the BphP1 in the OFF state (OFF), RS-PAM (Differential), and the RS-PAM image in color overlaid on the PA image in the off state (Overlay). Although blood vessels were clearly resolved in the ON state and OFF state PAM images with a spatial resolution of ~3 μm, the tumors were better detected in the differential image with a ~67-fold improvement in CNR. The overlay image shows the BphP1 signal in color and the background blood signal in gray.

Figure 53:
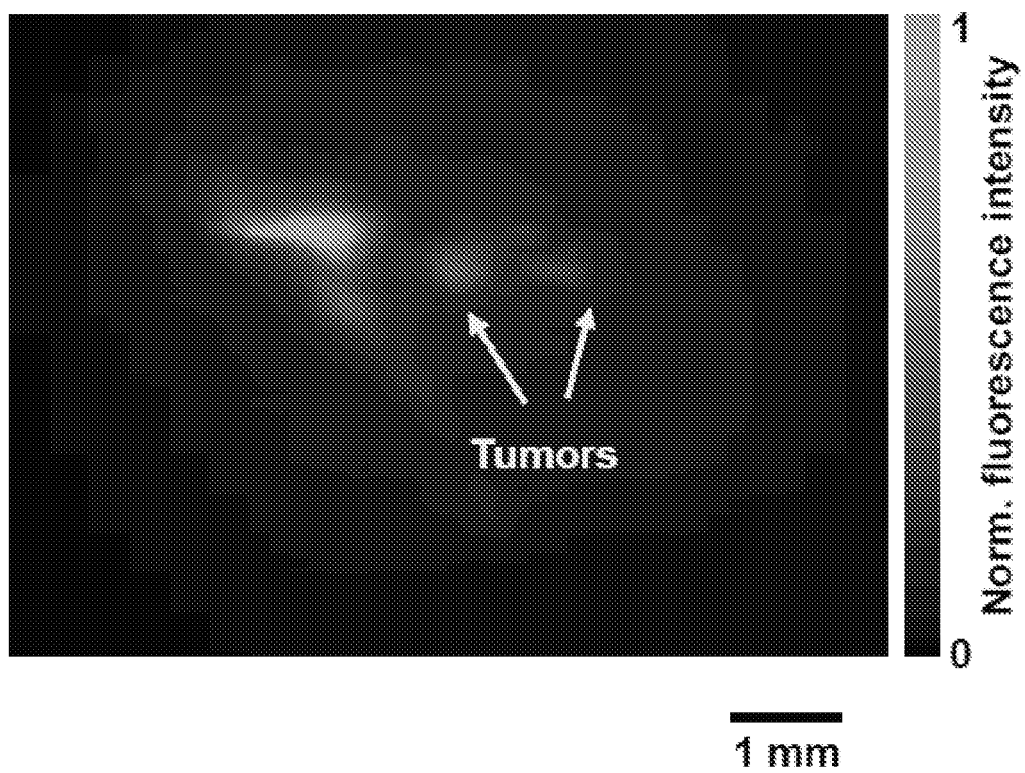
FIG. 53 shows a fluorescence microscopy image of the BphP1-expressing U87 cell tumors corresponding to the images of FIG. 52.

The ear tissue was imaged by wide-field fluorescence microscopy (Fluoview 1000, Olympus), using the co-expressed EGFP protein (excitation wavelength: 488 nm; emission filter wavelength: 510 nm). A 4× objective (NA=0.10) was used to image the ear tissue. The resulting wide-field fluorescence microscopy is shown in FIG. 53.

The results of this experiment demonstrated the ability of the RS-PAM disclosed herein to image tumors within highly vascularized tissues, such as the mouse ear, with high contrast and resolution.

Example 10: Reversibly Switchable Photoacoustic Microscopy with Sub-Diffraction Resolution To assess the enhanced capabilities of an RS-PAM system with sub-diffraction resolution, the following experiments were conducted.

Figure 9:
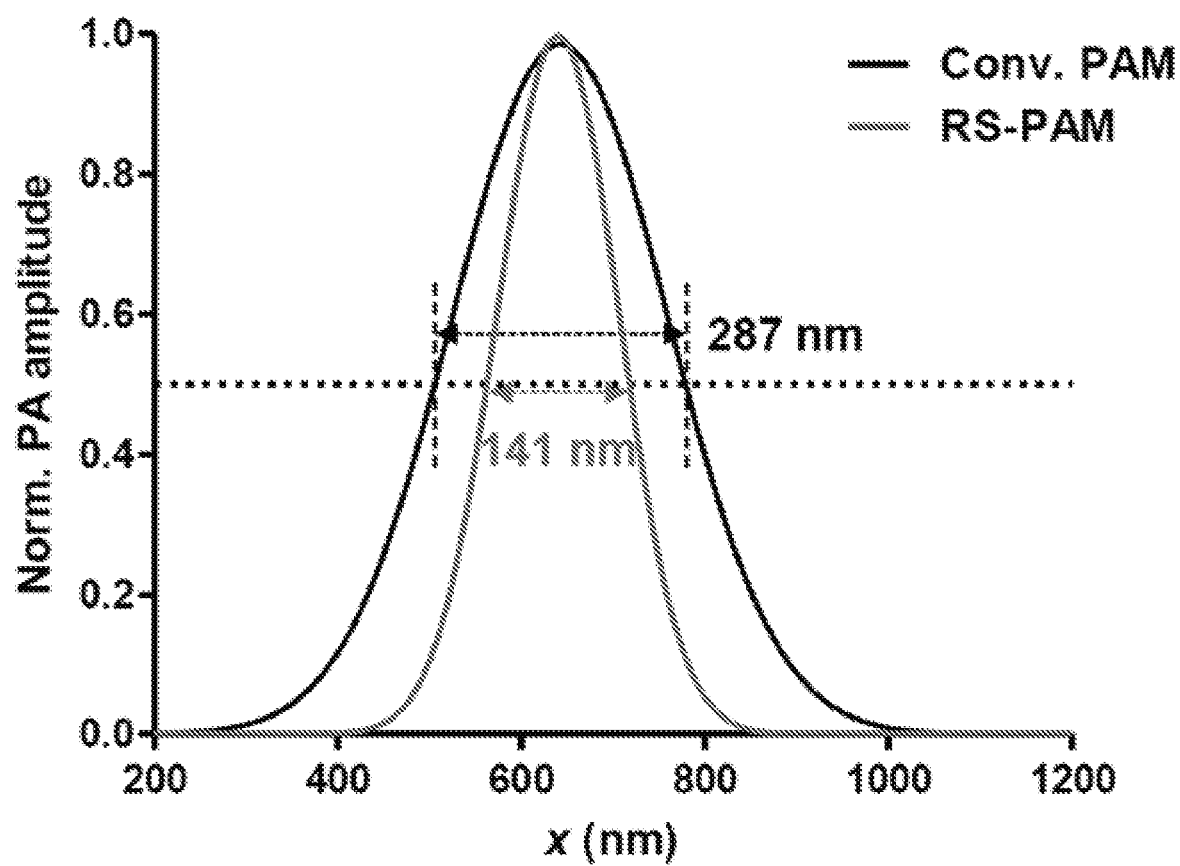
FIG. 9 shows a graph comparing the lateral resolution of conventional photoacoustic microscopy (PAM) to the lateral resolution of reversibly-switchable photoacoustic microscopy (RS-PAM) according to one aspect of the present disclosure.

U87 cells from the culture described in Ex. 5 were plated into a 35 mm glass-bottom petri dish (P35GCOL-O-14-C, MatTek) containing the complete growth medium. To assess the lateral resolution of the RS-PAM system described in Ex. 9, a sharp cover glass edge was coated with a thin layer of BphP1 protein and imaged using the RS-PAM system of Ex. 9 using conventional PAM and RS-PAM methods. The edge spread functions were extracted from the conventional PAM and RS-PAM images of the cover glass edge images and differentiated to yield line spread functions. The line spread functions were then fitted, and the full width at half maximum was used as the lateral resolution. The edge spread functions obtained using the above methods are summarized in FIG. 9. While conventional PAM imaging methods achieved ~287 nm lateral resolution, RS-PAM improved the lateral resolution to ~141 nm.

Figure 10:
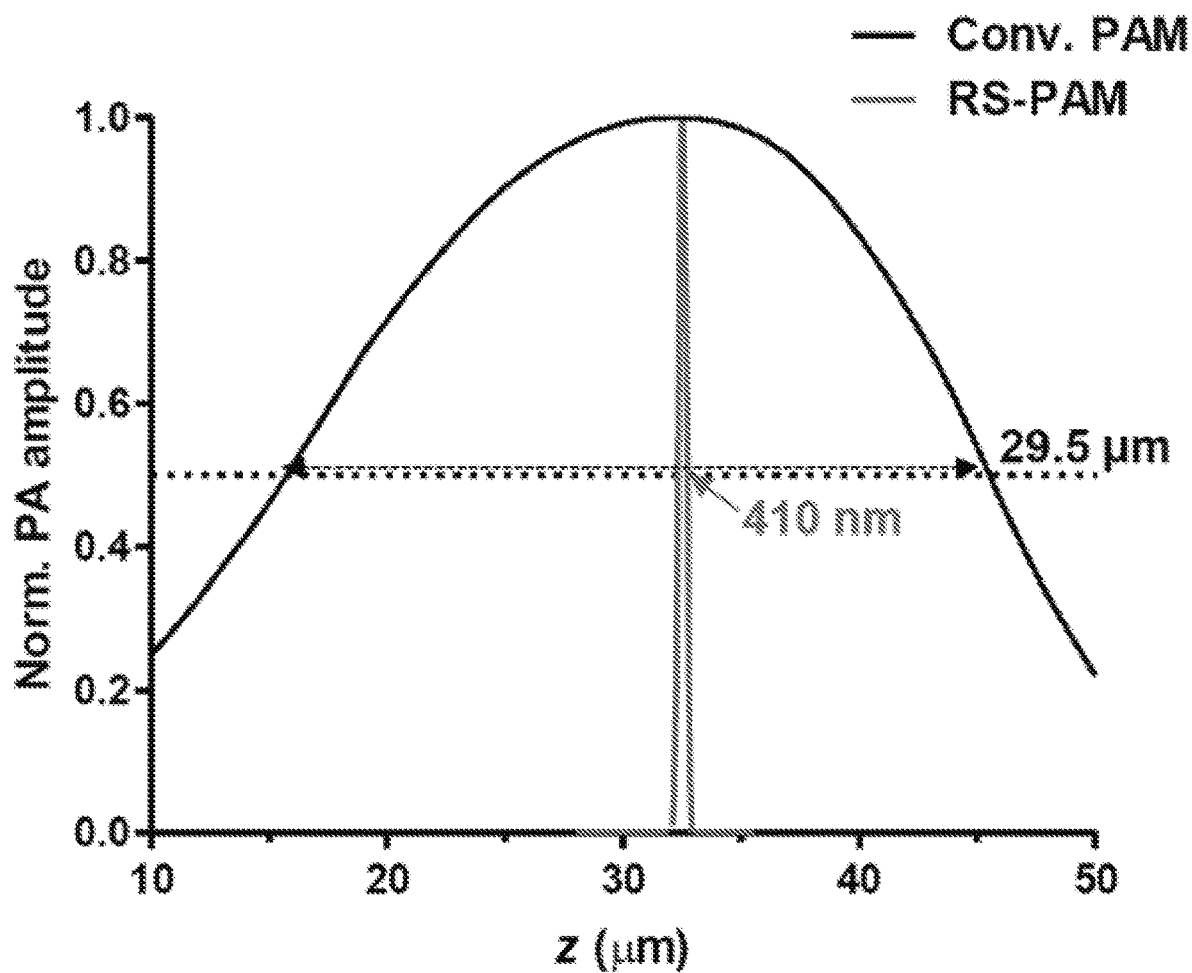
FIG. 10 shows a graph comparing the axial (depth) resolution of conventional photoacoustic microscopy (PAM) to the axial resolution of reversibly-switchable photoacoustic microscopy (RS-PAM) according to one aspect of the present disclosure.

To assess the lateral resolution of the RS-PAM system described in Ex. 9, a thin-layer of Bphp1 protein was spread on a glass cover slide and imaged by conventional PAM and RS-PAM methods. The axial plane spread functions were extracted from the conventional PAM and RS-PAM images of the Bphp1 on the cover glass and differentiated to yield axial plane spread functions. The axial plane spread functions were then fitted, and the full width at half maximum was used as the axial resolution. The axial plane spread functions obtained using the above methods are summarized in FIG. 10. While conventional PAM imaging methods acoustically resolved the thin Bphp1 layer with an axial resolution of ~30 μm, RS-PAM was capable of optical sectioning with an axial resolution of ~410 nm.

The results of this experiment demonstrated a two-fold enhancement of lateral resolution and a nearly 75-fold enhancement in axial resolution of RS-PAM imaging relative to conventional PAM imaging.

Example 11: Reversibly Switchable Photoacoustic Microscopy with Sub-Diffraction Resolution To demonstrate the enhanced capabilities of an RS-PAM system with sub-diffraction resolution, the following experiments were conducted.

A sub-diffraction PA imaging approach using the bottom illumination of the RS-PAM system described in Ex. 9 was developed to improve the spatial resolution of this system, based on the exponential photoswitching dynamics of BphP1 described herein above and illustrated in FIG. 8.

Figure 11:
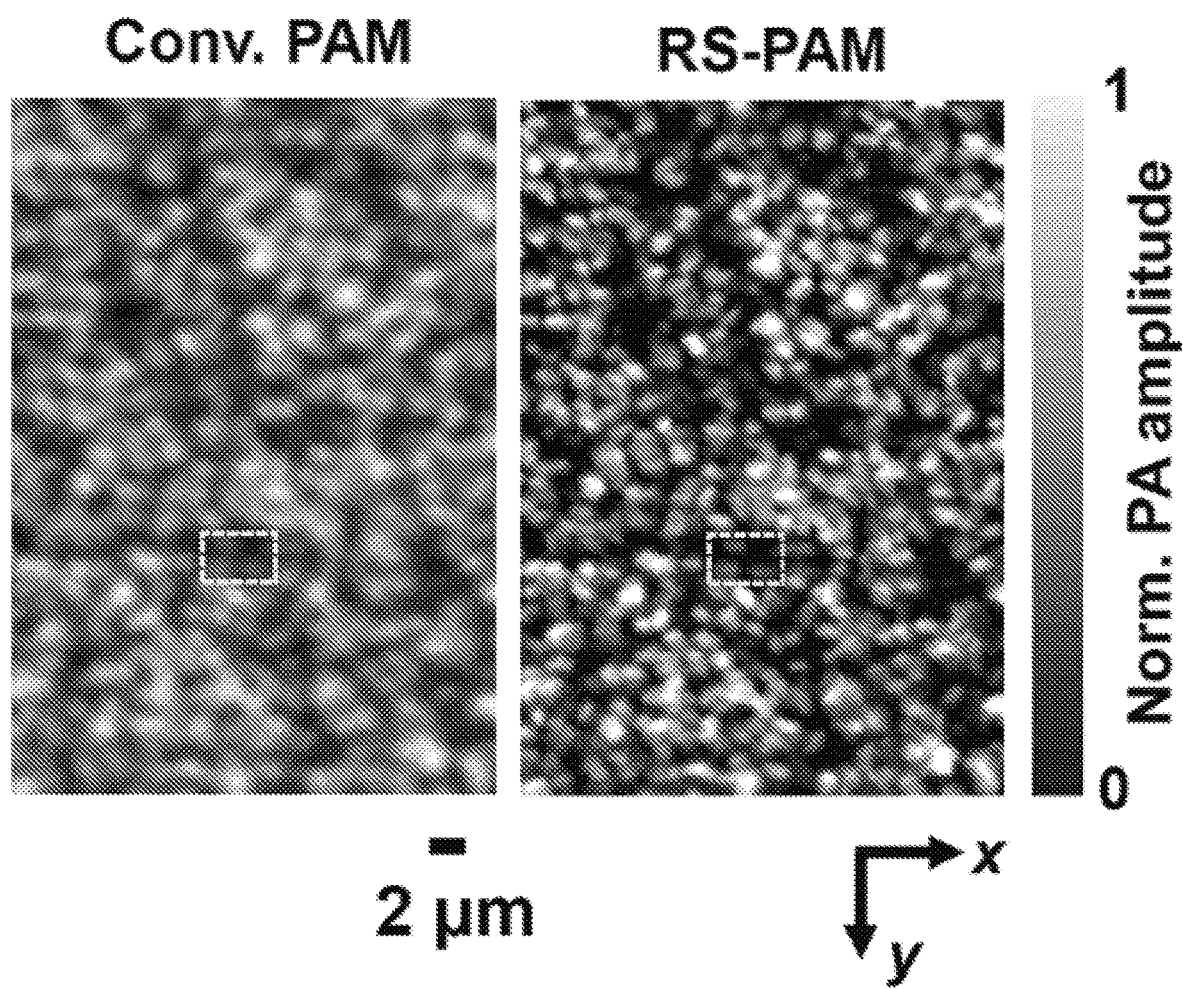
FIG. 11 shows images of BphP1-expressing bacteria densely spread on a cover glass distribution obtained using conventional photoacoustic microscopy (PAM) and using reversibly-switchable photoacoustic microscopy (RS-PAM) according to one aspect of the present disclosure.
Figure 34A:
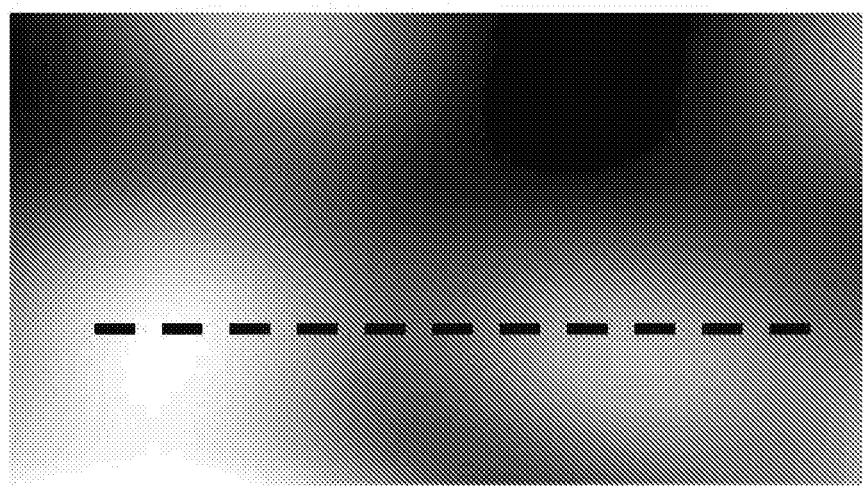
FIG. 34A shows a close-up image of BphP1-expressing bacteria densely spread on a cover glass obtained using conventional PAM.
Figure 34B:
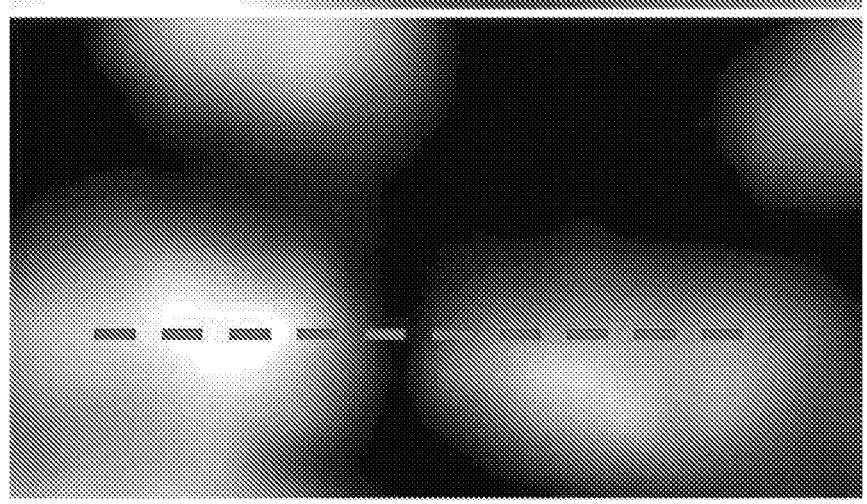
FIG. 34B shows a close-up image of the BphP1-expressing bacteria densely spread on a cover glass obtained using RS-PAM.
Figure 34B:
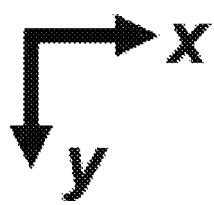
Figure 34B:
Figure 35:
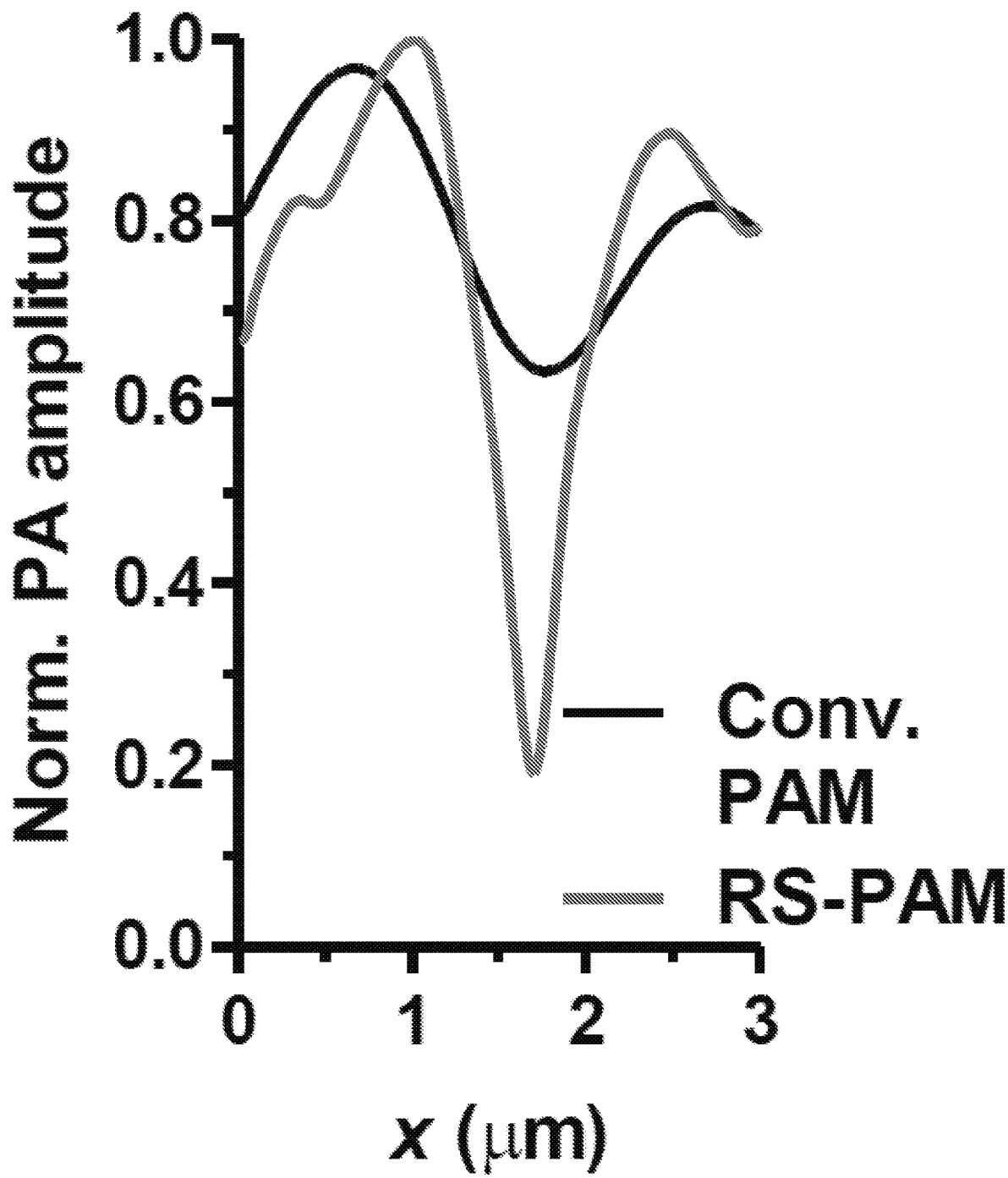
FIG. 35 shows a normalized signal profile obtained along transects defined by the dashed lines in FIG. 34A (Cony. PAM) and FIG. 34B (RS-PAM).

For switchable photoacoustic microscopy with sub-diffraction resolution, U87 cells cultured as described in Ex. 5 were plated into a 35 mm glass-bottom petri dish (P35GCOL-O-14-C, MatTek) containing the complete growth medium. A monolayer of BphP1-expressing bacteria densely spread on a cover glass was imaged using both conventional PAM and RS-PAM. FIG. 11 is a comparison of the images of the bacteria obtained using conventional PAM and RS-PAM imaging methods. FIG. 34A is a close-up of the conventional PAM image of FIG. 11 outlined in a dashed box, and FIG. 34B is a close-up of the RS-PAM image of FIG. 11 outlined in a dashed box. FIG. 35 is a graph summarizing the PA signal magnitudes detected along the transects shown as dashed lines in FIG. 34A and FIG. 34B. Compared to the conventional PAM image of FIG. 34A, the RS-PAM image of FIG. 34B showed superior lateral resolution, enabling better separation of neighboring bacteria.

In this experiment, RS-PAM achieved a lateral resolution of ~141 nm, ~2-fold finer than that of the corresponding lateral resolution of the conventional PAM image.

Example 12: Reversibly Switchable Photoacoustic Microscopy of Multilayer of Cells To demonstrate the imaging resolution of the RS-PAM system on a multi-layer of cells, the following experiments were conducted.

Figure 36:
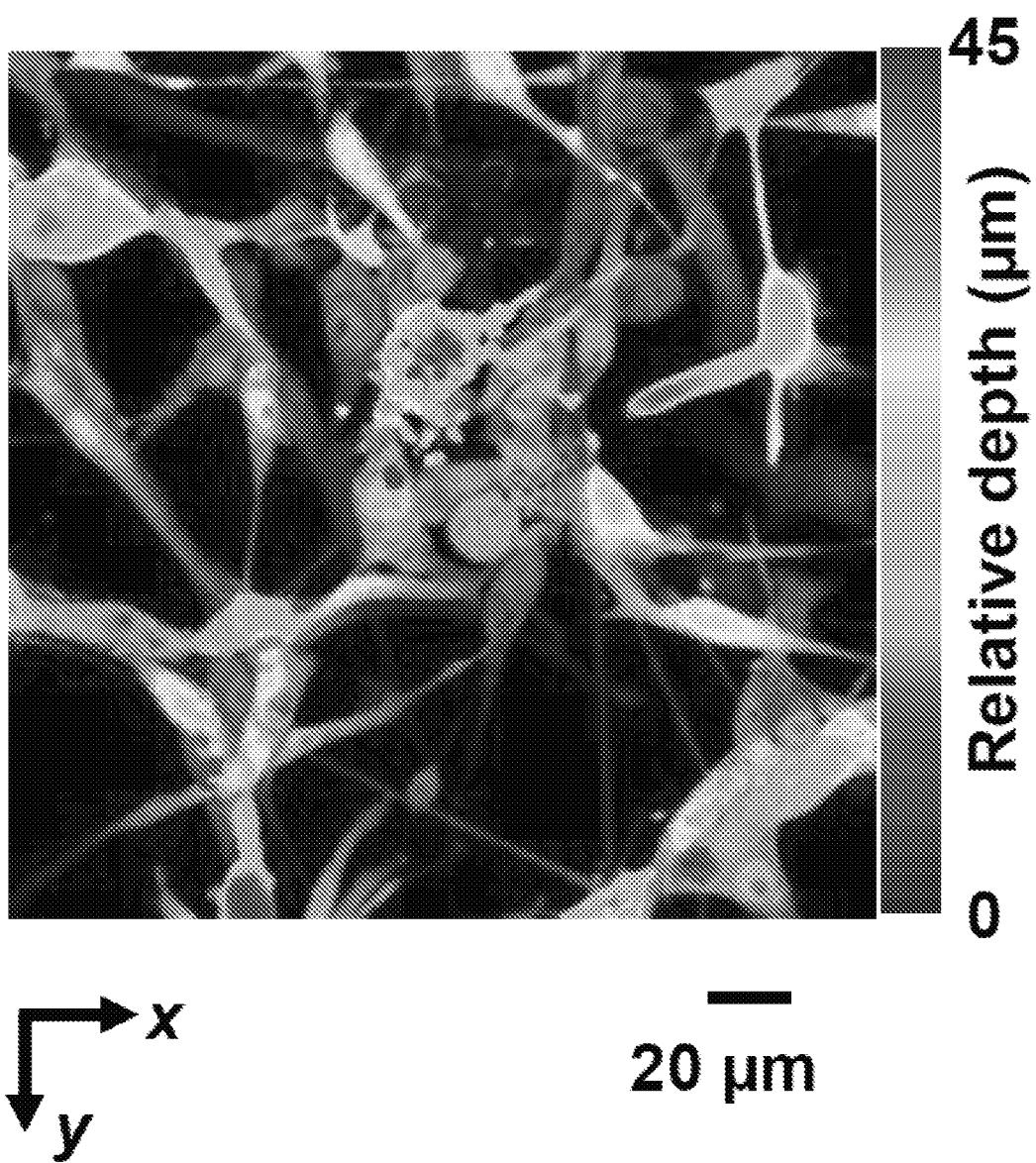
FIG. 36 shows a depth-encoded RS-PAM image of multiple layers of BphP1-expressing U87 cells growing on a cover glass; the relative depths of the cells are encoded by a color scale ranging from blue (superficial) to red (deep).
Figure 37A:
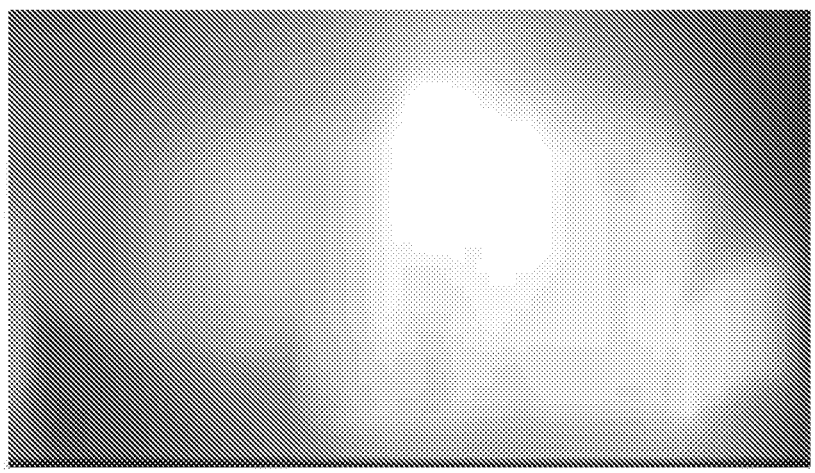
FIG. 37A shows an x-z cross-sectional images of two stacked U87 cells, acquired with conventional PAM.
Figure 37B:
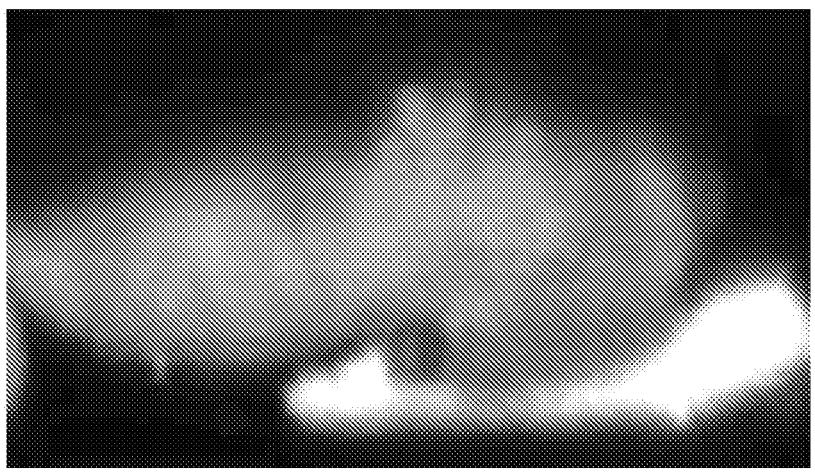
FIG. 37B shows an x-z cross-sectional images of two stacked U87 cells corresponding to the image of FIG. 37A, but acquired with RS-PAM at substantially finer axial resolution.
Figure 37B:
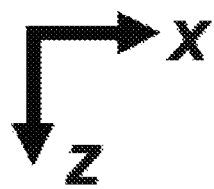
Figure 54:
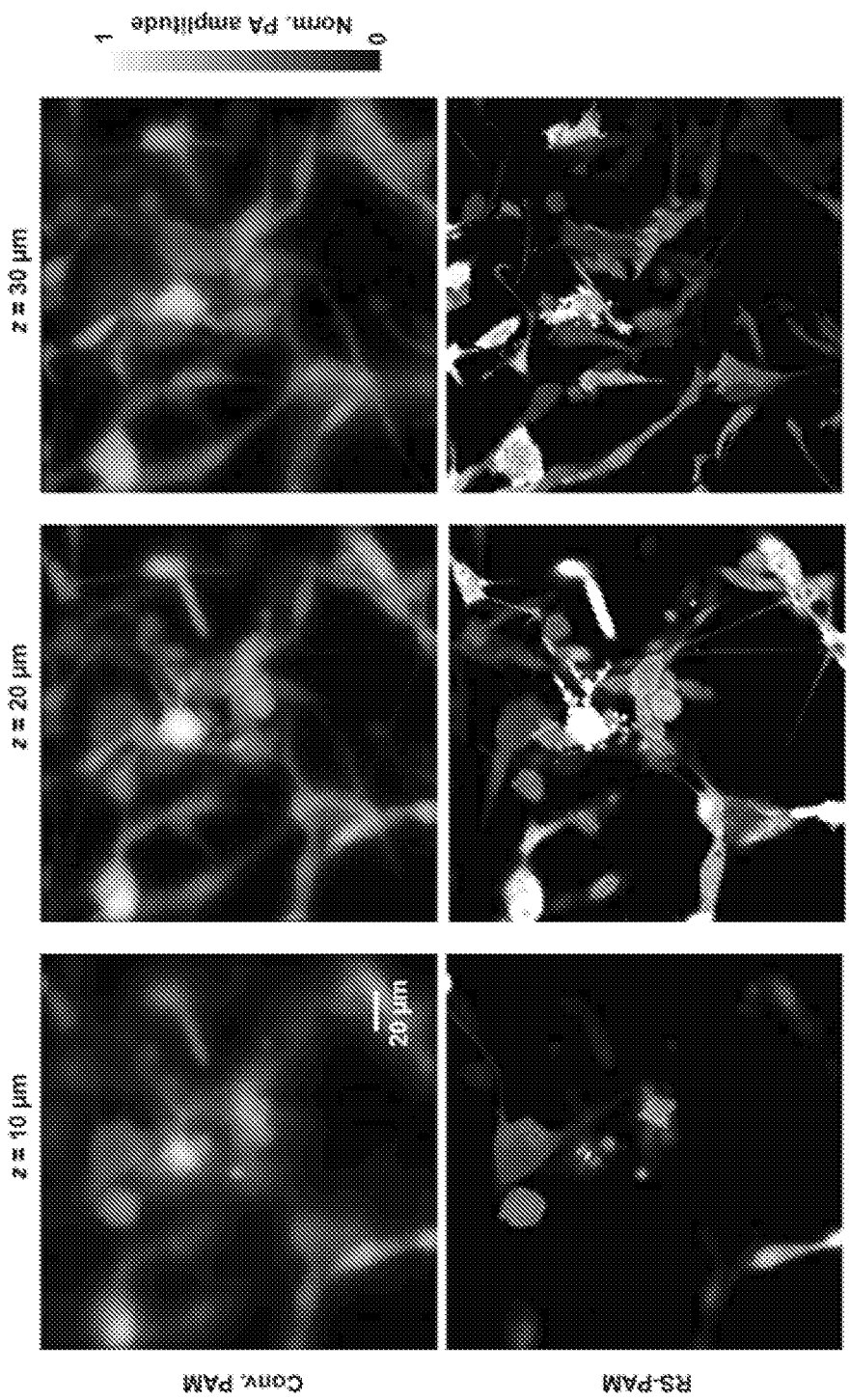
FIG. 54 shows a series of conventional OR-PAM images of multiple layers of BphP1-expressing U87 cells (top row) compared to corresponding RS-PAM images (bottom row) obtained at three depths (z): 10 µm, 20 µm, and 30 µm.

The U87 cells in culture as described in Ex. 5 were plated into a 35 mm glass-bottom petri dish (P35GCOL-O-14-C, MatTek) containing the complete growth medium. The U87 cells formed a multilayer of live BphP1-expressing U87 cells with a total thickness of about 35 μm. The cell multilayer was imaged using the RS-PAM system described in Ex. 9 and compared to corresponding images obtained using conventional PAM methods. FIG. 54 is a series of images of the cell multilayer obtained using conventional PAM (top row) and RS-PAM (bottom row) at depths of 10 μm, 20 μm, and 30 μm within the cell multilayer. Compared with conventional PAM with acoustically determined axial resolution of ~30 μm (top row), RS-PAM substantially improved the axial resolution (~0.4 μm, bottom row), enabling optical sectioning of the cells at different depths. FIGS. 37A and 37B are cross-sectional images of two stacked U87 cells in a cell multilayer, acquired with conventional PAM (FIG. 37A) and RS-PAM (FIG. 37B), showing the substantially finer axial resolution of RS-PAM. FIG. 36 is a depth-encoded RS-PAM image of a multiple layer of BphP1-expressing U87 cells growing on a cover glass, with the relative depths of the cells color encoded from blue (superficial) to red (deep).

The results of this experiment demonstrated the enhanced lateral and axial resolution achieved by RS-PAM relative to conventional PAM methods.

What is claimed is:

1. A method of obtaining a differential photoacoustic (PA) image of a region of interest, the method comprising:
   obtaining a plurality of first PA signals from the region of interest generated in response to illuminating the region of interest with a first set of laser pulses at a first laser wavelength, the region of interest comprising a plurality of reversibly-switchable probes configured in a first state representing a high absorption rate of the first set of laser pulses at the first laser wavelength, wherein the illuminating the region of interest with the first set of laser pulses at the first laser wavelength switches the plurality of reversibly-switchable probes from the first state to a second state;
   obtaining a plurality of second PA signals from the region of interest generated in response to illuminating the region of interest with a second set of laser pulses at the first laser wavelength, wherein the plurality of reversibly-switchable probes remain configured in the second state and the second state representing a reduced absorption rate of the second set of laser pulses at the first laser wavelength;
   reconstructing a first PA image of the region of interest comprising the plurality of first PA signals obtained with the first state representing the high absorption rate;
   reconstructing a second PA image of the region of interest comprising the plurality of second PA signals obtained with the second state representing the reduced absorption rate;
   subtracting the second PA image from the first PA image pixelwise to obtain a reversibly-switchable photoacoustic (RS-PA) image of the region of interest, wherein the RS-PA image of the region of interest is the differential PA image of the region of interest; and
   wherein the differential image reduces an impact of background signals generated by other objects within the region of interest present in both the first and second PA signals that are not the plurality of reversibly-switchable probes.

2. The method of claim 1, wherein the step to obtain the RS-PA image of the region of interest further comprises:
   obtaining at least one additional plurality of first PA signals generated in response to illuminating the region of interest with the first set of laser pulses at the first laser wavelength;
   obtaining at least one additional plurality of second PA signals generated in response to illuminating the region of interest with the second set of laser pulses at the first laser wavelength;
   reconstructing at least one additional first PA image of the region of interest from comprising the at least one additional plurality of first PA signals;
   reconstructing at least one additional second PA image signals of the region of interest from comprising the at least one additional plurality of second PA signals;
   averaging the first PA image and each of the at least one additional first PA images pixelwise to obtain an averaged first PA image;
   averaging the second PA image and each of the at least one additional second PA images pixelwise to obtain an averaged second PA image; and
   subtracting the averaged second PA image from the averaged first PA image pixelwise to obtain the RS-PA image of the region of interest, wherein the RS-PA image of the region of interest is the differential PA image of the region of interest.

3. The method of claim 2, further comprising illuminating the region of interest comprising the plurality of reversibly-switchable probes with a set of laser pulses at a second laser wavelength prior to obtaining each of the at least one additional plurality of first PA signals, wherein the illuminating of the region of interest comprising the plurality of reversibly-switchable probes with the set of laser pulses at the second laser wavelength switches the plurality of reversibly-switchable probes to the first state from the second state.

4. The method of claim 1, further comprising illuminating the region of interest comprising the plurality of reversibly-switchable probes using a second laser wavelength, wherein the illuminating of the region of interest comprising the plurality of reversibly-switchable probes with the second laser wavelength switches the plurality of reversibly-switchable probes from the second state to the first state.

5. The method of claim 2, further comprising illuminating the region of interest comprising the plurality of reversibly-switchable probes with a second laser wavelength after obtaining each of the at least one additional plurality of first PA signals.

6. The method of claim 4, wherein the region of interest comprising the plurality of reversibly-switchable probes is illuminated using the second laser wavelength after obtaining the first PA signal, wherein the illuminating of the region of interest comprising the plurality of reversibly-switchable probes with the second laser wavelength returns the plurality of reversibly-switchable probes to the first state from the second state.

* * * * *